(12) United States Patent
Chao et al.

(10) Patent No.: US 6,667,984 B1
(45) Date of Patent: Dec. 23, 2003

(54) METHODS AND APPARATUS FOR ARBITRATING OUTPUT PORT CONTENTION IN A SWITCH HAVING VIRTUAL OUTPUT QUEUING

(75) Inventors: Hung-Hsiang Jonathan Chao, Holmdel, NJ (US); Jin-Soo Park, Omaha, NE (US)

(73) Assignee: Polytechnic University, Brooklyn, NY (US)

( * ) Notice: Subject to any disclaimer, the term of this patent is extended or adjusted under 35 U.S.C. 154(b) by 0 days.

(21) Appl. No.: 09/312,320

(22) Filed: May 14, 1999

Related U.S. Application Data

(60) Provisional application No. 60/085,672, filed on May 15, 1998.

(51) Int. Cl.[7] .............................. H04L 12/56
(52) U.S. Cl. ............................... 370/414; 370/414
(58) Field of Search .................... 370/414, 417, 370/418, 412, 416, 428

(56) References Cited

U.S. PATENT DOCUMENTS

| | | | |
|---|---|---|---|
| 4,580,011 A | * | 4/1986 | Glaser |
| 5,299,190 A | * | 3/1994 | LaMaire et al. |
| 5,517,495 A | * | 5/1996 | Lund et al. .................. 370/415 |
| 5,539,559 A | * | 7/1996 | Cisneros et al. ............ 359/117 |
| 5,689,644 A | * | 11/1997 | Chou et al. |
| 5,864,535 A | | 1/1999 | Basilico |
| 5,923,654 A | | 7/1999 | Schnell |
| 5,930,256 A | * | 7/1999 | Greene et al. ............... 370/397 |
| 5,956,342 A | * | 9/1999 | Manning et al. ............. 370/414 |
| 5,978,359 A | * | 11/1999 | Caldara et al. .............. 370/236 |
| 6,044,061 A | * | 3/2000 | Aybay et al. ................ 370/230 |
| 6,046,994 A | | 4/2000 | Fechalos et al. |
| 6,049,546 A | * | 4/2000 | Ramakrishnan .............. 370/412 |
| 6,072,772 A | * | 6/2000 | Charny et al. ............... 370/229 |
| 6,163,542 A | * | 12/2000 | Carr ........................... 370/399 |
| 6,208,644 B1 | * | 3/2001 | Pannell et al. .............. 370/389 |
| 6,359,861 B1 | * | 3/2002 | Sui et al. ..................... 370/230 |
| 6,449,283 B1 | | 9/2002 | Chao et al. |

* cited by examiner

Primary Examiner—Kenneth Vanderpuye
(74) Attorney, Agent, or Firm—Straub & Pokotylo; John C. Pokotylo

(57) ABSTRACT

A dual round robin arbitration technique for a switch in which input ports include virtual output queues. A first arbitration selects, for each of the input ports, one cell from among head of line cells of the virtual output queues to generate a first arbitration winning cell. Then, for each of the output ports, a second arbitration selects one cell from among the first arbitration winning cells requesting the output port.

27 Claims, 42 Drawing Sheets

CRU: Contention Resolution Unit
$\quad hd$ : Horizontal data
$\quad mp_i$ : Multicast pattern output
$\quad mp_o$ : Multicast pattern input
$\quad mpck$ : Multicast pattern clock $t_i$ : token input
$t_o$ : token output
$vd$ : vertical data $en = mp \cdot ti$
$to = \overline{mp} \cdot ti + tgp$

2900 hd : Horizontal data
vd : Vertical data
k : Bus width ti: token input
to: token output mpi: MP input
mpo: MP output

3000

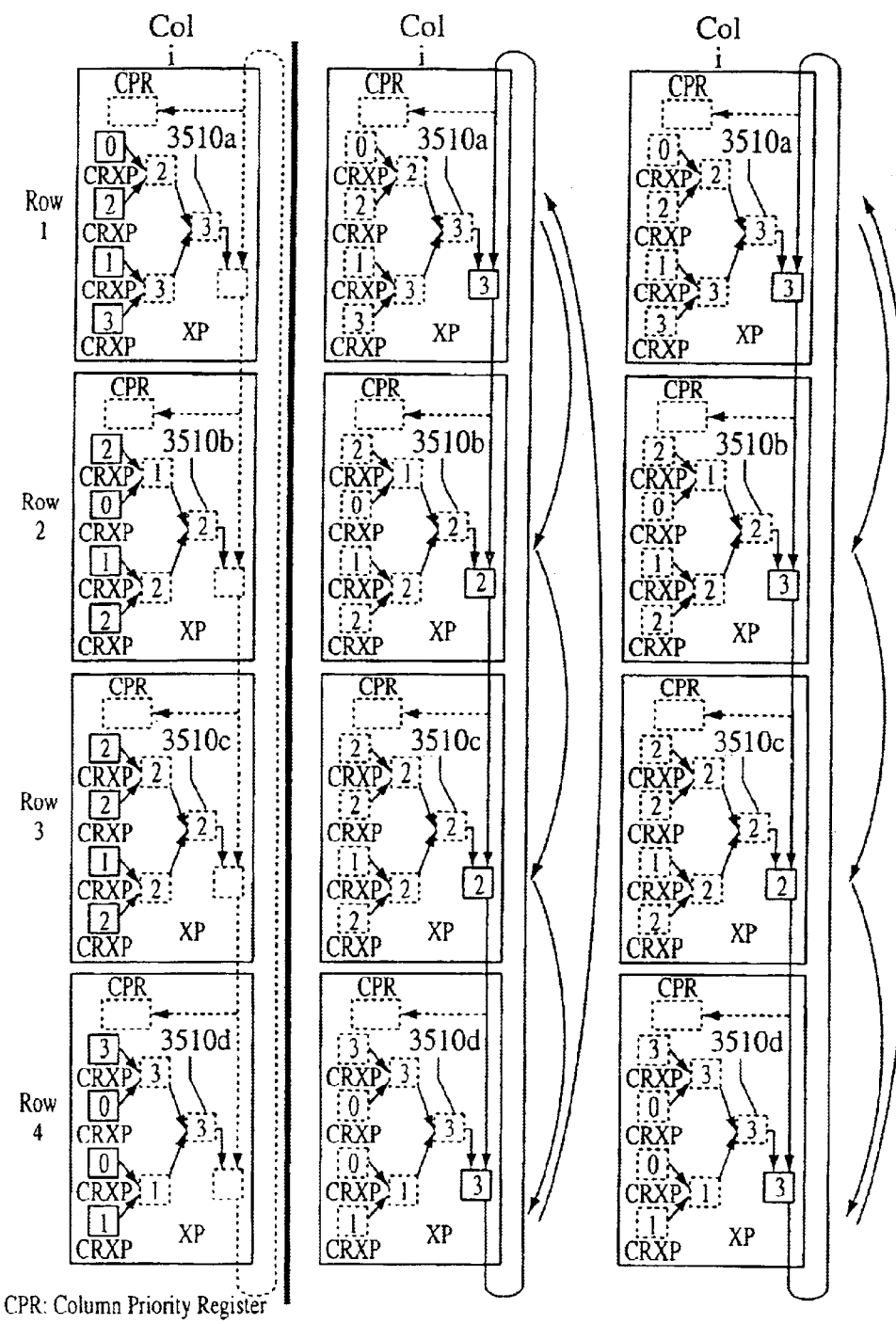
CPR: Column Priority Register
Figure 35A  Figure 35B  Figure 35C

CPR : Colum Priority Register   tgp : token generation point

METHODS AND APPARATUS FOR ARBITRATING OUTPUT PORT CONTENTION IN A SWITCH HAVING VIRTUAL OUTPUT QUEUING

§0. CLAIM TO PRIORITY

Benefit is claimed, under 35 U.S.C. §119(e)(1), to the filing date of provisional patent application serial No. 60/085,672, entitled "MULTICAST CROSSPOINT SWITCHING ARCHITECTURE WITH TUNNELING RING RESERVATION", filed on May 15, 1998 and listing Alper Altinordu and Hung-Hsiang J. Chao as the inventors, for any inventions enclosed in the manner provided by U.S.C. §112, ¶1. This provisional application is expressly incorporated herein by reference.

§1. BACKGROUND OF THE INVENTION

§1.1 Field of the Invention

In general, the present invention concerns methods and apparatus for arbitrating contention for an output port of a switch (for switching ATM cells for example) or router (for routing TCP/IP packets for example).

§1.2 Related Art

The present invention concerns arbitrating port contention which often occurs when data is directed through a network or internetwork via switches or routers. Before addressing the arbitration techniques and apparatus of the present invention, a brief description of the emergence of packet switching is provided in §1.2.1 below. Popular data structures used when communicating data are described in §§1.2.1.1.1 and 1.2.1.2.1 below. The basic elements and operations of switches or routers, which are used to direct data through a network or internetwork, are described in §§1.2.1.1.2 and 1.2.1.2.2 below. The idea of prioritizing data communicated over a network or internetwork is introduced in §1.2.2 below. Finally, with all of the foregoing background in mind, the problem of arbitrating port contention in switches and routers, as well as shortcomings of known arbitration techniques, are described in §1.2.3 below.

§1.2.1 THE GROWTH OF NETWORK AND INTERNETWORK COMMUNICATIONS

Communications networks permit remote people or machines to communicate voice or data (also referred to as "traffic" or "network traffic"). These networks continue to evolve to meet new demands placed upon them. A brief history of communications networks, and the emergence of packet switching, is now presented.

The public switched telephone network (or "PSTN") was developed to carry voice communications to permit geographically remote people to communicate with one another. Modems were then introduced, permitting computers to communicate data over the PSTN. Voice and modem communications over the PSTN use "circuit switching". Circuit switching inherently involves maintaining a continuous real time communication channel at the full channel bandwidth between two points to continuously permit the transport of information throughout the duration of the call. Unfortunately, due to this inherent characteristic of circuit switching, it is inefficient for carrying "bursty" data traffic. Specifically, many services have relatively low information transfer rates—information transfer occurs as periodic bursts. Bursty communications do not require full channel bandwidth at all times during the duration of the call. Thus, when circuit switched connection is used to carry bursty traffic, available communication bandwidth occurring between successive bursts is simply wasted.

Moreover, circuit switching is inflexible because the channel width is always the same. Thus, for example, a wide (e.g., 140 Mbit/second) channel would be used for all transmissions, even those requiring a very narrow bandwidth (e.g., 1 Kbit/second). In an attempt to solve the problem of wasted bandwidth occurring in circuit switching, multi-rate circuit switching was proposed. With multi-rate circuit switching, connections can have a bandwidth of a multiple of a basic channel rate (e.g., 1 Kbit/second). Although multi-rate circuit switching solves the problem of wasted bandwidth for services requiring only a narrow bandwidth, for services requiring a wide bandwidth, a number of multiple basic rate channels must be synchronized. Such synchronization becomes extremely difficult for wide bandwidth services. For example, a 140 Mbit/second channel would require synchronizing 140,000 1 Kbit/second channels. Moreover, multi-rate circuit switching includes the inherent inefficiencies of a circuit switch, discussed above, when bursty data is involved.

Multi-rate circuit switching having multiple "basic rates" has also been proposed. Unfortunately, the switch for multi-rate circuit switching is complex. Furthermore, the channel bandwidths are inflexible to meet new transmission rates. Moreover, much of the bandwidth might be idle when it is needed. Lastly, multiple basic rate circuit switching includes the inherent inefficiencies of a circuit switch, discussed above, when bursty data is involved.

In view of the above described problems with circuit switching, packet switched communications have become prevalent and are expected to be used extensively in the future. Two (2) communications protocols—TCP/IP and ATM—are discussed in §§1.2.1.1 and 1.2.1.2 below.

§1.2.1.1 INTERNETS

In recent decades, and in the past five to ten years in particular, computers have become interconnected by networks by an ever increasing extent; initially, via local area networks (or "LANs"), and more recently via LANs, wide area networks (or "WANs") and the Internet. In 1969, the Advanced Research Projects Agency (ARPA) of the U.S. Department of Defense (DoD) deployed Arpanet as a way to explore packet-switching technology and protocols that could be used for cooperative, distributed, computing. Early on, Arpanet was used by the TELNET application which permitted a single terminal to work with different types of computers, and by the file transfer protocol (or "FTP") which permitted different types of computers to transfer files from one another. In the early 1970s, electronic mail became the most popular application which used Arpanet.

This packet switching technology was so successful, the ARPA applied it to tactical radio communications (Packet Radio) and to satellite communications (SATNET). However, since these networks operated in very different communications environments, certain parameters, such as maximum packet size for example, were different in each case. Thus, methods and protocols were developed for "internetworking" these different packet switched networks. This work lead to the transmission control protocol (or "TCP") and the internet protocol (or "IP") which became the TCP/IP protocol suite. Although the TCP/IP protocol suite, which is the foundation of the Internet, is known to those skilled in the art, it is briefly described in §1.2.1.1.1 below for the reader's convenience.

§1.2.1.1.1 THE TCP/IP PROTOCOL STACK

The communications task for TCP/IP can be organized into five (5) relatively independent layers—namely, (i) an application layer, (ii) a host-to-host layer, (iii) an Internet layer, (iv) a network access layer, and (v) a physical layer. The physical layer defines the interface between a data transmission device (e.g., a computer) and a transmission medium (e.g., twisted pair copper wires, optical fiber, etc.). It specifies the characteristics of the transmission medium and the nature of the signals, the data rate, etc. The network access layer defines the interface between an end system and the network to which it is attached. It concerns access to, and routing data across, a network. Frame Relay is an example of a network access layer. The internet layer (e.g., IP) defines interfaces between networks and provides routing information across multiple networks. The host-to-host layer (e.g., TCP) concerns assuring the reliability of the communication. Finally, the application layer provides an interface to support various types of end user applications (e.g., the simple mail transfer protocol (or "SMTP") for e-mail, the file transfer protocol (or "FTP"), etc.).

Basically, each of the layers encapsulates, or converts, data in a high level layer. For example, referring to FIG. 1, user data 100 as a byte stream is provided with a TCP header 102 to form a TCP segment 110. The TCP segment 110 is provided with an IP header 112 to form an IP datagram 120. The IP datagram 120 is provided with a network header 122 to define a network-level packet 130. The physical layer converts the network-level packet to radio, electrical, optical (or other) signals sent over the transmission medium at a specified rate with a specified type of modulation.

The TCP header 102, as illustrated in FIG. 2, includes at least twenty (20) octets (i.e., 160 bits). Fields 202 and 204 identify ports at the source and destination systems, respectively, that are using the connection. Values in the sequence number 206, acknowledgement number 208 and window 216 files are used to provide flow and error control. The value in the checksum field 218 is used to detect errors in the TCP segment 110.

FIGS. 3A and 3B illustrate two (2) alternative IP headers 112 and 112', respectively. Basically, FIG. 3A depicts the IP protocol (Version 4) which has been used. FIG. 3B depicts a next generation IP protocol (Version 6) which, among other things, provides for more source and destination addresses.

More specifically, referring to FIG. 3A, the four (4) bit version field 302 indicates the version number of the IP, in this case, version 4. The four (4) bit Internet header length field 304 identifies the length of the header 112 in 32-bit words. The eight (8) bit type of service field 306 indicates the service level that the IP datagram 120 should be given. The sixteen (16) bit total length field 308 identifies the total length of the IP datagram 120 in octets. The sixteen (16) bit identification field 310 is used to help reassemble fragmented user data carried in multiple packets. The three (3) bit flags field 312 is used to control fragmentation. The thirteen (13) bit fragment offset field 314 is used to reassemble a datagram 120 that has become fragmented. The eight (8) bit time to live field 316 defines a maximum time that the datagram is allowed to exist within the network it travels over. The eight (8) bit protocol field 318 defines the higher-level protocol to which the data portion of the datagram 120 belongs. The sixteen (16) bit header checksum field 320 permits the integrity of the IP header 112 to be checked. The 32 bit source address field 322 contains the IP address of the sender of the IP datagram 120 and the 32 bit destination address field 324 contains the IP address of the host to which the IP datagram 120 is being sent. Options and padding 326 may be used to describe special packet processing and/or to ensure that the header 112 takes up a complete set of 32 bit words.

Referring to FIG. 3B, the four (4) bit version field 302 indicates the version number of the IP, in this case, version 6. The four (4) bit priority field 328 enables a sender to prioritize packets sent by it. The 24 bit flow label field 330 is used by a source to label packets for which special handling is requested. The sixteen (16) bit payload length field 332 identifies the size of the data carried in the packet. The eight (8) bit next header field 334 is used to indicate whether another header is present and if so, to identify it. The eight (8) bit hop limit field 336 serves to discard the IP datagram 120 if a hop limit (i.e., the number of times the packet is routed) is exceeded. Also provided are 128 bit source and destination address fields 322' and 324', respectively.

Having described the TCP/IP protocol suite, the routing of a TCP/IP packet is now described in §2.2.1.1.2 below.

§1.2.1.1.2 ROUTING TCP/IP PACKETS

A TCP/IP packet is communicated over the Internet (or any internet or intranet) via routers. Basically, routers in the Internet use destination address information Ad(Recall fields 324 and 324') to forward packets towards their destination. Routers interconnect different networks. More specifically, routers accept incoming packets from various connected networks, use a look-up table to determine a network upon which the packet should be placed, and routes the packet to the determined network. The router may buffer incoming packets if the networks are providing packets faster than it can route them. Similarly, the router may buffer outgoing packets if the router provides outgoing packets faster than the determined networks can accept them. The router may also arbitrate output port contention which is performed by the arbitration technique of the present invention. In some highspeed routers, packets are segmented into cells having a fixed data length before they are routed.

FIG. 4, which includes FIGS. 4A through 4C, illustrates the communication of data from a sender, to a receiver, using the TCP/IP protocol suite. Referring first to FIG. 4A, an application protocol 402 prepares a block of data (e.g., an e-mail message (SMTP) a file (FTP), user input (TELNET), etc.) 100 for transmission. Before the data 100 are sent, the sending and receiving applications agree on a format and encoding and agree to exchange data. If necessary the data are converted (character code, compression, encryption, etc.) to a form expected by the destination.

The TCP layer 404 may segment the data block 100, keeping track of the sequence of the blocks. Each TCP segment 110 includes a header 102 containing a sequence number (recall field 206) and a frame check sequence to detect errors. A copy of each TCP segment is made so that, if a segment is lost or damaged, it can be retransmitted. When an acknowledgement of safe receipt is received from the receiver, the copy of the segment is erased.

The IP layer 406 may break a TCP segment into a number of datagrams 120 to meet size requirements of networks over which the data will be communicated. Each datagram includes the IP header 112.

A network layer 408, such as frame relay for example, may apply a header and trailer 122 to frame the datagram 120. The header may include a connection identifier and the trailer may contain a frame check sequence for example. Each frame 130 is then transmitted, by the physical layer 410, over the transmission medium as a sequence of bits.

FIG. 4B illustrates the operation of TCP/IP at a router in the network. The physical layer 412 receives the incoming signal 130 from the transmission medium and interprets it as a frame of bits. The network (e.g., frame relay) layer 414 removes the header and trailer 122 and processes them. A frame check sequence may be used for error detection. A connection number may be used to identify the source. The network layer 414 then passes the IP datagram 120 to the IP layer 418.

The IP layer examines the IP header 112 and makes a routing decision (Recall the destination address 324, 324'.). A local line control (or "LLC") layer 420 uses a simple network management protocol (or "SNMP") and adds a header 450 which contains a sequence number and address information. Another network layer 422 (e.g., media access control (or "MAC")) adds a header and trailer 460. The header may contain address information and the trailer may contain a frame check sequence. The physical layer 424 then transmits the frame 150 over another transmission medium.

FIG. 4C illustrates the operation of TCP/IP at a receiver. The physical layer 432 receives the signal from the transmission medium and interprets it as a frame of bits. The network layer 434 removes the header and trailer 460 and processes them. For example, the frame check sequence in the trailer may be used for error detection. The resulting packet 140 is passed to the transport layer 436 which processes the header 450 for flow and error control. The resulting IP datagram 120 is passed to the IP layer 438 which removes the header 112. Frame check sequence and other control information may be processed at this point.

The TCP segment 110 is then passed to the TCP layer 440 which removes the header 102 and may check the frame check sequence (in the event of a match, the match is acknowledged and in the event of a mismatch, the packet is discarded). The TCP layer 440 then passes the data 100 to the application layer 442. If the user data was segmented (or fragmented), the TCP layer 440 reassembles it. Finally, the application layer 442 performs any necessary transformations, such as decompression and decryption for example, and directs the data to an appropriate area of the receiver, for use by the receiving application.

§1.2.1.2 HIGH SPEED NETWORKS

As discussed in §1.2.1 above, there has been a trend from circuit switched networks towards packet switched networks. For example, packet switched communications presently appear to be the preferred mode of communication over a Broadband-Integrated Services Digital Network (or "B-ISDN") service. Packet switching includes normal packet switching (e.g., X.25) and fast packet switching (e.g., Asynchronous Transfer Mode or "ATM"). Normal packet switching assumes certain errors at each data link are probable enough to require complex protocols so that such errors can be controlled at each link. Link errors were a valid assumption and concern at one time. However, today data links are very reliable such that the probability of errors being introduced by data links are no longer of any great concern. Hence, fast packet switching is becoming more prominent. The ATM protocol is discussed in §1.2.1.2.1 below.

§1.2.1.2.1 THE ASYNCHRONOUS TRANSFER MODE (ATM) PROTOCOL

Since data links are very reliable and the probability of errors being introduced by data links are no longer of any great concern, ATM fast packet switching does not correct errors or control flow within the network (i.e., on a link-by-link basis). Instead, ATM is only concerned with three types of errors; namely bit errors, packet loss, and packet insertion. Bit errors are detected and/or corrected using end-to-end protocols. Regarding packet loss and insertion errors, ATM only uses prophylactic actions when allocating resources during connection set-up. That is, ATM operates in a connection-oriented mode such that when a connection is requested, a line terminal first checks whether sufficient resources (i.e., whether sufficient bandwidth and buffer area) are available. When the transfer of information is complete, the resources are "released" (i.e., are made available) by the line terminal. In this way, ATM reduces the number of overhead bits required with each cell, thereby permitting ATM to operate at high data rates.

The ATM protocol transfers data in discrete sized chunks called "cells". The use of fixed sized cells simplifies the processing required at each network node (e.g., switch) thereby permitting ATM to operate at high data rates. The structure of ATM cells is described in more detail below.

Finally, the ATM protocol permits multiple logical (or "virtual") connections to be multiplexed over a single physical interface. As shown in FIG. 5, logical connections in ATM are referred to as virtual channel connections (or "VCCs") 510. A VCC 510 is the basic unit of switching in an ATM network. A VCC 510 is established between two end users, through the network. A variable-rate, full-duplex flow of ATM cells may be exchanged over the VCC 510. VCCs 510 may also be used for control signaling, network management and routing.

A virtual path connection (or "VPC") 520 is a bundle of VCCs 510 that have the same end points. Accordingly, all of the cells flowing over all VCCs 510 in a single VPC 520 may be switched along the same path through the ATM network. In this way, the VPC 520 helps contain network control costs by grouping connections sharing common paths through the network. That is, network management actions can be applied to a small number of virtual paths 520 rather than a large number of individual virtual channels 510.

Finally, FIG. 5 illustrates that multiple virtual paths 520 and virtual channels 510 (i.e., logical connections) may be multiplexed over a single physical transmission path 530.

FIG. 6 illustrates the basic architecture for an interface between a user and a network using the ATM protocol. The physical layer 610 specifies a transmission medium and a signal-encoding (e.g., data rate and modulation) scheme. Data rates specified at the physical layer 610 may be 155.52 Mbps or 622.08 Mbps, for example. The ATM layer 620 defines the transmission of data in fixed sized cells and also defines the use of logical connections, both introduced above. The ATM adaptation layer 630 supports information transfer protocols not based on ATM. It maps information between a high layer 640 and ATM cells.

Recall that the ATM layer 620 places data in fixed sized cells (also referred to as a packet). An ATM packet includes a header field (generally five (5) bytes) and a payload (or information) field (generally 48 bytes). The main function of the header is to identify a virtual connection to guarantee that the ATM packet is properly routed through the network. Switching and/or multiplexing is first performed on virtual paths and then on virtual channels. The relatively short length of the payload or information field reduces the size required for internal buffers at switching nodes thereby reducing delay and delay jitter.

More specifically, FIG. 7A illustrates an ATM cell 700 having a header 710 as formatted at a user-network interface, while FIG. 7B illustrates the ATM cell 700' having a header 710' as formatted internal to the network. Referring first to the header 710 as formatted at the user-network interface, a four(4) bit generic flow control field 712 may be used to assist an end user in controlling the flow of traffic for different qualities of service. The eight (8) bit virtual path identifier field 714 contains routing information for the network. Note that this field 714' is expanded to twelve (12) bits in header 710' as formatted in the network. In both headers 710 and 710', a sixteen (16) bit virtual channel identifier field 716 contains information for routing the cell to and from the end users. A three (3) bit payload type field 718 indicates the type of information in the 48 octet payload portion 750 of the packet. (The coding of this field is not particularly relevant for purposes of the present invention.) A one (1) bit cell loss priority field 720 contains information to let the network know what to do with the cell in the event of congestion. A value of 0 in this field 720 indicates that the cell is of relatively high priority and should not be discarded unless absolutely necessary. A value of 1 in this field indicates that the network may discard the cell. Finally, an eight (8) bit header error control field 722 contains information used for error detection and possibly error correction as well. The remaining 48 octets 750 define an information field.

Fast packet switching, such as ATM switching, has three main advantages. First ATM switching is flexible and is therefore safe for future transfer rates. Second, no resources are specialized and consequently, all resources may be optimally shared. Finally, ATM switches permit economies of scale for such a universal network.

§1.2.1.2.2 SWITCHES

ATM cells are directed through a network by means of a series of ATM switches. An ATM switch must perform three basic functions for point-to-point switching; namely, (i) routing the ATM cell, (ii) updating the virtual channel identifier (VCI) and virtual path identifier (VPI) in the ATM cell header (Recall fields 714, 714' and 716'.), and (iii) resolving output port contention. The first two functions, namely routing and updating, are performed by a translation table belonging to the ATM switch. The translation table converts an incoming link (input port) and VCI/VPI to an outgoing link (output port) and VCI/VPI. Resolving output port contention (which may be performed by the arbitration technique of the present invention) is discussed in §1.2.3 below.

Thus, conceptually, referring to FIG. 8, an ATM switch 800 may include input port controllers 810 for accepting ATM cells from various physical (or logical) links (Recall FIG. 5.), a switching fabric 820 for forwarding cells to another link towards their destination, and output port controllers 830 for buffering ATM cells to be accepted by various physical (or logical) links. A control unit 840 may be used to coordinate the operations of the input port controllers 810, the output port controllers 830 and the switching fabric 820. kn exemplary, scalable, ATM switch is disclosed in U.S. Pat. Nos. 5,724,351 and 5,790,539 (each of which is incorporated herein by reference).

§1.2.2 THE NEED TO CONSIDER DIFFERENT TYPES OF TRAFFIC—PRIORITY

Different applications place different demands on communications networks. In particular, a certain application may require that its traffic be communicated (i) with minimum delay, (ii) at a fast rate, (iii) with maximum reliability, and/or (iv) to minimize communications (service) cost. For example, people would not tolerate much delay in their voice communications during a telephone call. High definition video requires a fast rate, or a high bandwidth, as well as low jitter, or delay variations. However, video communications may be able to tolerate some data corruption or loss to the extent that such losses are imperceptible or not annoying to people. The communications of important data, on the other hand, may tolerate delay, but might not tolerate data loss or corruption. Finally, an application may request that low priority data be communicated at a minimum cost.

To the extent that the network traffic of an application does not have "special" requirements, it should be communicated with normal service.

Thus, many applications require a guaranteed quality of service (or "QoS") from a network provider. The network provider, in turn, may see guaranteeing QoS as a way to add value to their network and increase revenues. TCP/IP based internetworks and ATM based networks are envisioned as carrying many different types of data for many different applications which have different needs. (Recall the "Type of Service" field 306 of the internet protocol packet (version 4), the "priority" field 328 of the internet protocol packet (version 6), and "generic flow control" field 712 of the ATM cell.)

§1.2.3 CONTENTION

As introduced above with reference to FIG. 8, a packet switch includes input and output ports interconnected by a switch fabric. The switch fabric can use shared-medium (e.g., bus), shared-memory, and space-division (e.g., crossbar) architecture. (See, e.g., the article, F. A. Tobagi, "Fast Packet Switch Architectures for Broadband Integrated Services Digital Networks", *Proceedings of the IEEE*, Vol. 78, No. 1, pp. 133–167 (January 1990).) The function of a packet switch is to transfer packets from the input ports to the appropriate output ports based on the addresses contained within the packet headers. In practice, the variable length packets are usually broken into fixed sized cells (not necessarily 53 bytes) before being transmitted across the switch fabric. The cells are then reassembled at the output of the switch. (See, e.g., the article, T. Anderson, et al., "High Speed Switch Scheduling for Local Area Networks", ACM Trans. Computer Systems, pp. 319–352 (November 1993); hereafter referred to as "the Anderson article".) Since multiple packets from different input ports could be destined for the same output port at the same time (referred to as "output port contention" or simply "contention"), a switch arbitration or scheduling algorithm is needed to choose from among the contending packets, the one packet preferred at that time slot, provide a grant to the input port corresponding to the preferred packet, and configure the switch fabric to transfer the packet.

An arbiter is used to resolve output port contention among two or more packets or cells destined for the same output port. The arbiter chooses a packet or cell which "wins" contention (i.e., which is applied to the output port). Other packets or cells contending for the output port "lose" contention (i.e., they must wait before being applied to the output port).

Reducing the arbitration time can significantly reduce the packet delay across a switch, thus enabling high speed implementation.

§1.2.3.1 BUFFERING TO ALLEIVIATE CONTENTION

To prevent the packets or cells losing contention for the-output port from being lost, buffering is required. There are three basic buffering strategies; namely, pure input queuing, pure output queuing and central queuing. These buffering techniques and their relative advantages and disadvantages are described below.

§1.2.3.1.1 INPUT PORT BUFFERING

Pure input queuing provides a dedicated buffer at each input port. Arbitration logic is used to decide which input port buffer will be next served. The arbitration logic may be simple (e.g., round robin in which the inlet buffers are served in order, or random in which the inlet buffers are served randomly) or complex (e.g., state dependent in which the most filled buffer is served next, or delay dependent in which the globally oldest cell is served next).

Unfortunately, with input queuing, a packet or cell in the front of the queue waiting for an occupied output channel to become available may block other packets or cells behind it which do not need to wait. This is known as head-of-line (or "HOL") blocking. A post office metaphor has been used to illustrate head-of-line (HOL) blocking in the book, M. deprycker, *Asynchronous Transfer Mode: Solution for Broadband ISDN*, pp. 133–137 (Ellis Horwood Ltd., 1991). In the post office metaphor, people (representing cells) are waiting in a line (representing an input buffer) for either a stamp window (a first output port) or an airmail window (a second output port). Assume that someone (a cell) is already at the stamp window (the first output port) and that the first person in the line (the HOL of the input buffer) needs to go to the stamp window (the first output port). Assume further that no one is presently at the airmail window (the second output port) and that the second and third people in line (cells behind the HOL cell in the input queue) want to go to the airmail window (the second output port). Although the airmail window (second output port) is available, the second and third people (cells behind the HOL cell) must wait for the first person (the HOL cell) who is waiting for the stamp window (the first output port) to become free. Therefore, as the post office metaphor illustrates, the head-of-line (HOL) cell waiting for an output port to become free often blocks cells behind it which would otherwise not have to wait. Simulations have shown that such head-of-line (HOL) blocking decreases switch throughput.

When input buffering is used, a simple round robin scheme is generally adopted in an arbiter to ensure a fair arbitration among the inputs. Imagine there is a token circulating among the inputs in a certain ordering. The input that is granted by the arbiter is said to grasp the token, which represents the grant signal. The arbiter is responsible for moving the token among the inputs that have request signals. The traditional arbiters handle all inputs together and the arbitration time is proportional to the number of inputs. As a result, the switch size or capacity is limited given a fixed amount of arbitration time.

An input-buffered crossbar switch with centralized contention resolution does not scale well for a large number of switch ports due to the centralized nature of its arbiter. Although distributed output contention resolution in a multicast packet switch may be achieved by using an arbiter for each output port, traditional arbiters handle all inputs together and the arbitration time is proportional to the number of inputs. As a result, the switch size or capacity is limited given a fixed amount of arbitration time. A crossbar switch architecture with internal speedup and distributed contention resolution was proposed recently in the article, K. Genda et al, "TORUS: Terabit-per-second ATM Switching System Architecture on Distributed Internal Speed-Up ATM Switch," *IEEE J. Select Areas Commun.*, Vol. 15, No. 5, pp. 817–29 (Jun. 5, 1997) to achieve a capacity of Terabit per second, but its contention resolution algorithm favors some of the connections and is thus unfair.

§1.2.3.1.2 OUTPUT PORT BUFFERING

Pure output buffering solves the head-of-line (HOL) blocking problems of pure input buffering by providing only the output ports with buffers. Since the packets or cells buffered at an output port are output in sequence (i.e., first in, first out, or "FIFO"), no arbitration logic is required. In the post office metaphor, the stamp window (first output port) has its own line (first output buffer) and the airmail window (second output port) has its own line (second output buffer). Since no arbitration logic is required, the delay through the switch is said to have an absolute bound.

Although pure output buffering clearly avoids HOL blocking that may occur in pure input port buffering, it does have some disadvantages. Specifically, to avoid potential cell loss, assuming N input ports, the system must be able to write N ATM cells into any one of the queues (or output buffers) during one cell time (i.e., within 2.8 microseconds, where 2.8 microseconds is (53 bytes*8 bits/byte)/155.52 Mbit/second. Such a high memory write rate is necessary because it is possible that each of the ATM cells arriving at each of the input ports will require the same output port. This requirement on the memory speed of the output buffer becomes a problem as the size of the switch (i.e., as N) increases. Accordingly, for a 1024-by-1024 switch (i.e., a switch having 1024 inputs and 1024 outputs), pure output buffering is not feasible because the speed of the output port buffers would have to be fast enough to handle 1024 cells during each time slot.

Speedup (c) of the switch fabric is defined as the ratio of the switch fabric bandwidth and the bandwidth of the input links. (Unless otherwise stated, it will be assumed that every input/output link has the same capacity.) An output queued switch is the one where the speedup is greater than or equal to the number of input ports ($c \geq n$). Since each output port can receive n incoming packets in a time slot, there is no output contention as discussed above. The switch has desirably zero input queuing delay without considering store-and-forward implementation. Unfortunately, an output queued switch is limited because the output port memory speed may limit it from buffering all possible input packets, particularly when the number of input ports is relatively large.

§1.2.3.1.3 CENTRAL QUEUING

Central queuing includes a queue not assigned to any inlet (input port) or outlet (output port). Each outlet will select cells destined for it in a first in, first out (FIFO) manner. However, the outlets must be able to know which cells are destined for them. Moreover, the read and write discipline of the central queue cannot be a simple FIFO because ATM cells destined for different outlets are all merged into a single queue. Turning again to the post office metaphor, a single line (central queue) of people (ATM cells) are waiting to visit the stamp window (a first output port) or the airmail window (a second output port). As a window opens up (i.e., as an output port becomes available), a server searches the line (central queue) for the next person (ATM cell) needing the available window (requiring the available output port). The server brings that person (ATM cell) to the open window (available output port) regardless of whether the person (the ATM cell) is at the front of the line (HOL). As the post office metaphor illustrates, the central queue requires complex memory management system given the random accessibility required. Of course, the memory management system becomes more complex and cumbersome when the number of output ports (i.e., the size of the switch) increases.

§1.2.3.1.4 INPUT AND OUTPUT PORT BUFFERING

An input-output queued switch will result by an input queued switch using a speedup of greater than one ($c > 1$). A recent study shows that it is possible to achieve 100% switch throughput with a moderate speedup of $c = 2$. (See, e.g., the technical publication, R. Guerin, et al., "Delay and Throughput Performance of Speed-Up Input-Queuing Packet Switches", *IBM Research Report RC* 20892, (June 1997).) Since each output port can receive up to c cells in a time slot (each input port can send up to c cells during the same time), the requirement on the number of input-output matching found in each arbitration cycle (c cycles in a time slot) may possibly be relaxed, enabling simpler arbitration schemes. On the other hand, the arbitration time is reduced c times, making the time constraint for arbitration more stringent.

An input queued switch has no speedup (i.e., the incoming lines, switching fabric, and outgoing lines operate at the same rate) and thus is relatively simple to implement. However, as described above, it suffers the well-known problem of head-of-line (HOL) blocking (See, e.g., the article, M. Karol, et al., "Input Versus Output Queuing on a Space Division Switch", *IEEE Trans. Comm.*, Vol. 35, No. 12, pp. 1347–1356 (1987).), which could limit its maximum throughput to about 58% when it uses first-in-first-out (FIFO) at each input port and operates under uniform traffic (i.e., the output address of each packet is independently and equally distributed among every output). Many techniques have been suggested to reduce the HOL blocking, for example, by considering the first K cells in the FIFO, where K>1. (See, e.g., the article, M. Karol, et al., "Queuing in High-Performance Packet-Switching", *IEEE J. Select. Area in Comm.*, Vol. 6, pp. 1587–1597 (December 1988).) The HOL blocking can be eliminated entirely by using virtual output queuing (VOQ), where each input maintains a separate queue for each output. (See, e.g., the article, Y. Tamir, et al., "High Performance Multi-Queue Buffers for VLSI Communication Switches", *Proc. of 15th Ann. Symp. on Comp. Arch.*, pp. 343–354 (June 1988).) Referring to FIG. 9 for example, each input queue 910 maintains a separate queue 912 for each output port 930.

To achieve 100% throughput in an input-queued switch with virtual output queues, sophisticated arbitration is used to schedule packets between various inputs and outputs. This may be accomplished by applying bipartite graph matching (See, e.g., the Anderson article.) in which each output must be paired with at most one input that has a cell destined for that output; a complex procedure to implement in hardware. It has been shown that an input buffered switch with virtual output queues can provide asymptotic 100% throughput using a maximum matching (a match that pairs the maximum number of inputs and outputs together. There is no other pairing that matches more inputs and outputs (See, e.g., the Anderson article.) algorithm. (See, e.g., the article, N. McKeown et al., "Achieving 100% Throughput in an Input-Queued Switch", *Proc. IEEE INFOCOM*, pp. 296–302 (1996).) However, the complexity of the best known maximum matching algorithm is exponential (i.e., $O(n^{2.5})$) (See, e.g., the technical publication, R. Tarjan, *Data Structures and Network Algorithms*, Bell Labs (1983).), which is too high for high speed implementation for relatively large n. In practice, a number of maximal matching (a match for which pairings cannot be trivially added; each node is either matched or has no edge to an unmatched node (See, e.g., the Anderson article.)).

Algorithms for matching input and output nodes have been proposed, such as parallel iterative matching (PIM) (See, e.g., the Anderson article.) and iterative round robin matching (iSLIP) (See, e.g., the McKeown article.). For example, in the technique discussed in the McKeown article, each input port sends multiple requests to different output ports—one for each head of line cell of in each of the virtual output queues. Then, at each output port, an arbiter chooses an input port which wins contention and sends a grant signal to the corresponding input. Since, an input port may receive more than one grant signal, an arbiter at the input port chooses one and sends an acceptance signal to the corresponding output port. Although the ISLIP technique disclosed in the McKeown article is advantageous in that the arbiters become desynchronized, it does require a lot of communications between the input and output ports. Moreover, each of the arbitrations is on the order of the number of output ports N.

Thus, better arbitration methods, and apparatus for implementing such methods, are needed.

§1.2.4 NEEDS NOT MET BY KNOWN CONTENTION RESOLUTION SCHEMES

As just stated above, there are several methods which perfectly emulate purely output queuing under a moderate speedup factor (2–4) so that ideal packet scheduling can be realized at outputs. These methods consider the states of output packet scheduling as the arbitration priority, and iterative stable matching is needed to ensure perfect emulation. While these methods might be the future choice for perfect scheduling and providing delay bounds, their time complexities of at least the order of the number of output ports N matching iterations is infeasible with existing electronic technology for a Terabit per second switch. Together with some sorting time required to emulate the desired fair queuing, the total time budget can be as large as implementing N simple arbitrations. The enormous state maintenance and the large amount of state information exchange between inputs and outputs also make it impractical to implement perfect emulation of fair queuing with stable matching.

§2. SUMMARY OF THE INVENTION

In the present invention, the arbitration may be separated from the output packet scheduling to keep the implementation and time complexities reasonable. Although no absolute delay bounds can be obtained when the arbitration is separated from the output scheduling and perfect emulation of output queuing cannot be realized, delay bounds are still attainable in the statistical sense. A delay bound is said statistical if the portion of packets with an undesired delay is bounded by an acceptable probability. Relaxing the delay bound requirement from absolute bounds to statistical bounds should not cause a significant performance degradation because, even if the delay bound is absolutely guaranteed, some cells may still be lost due to buffer overflow and other reasons. The statistical delay bound can be achieved and the exceptional probability can be controlled to be as small as the packet loss rate under some speedup factors and certain traffic circumstances.

The present invention may use a novel dual round robin (DRR) arbitration scheme in which input selection and output contention resolution are separately handled by two independent sets of round-robin arbiters. Among the virtual output queues (VOQs) maintained at each input, a cell is selected in a round-robin manner to be the request for output contention resolution. The selected cell keeps contending until winning a token, and then the next cell is selected. Compared with first-in-first-out (FIFO) input queuing, the novel dual round robin arbitration scheme reduces the destination correlation of the cell arrival sequence for output contention resolution and thus, significantly improves the delay performance of bursty traffic.

The present invention may meet stringent arbitration time constraints to resolve output port contention by using a novel token tunneling arbitration scheme for output port contention resolution. This scheme is a variation of the ring reservation method proposed in the article, B. Bingham et al, "Reservation-Based Contention Resolution Mechanism for Batcher-Banyan Packet Switches", *Electronic Letters*, Vol.

24, No. 13, pp. 772–3 (June 1988) and is fair. The arbitration time of the ring reservation method is proportional to the number of switch ports. With token tunneling arbitration, it is possible to reduce the arbitration time to the order of the square root of the number of ports. The ring reservation method proposed in the Bingham article is implemented using sequential logic. On the other hand, the token tunneling arbitration scheme of the present invention is implemented with combinational logic that makes it even faster. Thus, the present invention has a comparable delay in the basic arbitration unit as the bi-directional arbiter described in the article, K. Genda et al, "A 160 Gb/s ATM Switching System Using an Internal Speed-Up Crossbar Switch", *Proc. GLOBECOM'* 94, pp. 123–33 (November 1994). However, the overall arbitration delay is much smaller with the present invention because of the token tunneling method. Furthermore, the present invention may be implemented with only two pins per output port, compared to six in the switch discussed in the Genda article. Crossbar chips are generally pad-limited and therefore the number of pins required per port determines the number of ports that can be accommodated in a single chip.

§3. BRIEF DESCRIPTION OF THE DRAWINGS

FIGS. 14(a) through 14(e) illustrate the interaction between an input port controller and a column of associated crosspoint units.

Figure 15:
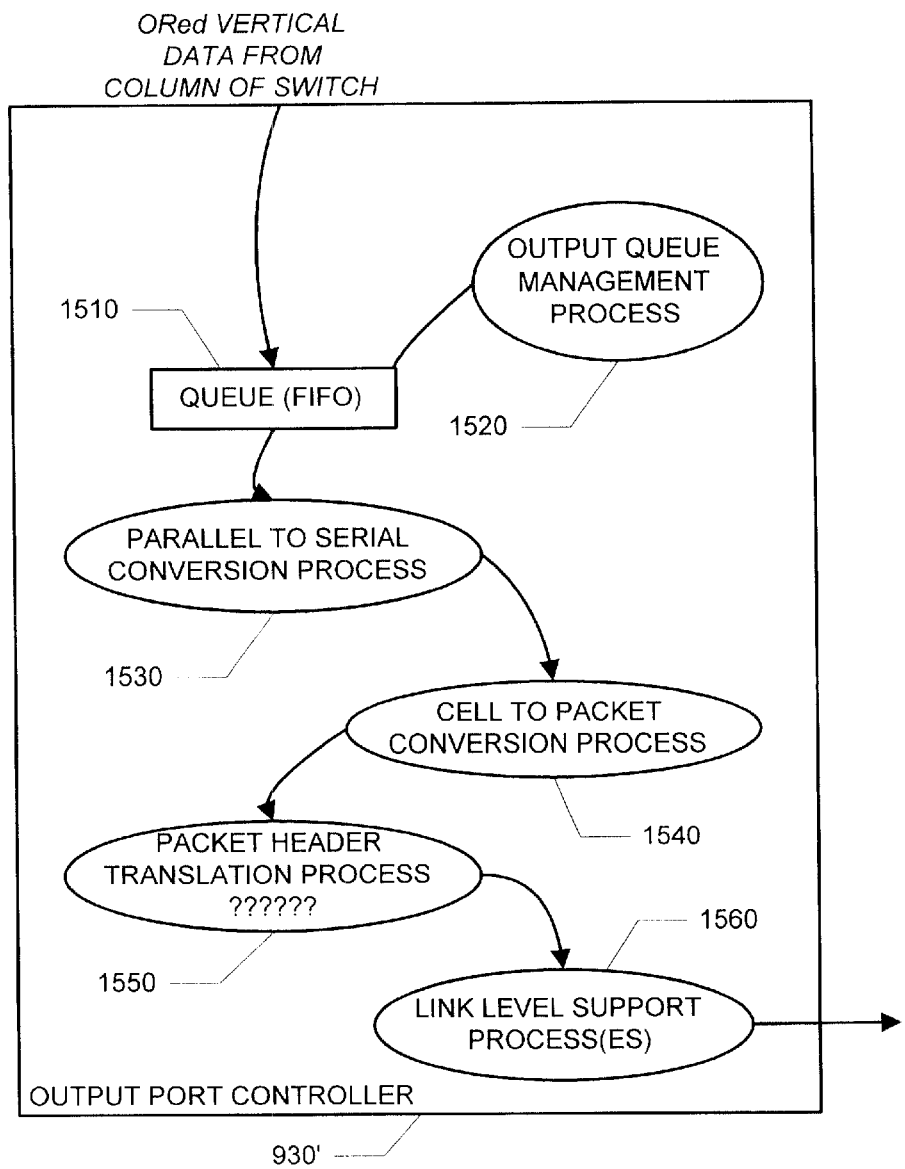

FIG. 15 illustrates processes which may be performed by an output port controller.

Figure 16:
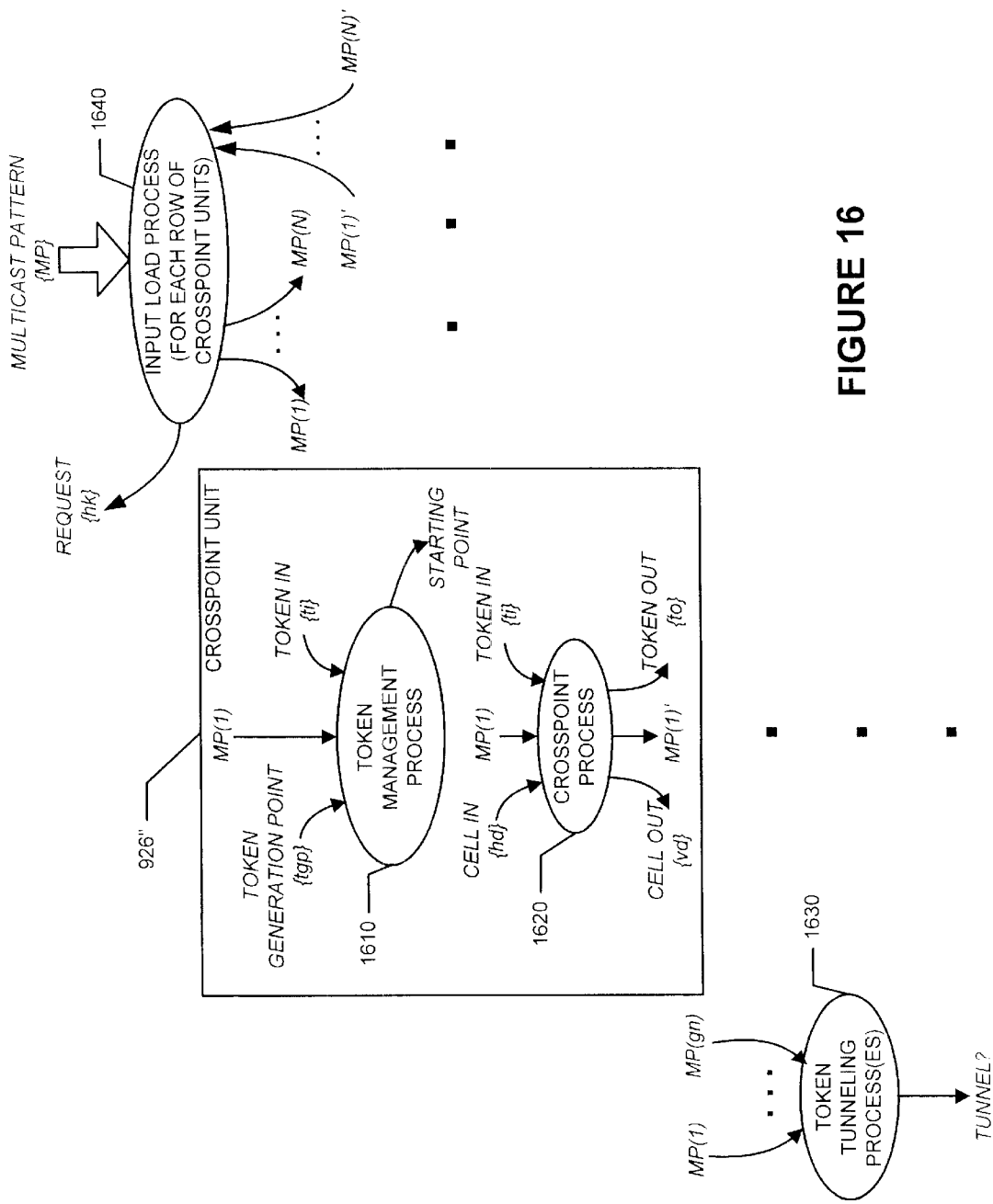

FIG. 16 illustrates processes which may be performed by a crosspoint unit, as well as processes which may be performed by a row or column of crosspoint units.

Figure 17:
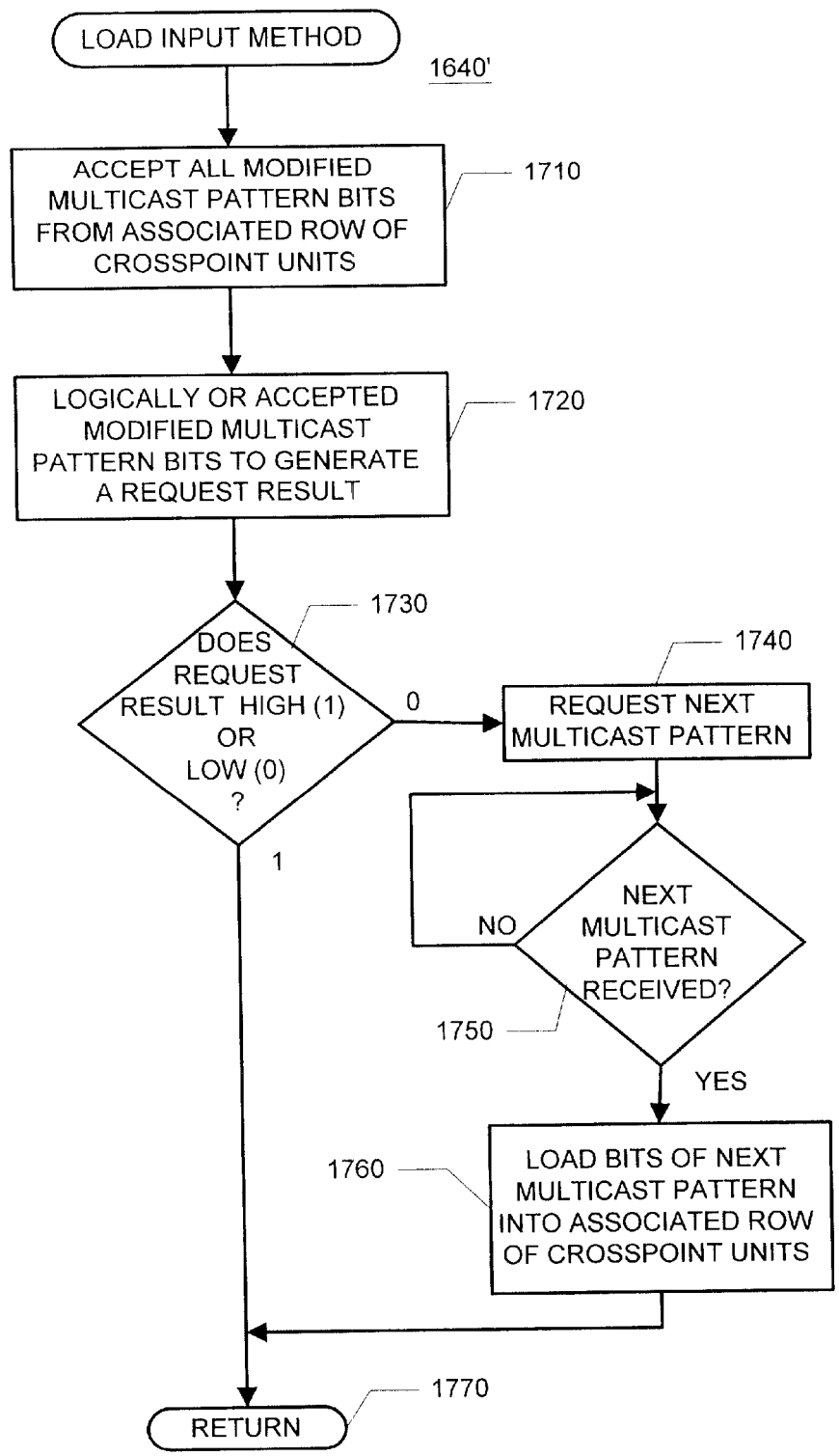

FIG. 17 is a flow diagram of an exemplary method for loading information from an input port controller to crosspoint units of an associated row.

Figure 18:
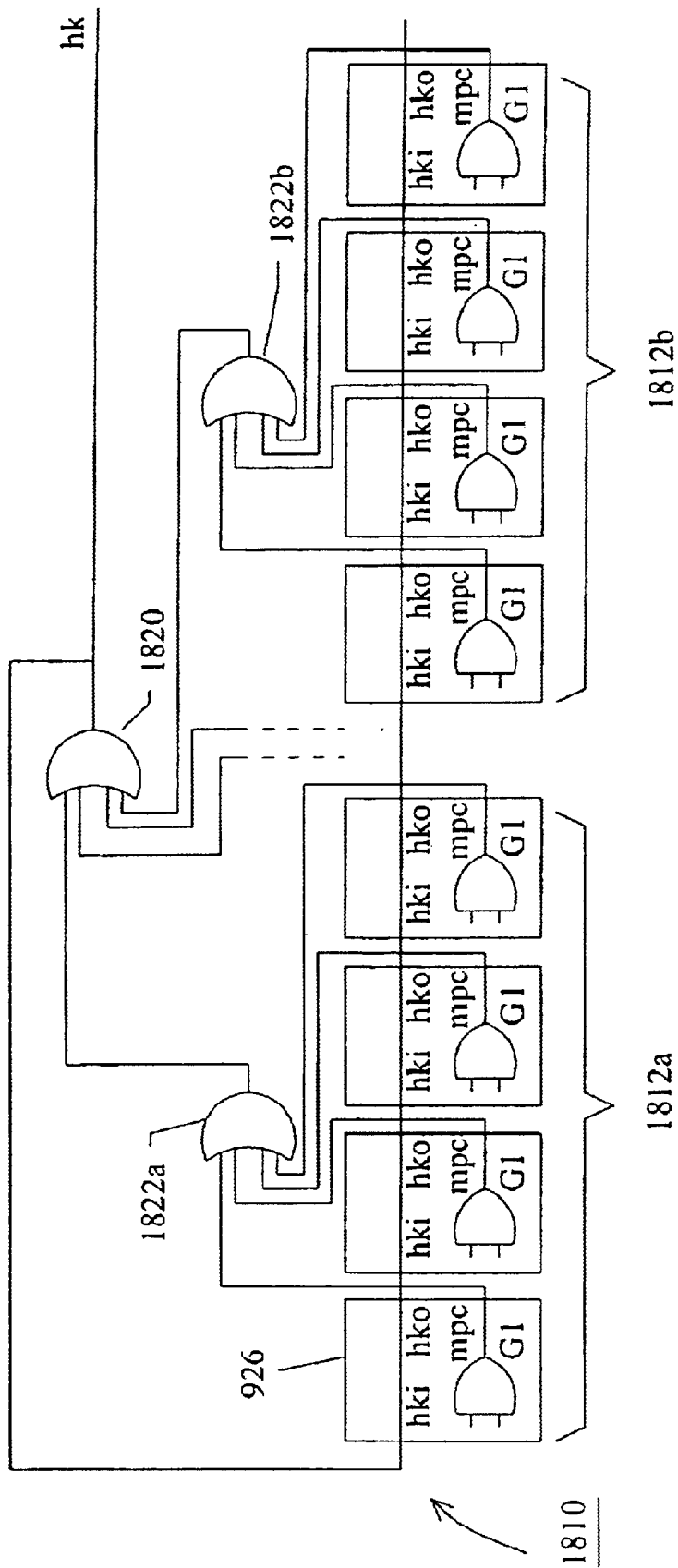

FIG. 18 is a block diagram of circuitry for generating a handshake signal from a row of crosspoint units.

Figure 19:
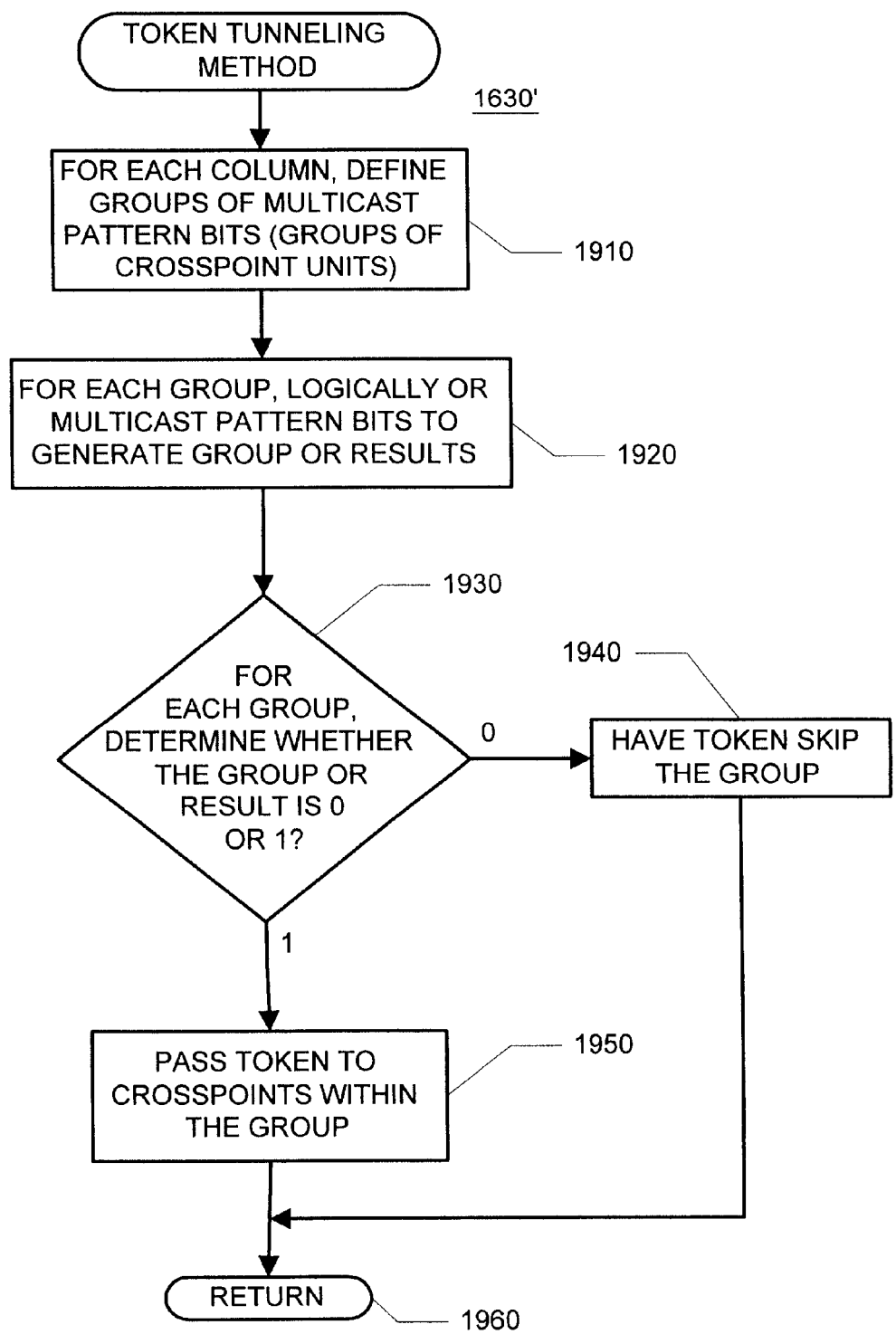

FIG. 19 is a flow diagram of an exemplary method for optimizing a round robin arbitration.

Figure 20B:
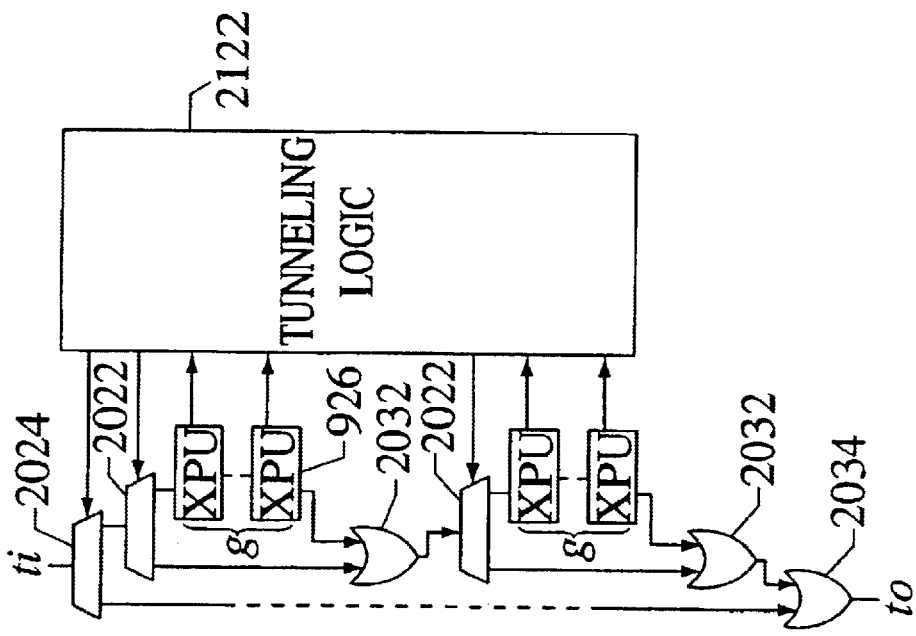
Figure 20A:
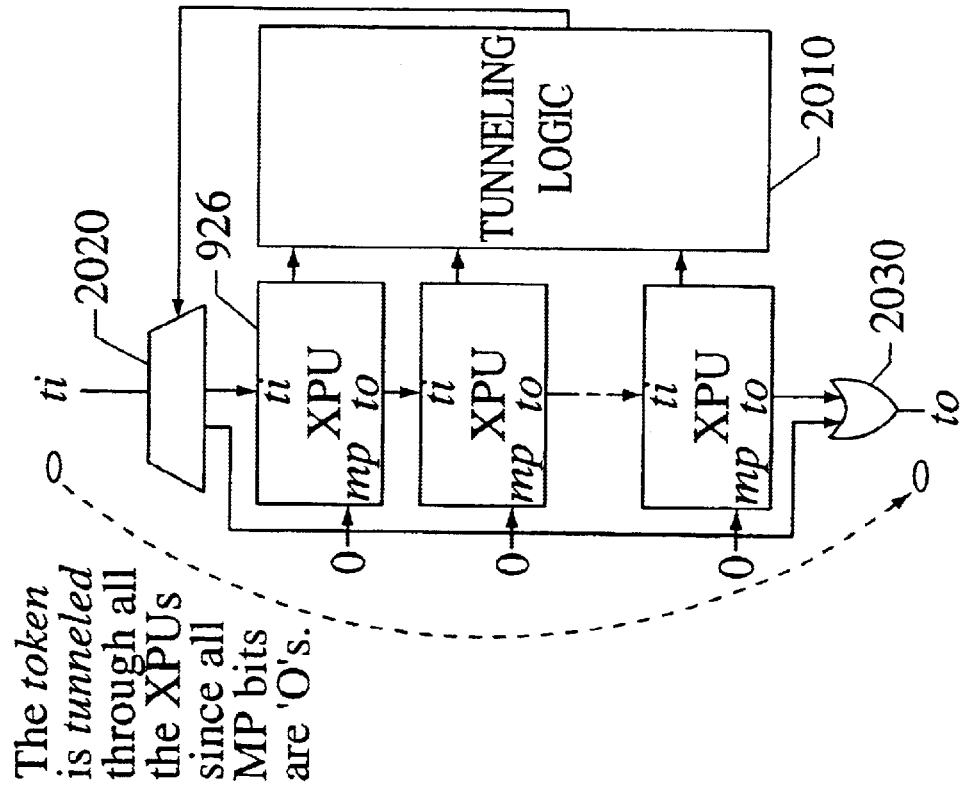

FIGS. 20(a) and 20(b) are block diagrams which illustrate token tunneling.

Figure 21A:
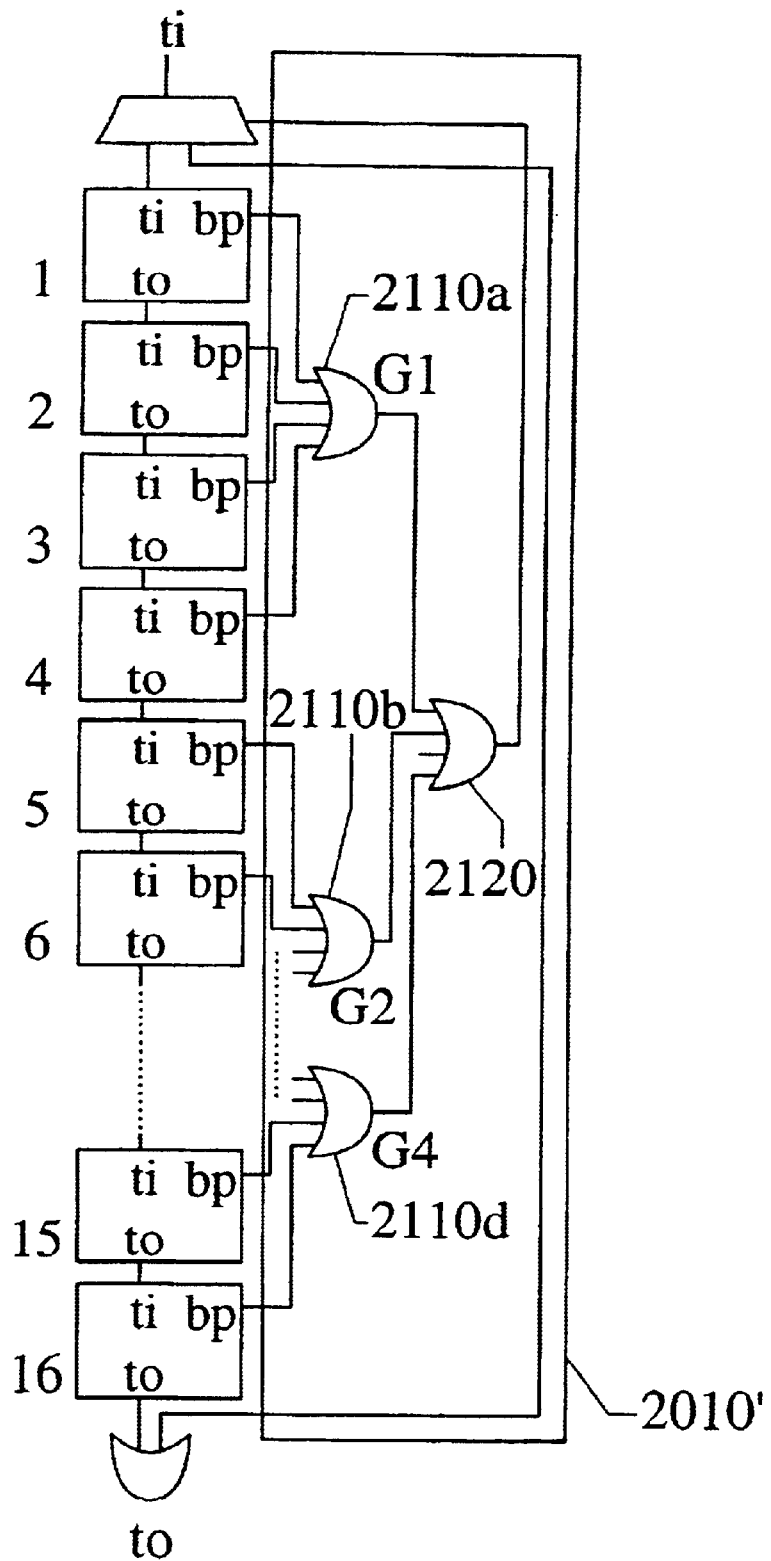
Figure 21B:
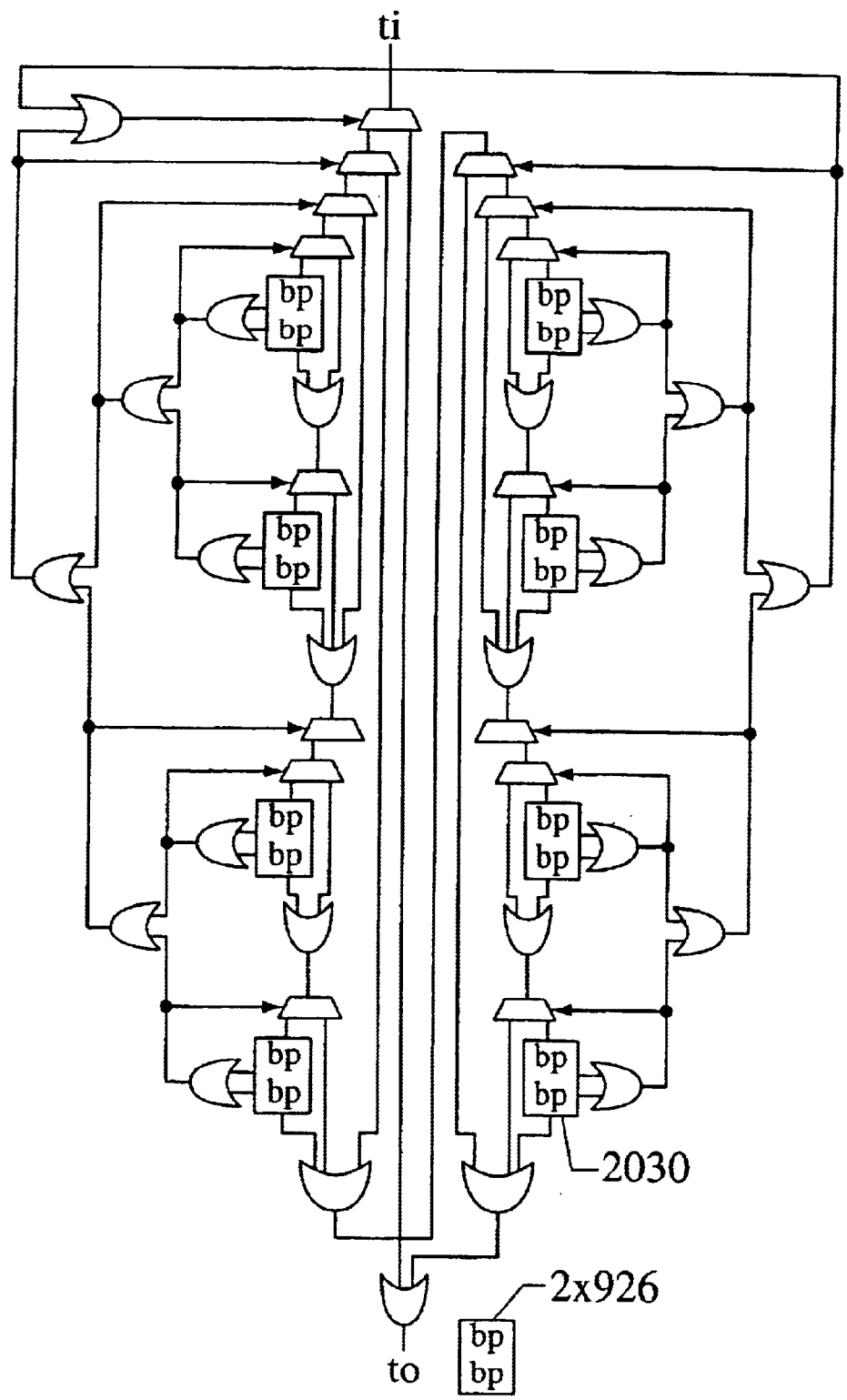

FIGS. 21(a) and 21(b) are diagrams which illustrate various types of token tunneling logic.

Figure 1:
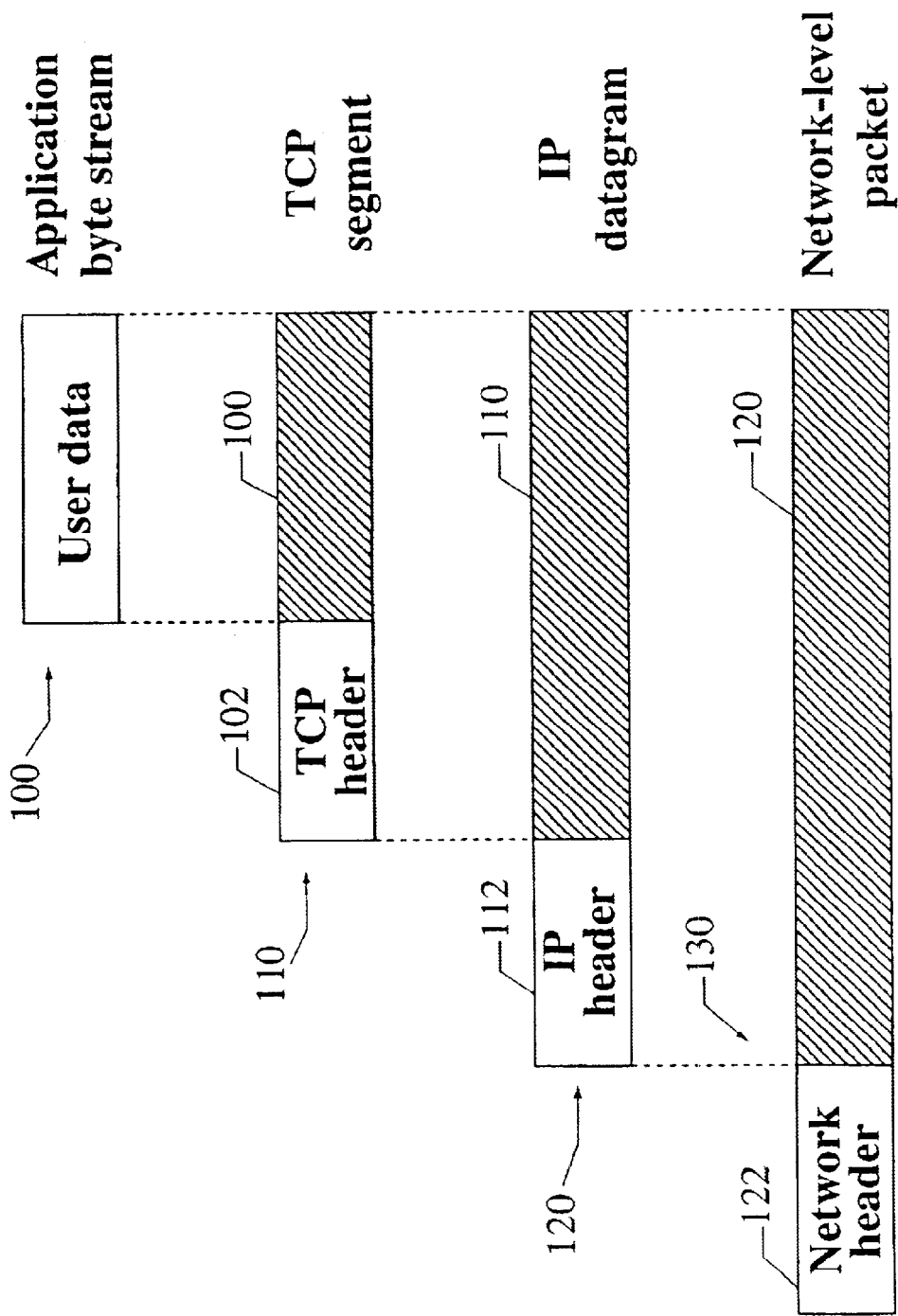
FIG. 1 illustrates producing a TCP/IP packet of data.
Figure 2:
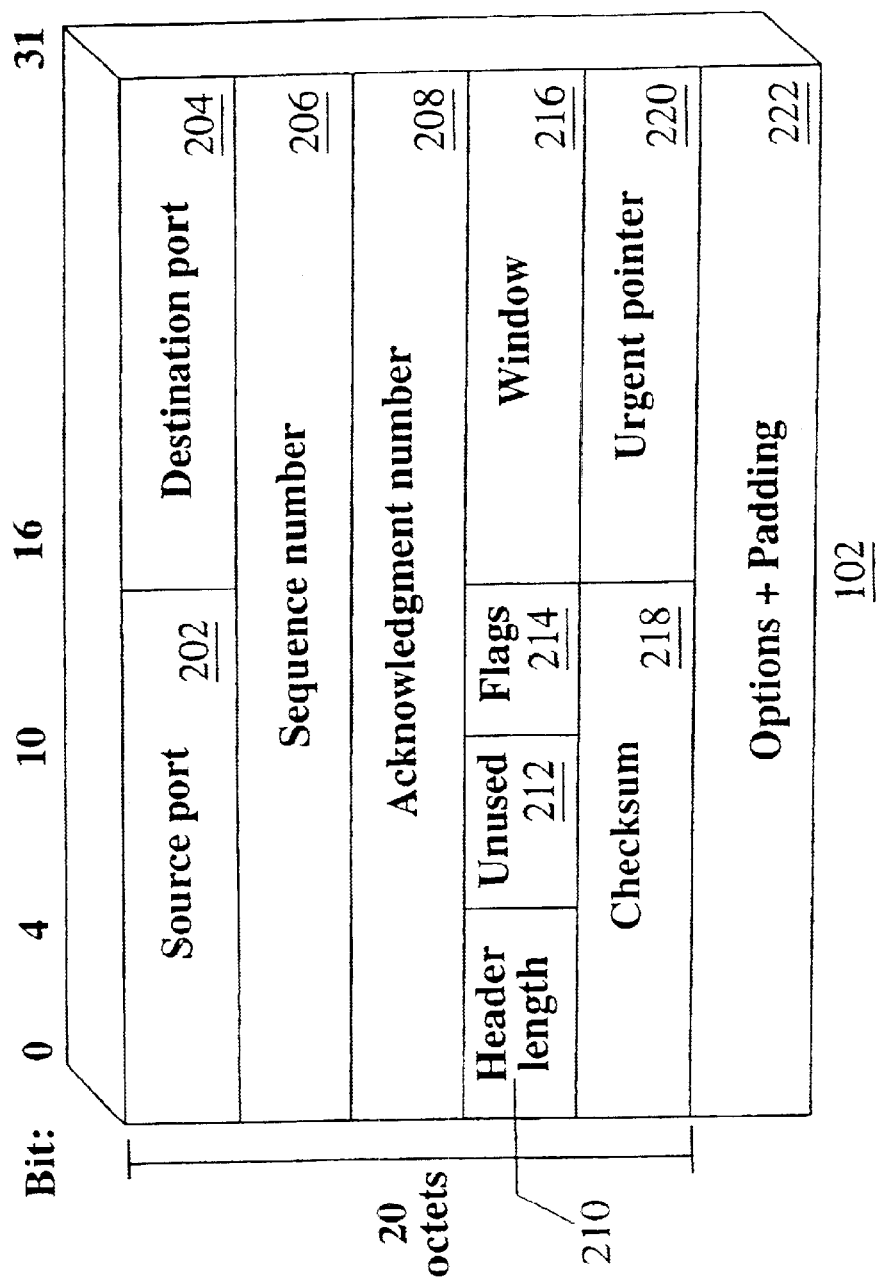
FIG. 2 illustrates a TCP/IP header.
Figure 3A:
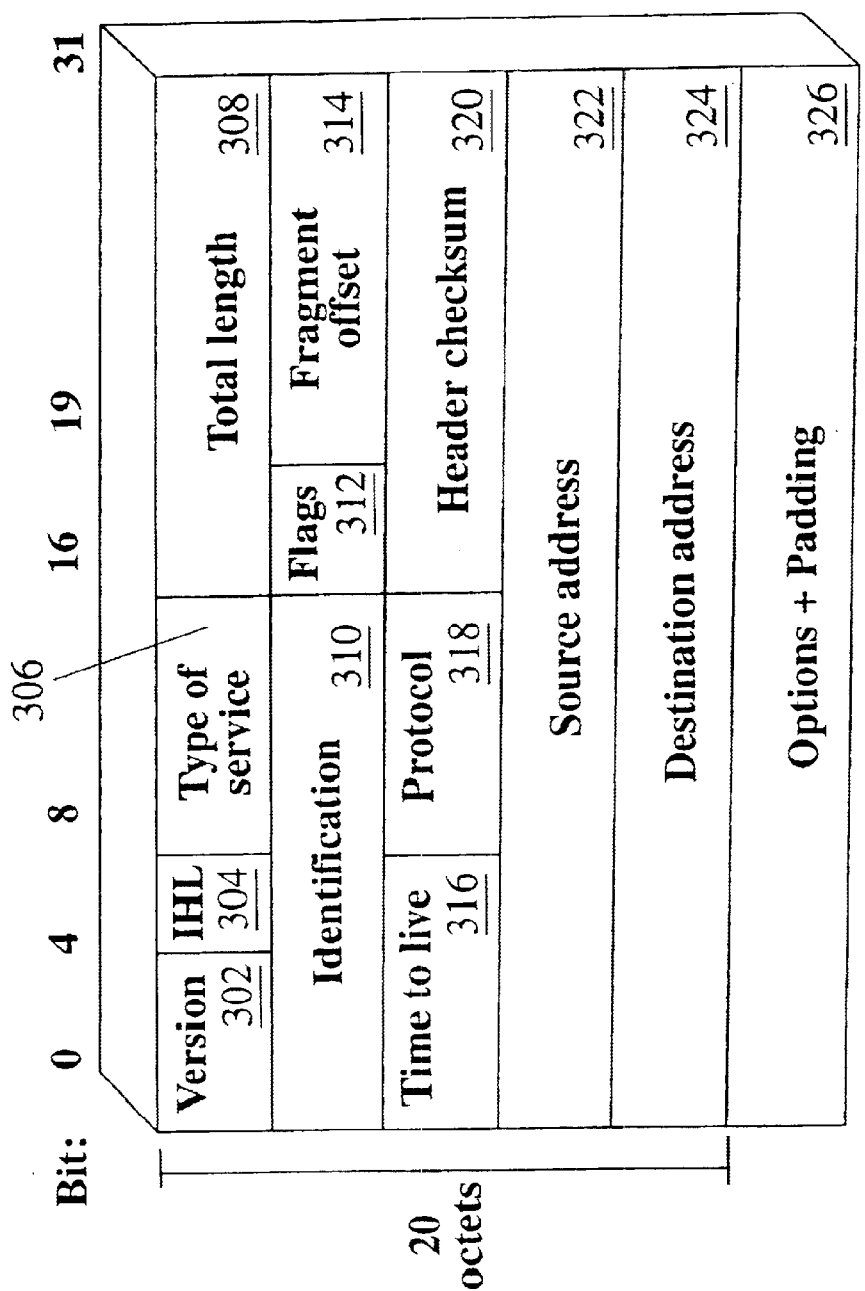
FIG. 3A depicts the IP protocol (Version 4) which has been used.
Figure 3B:
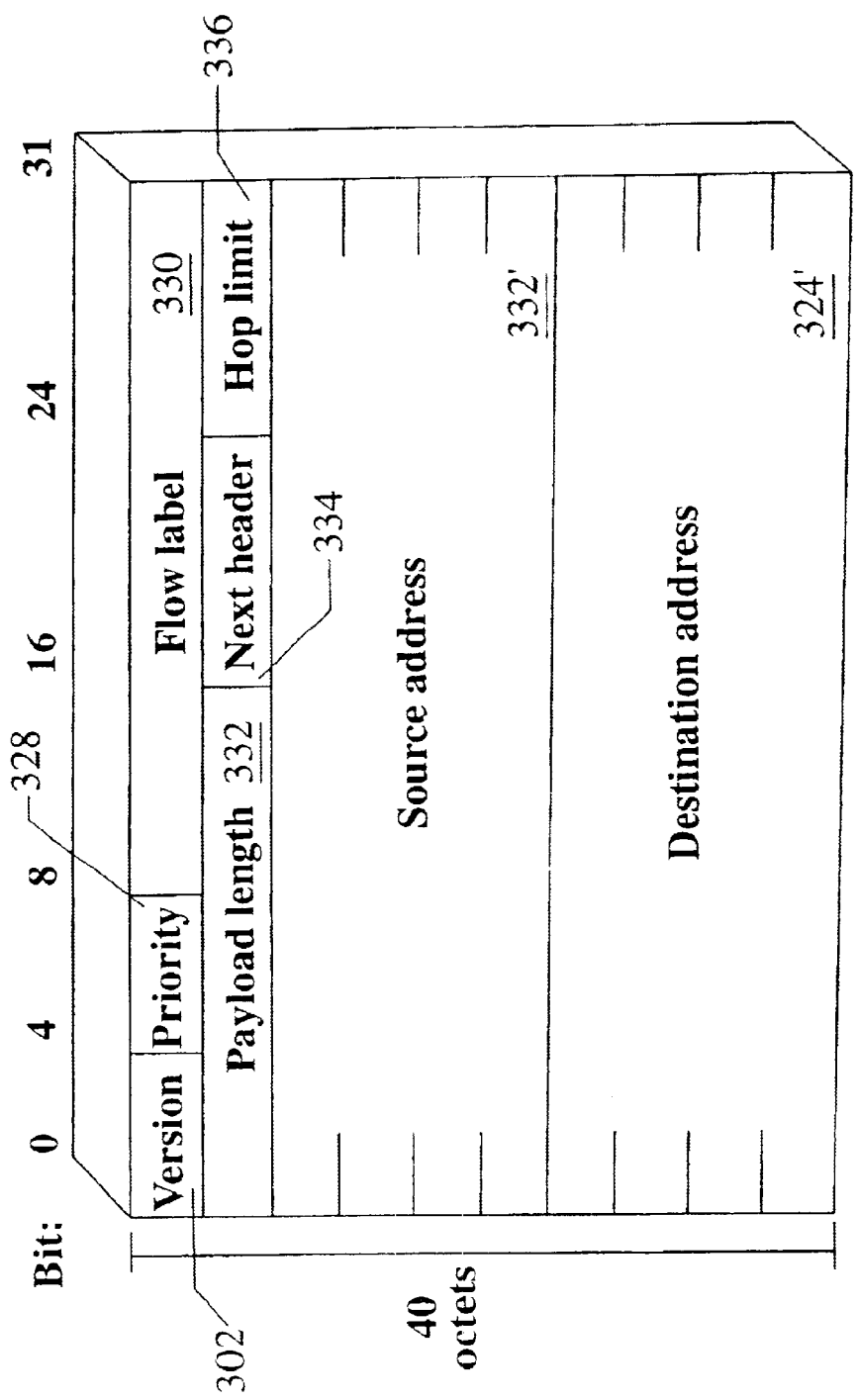
FIG. 3B depicts a next generation IP protocol (Version 6).
Figure 4A:
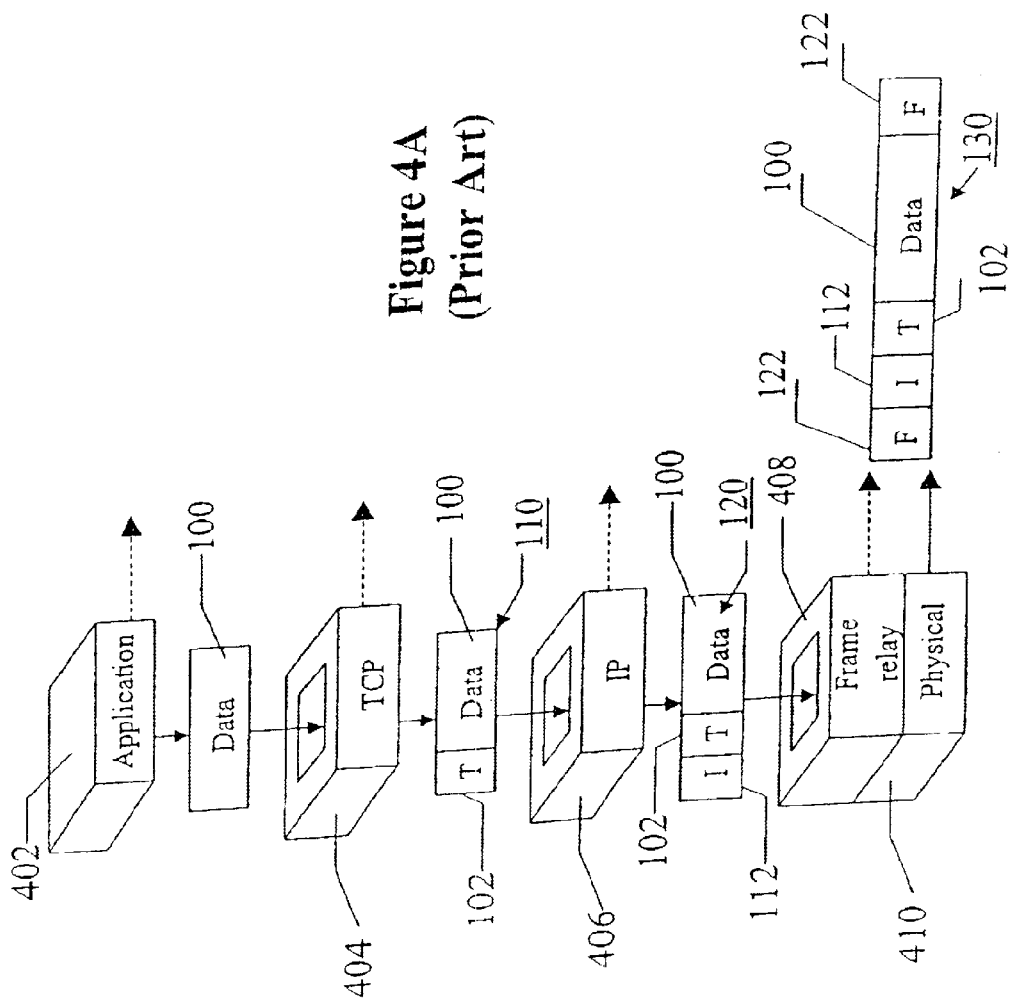
FIGS. 4A through 4C illustrate the transmission and reception of data using the TCP/IP protocol.
Figure 4B:
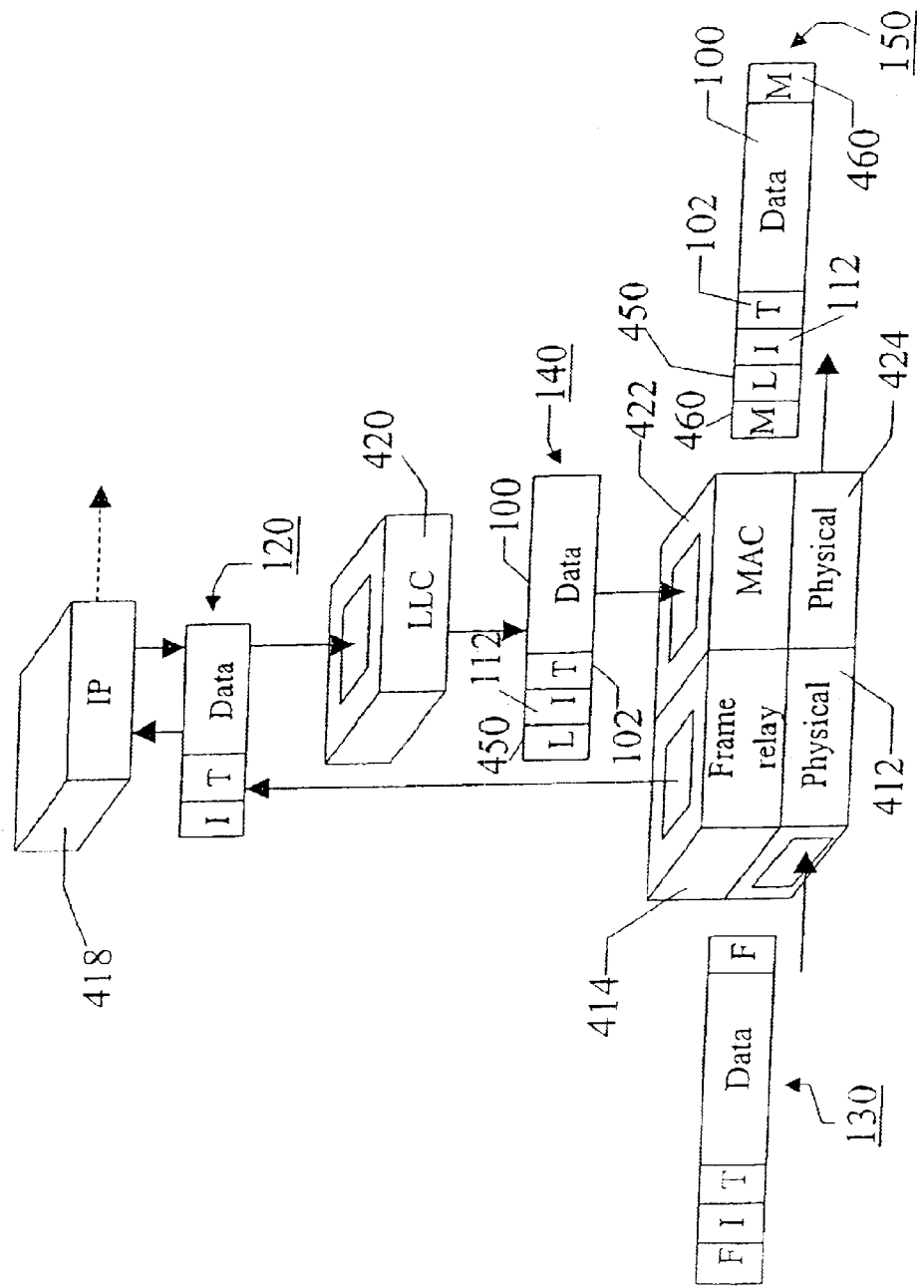
Figure 4C:
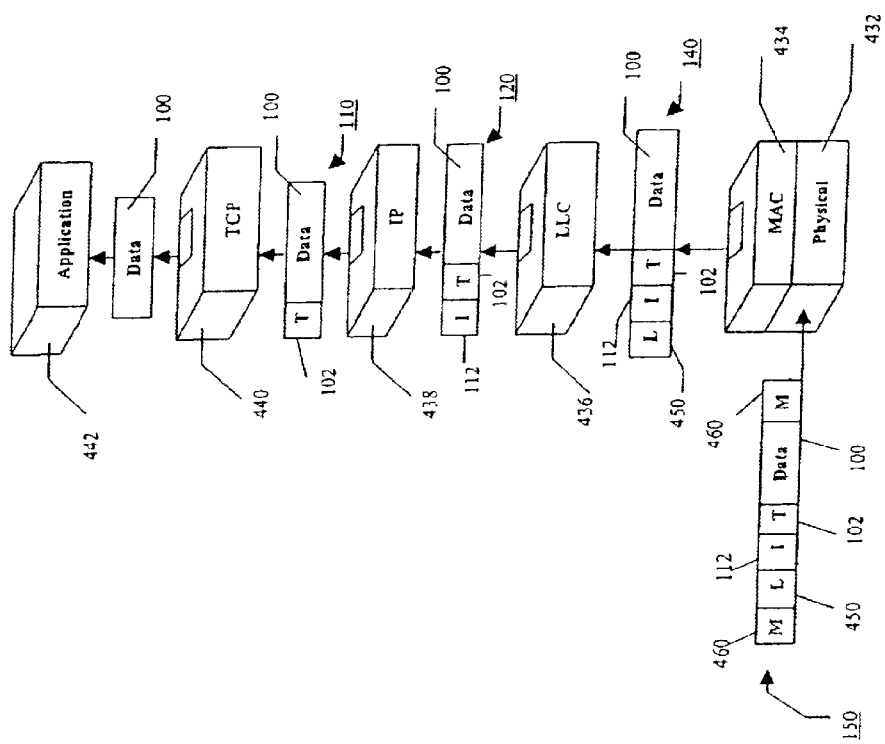
Figure 5:
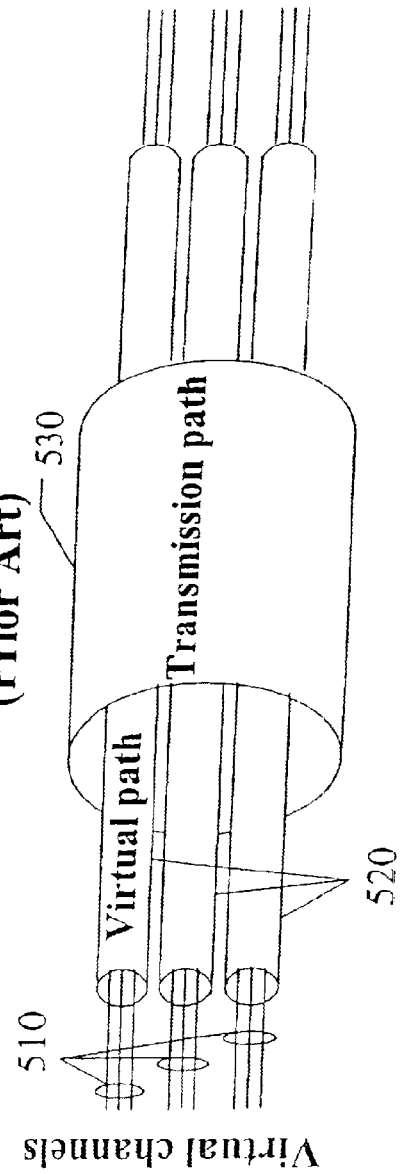
FIG. 5 illustrates virtual channels and virtual paths as defined by the asynchronous transfer mode (ATM) protocol.
Figure 6:
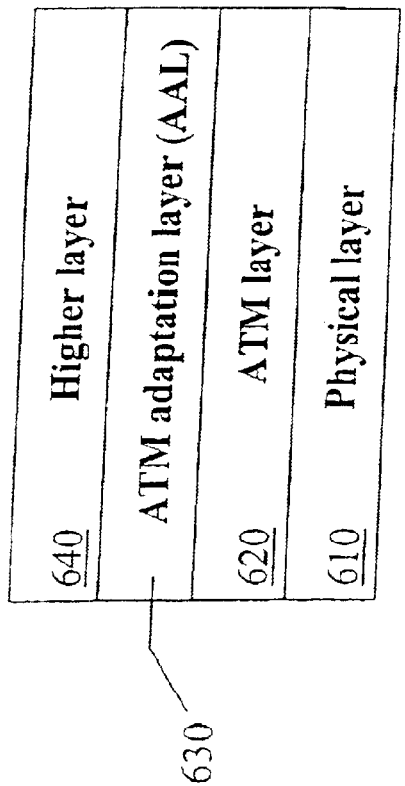
FIG. 6 illustrates ATM protocol layers.
Figures 7A, 7B:
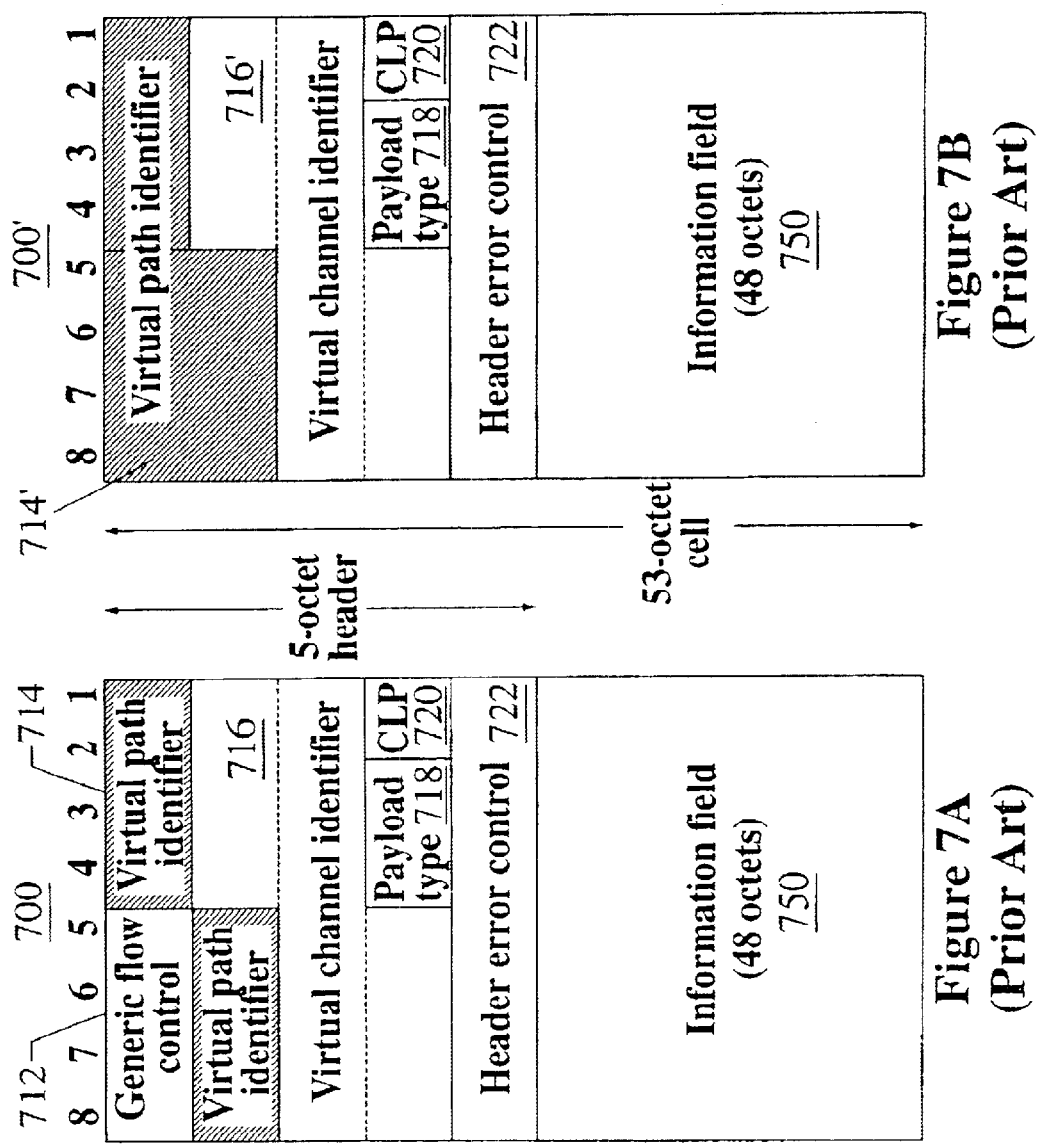
FIG. 7A illustrates an ATM cell having a header as formatted at a user-network interface.
FIG. 7B illustrates the ATM cell having a header as formatted internal to the network.
Figure 8:
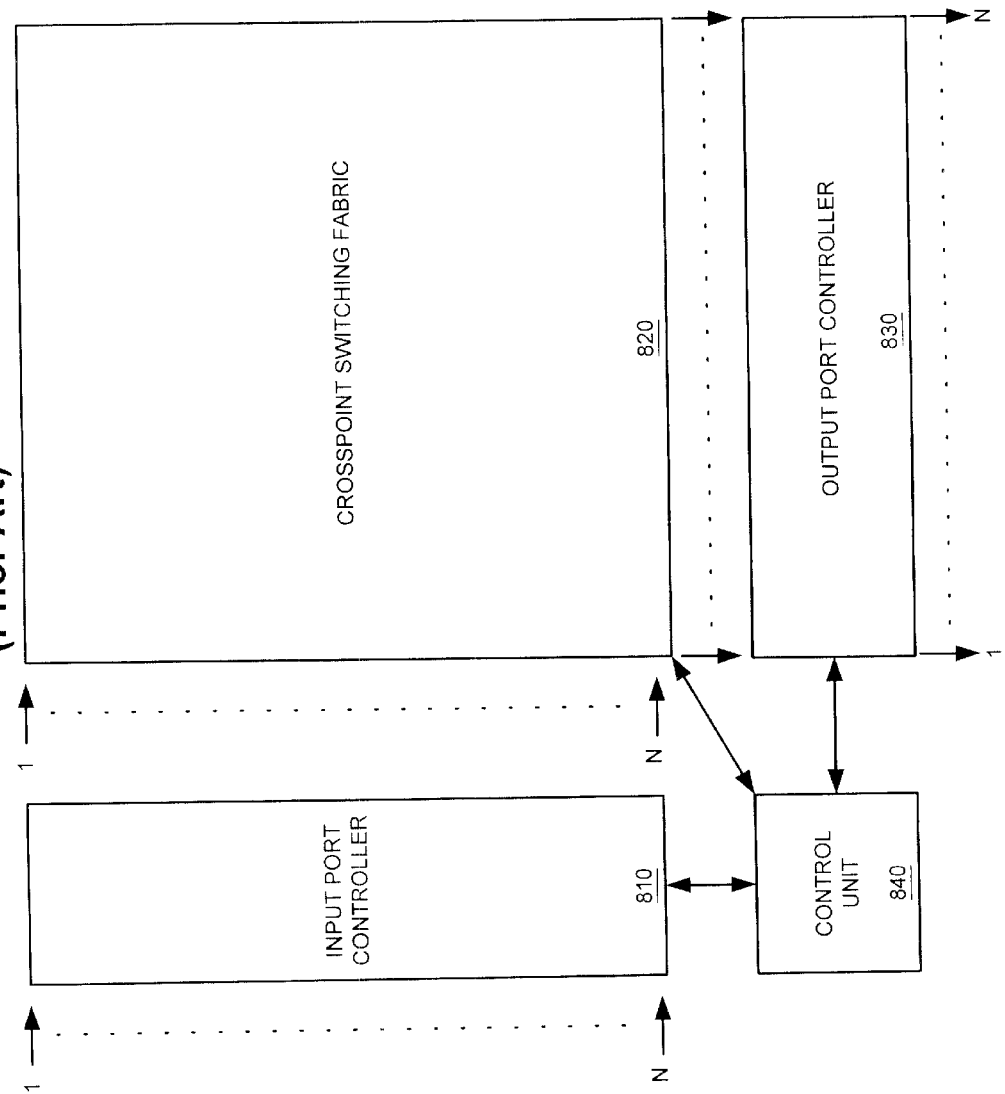
FIG. 8 is a high level block diagram of a packet switch.
Figure 22A:
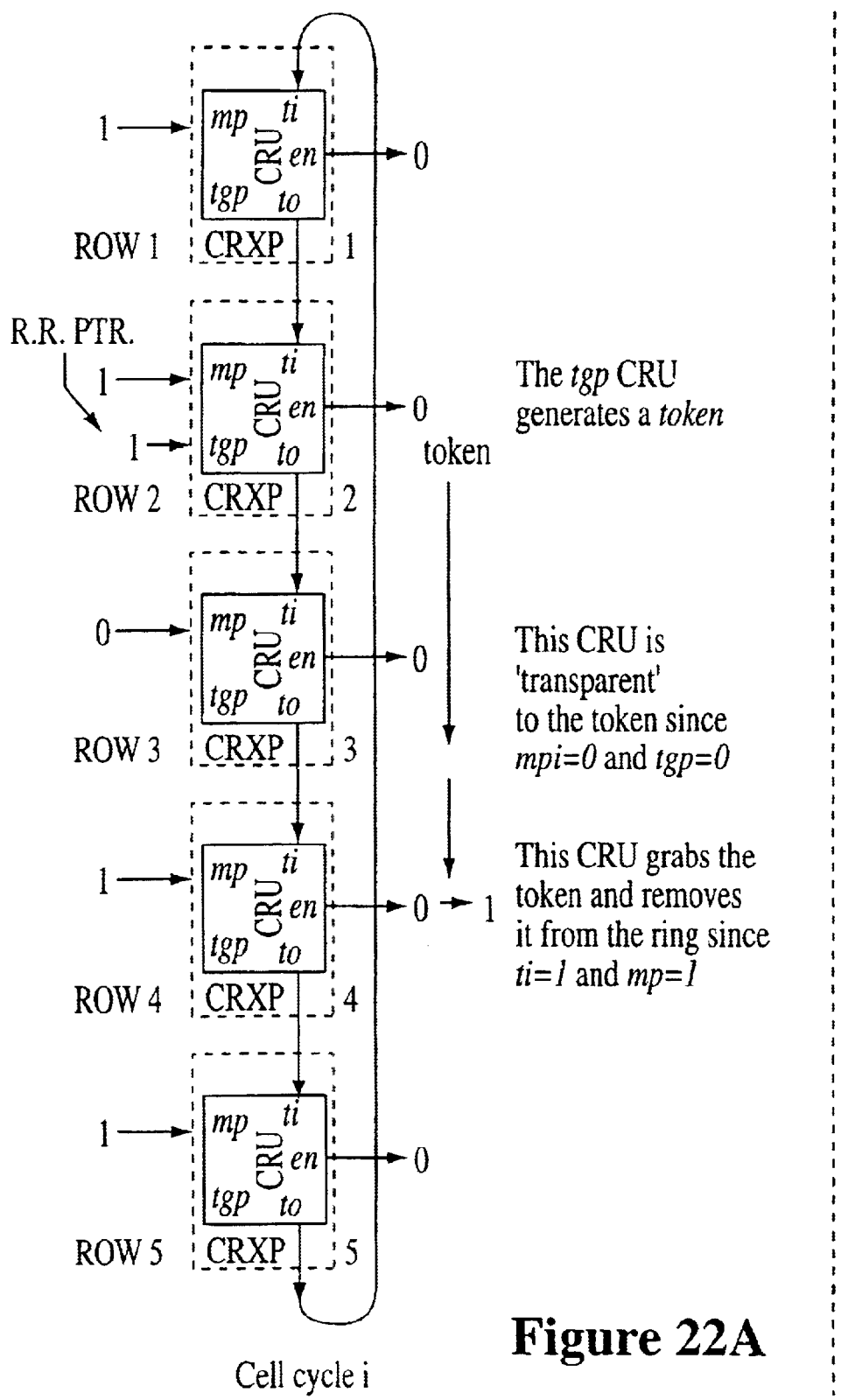

FIGS. 22(a) and 2(b) illustrate generating and passing a token in a round robin, ring reservation, arbitration scheme.

Figure 23:
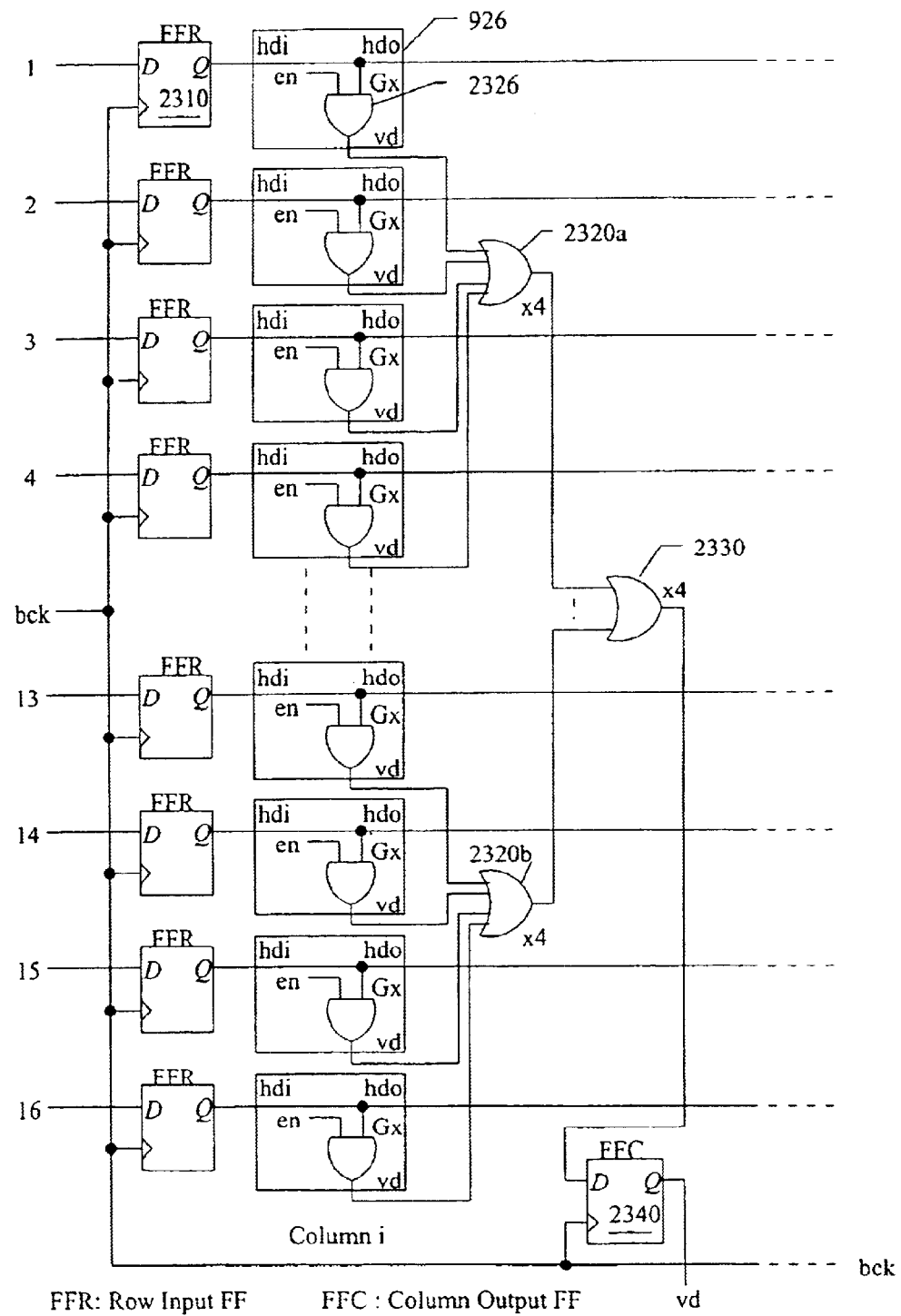

FIG. 23 is a block diagram which illustrates a crosspoint function.

Figure 24:
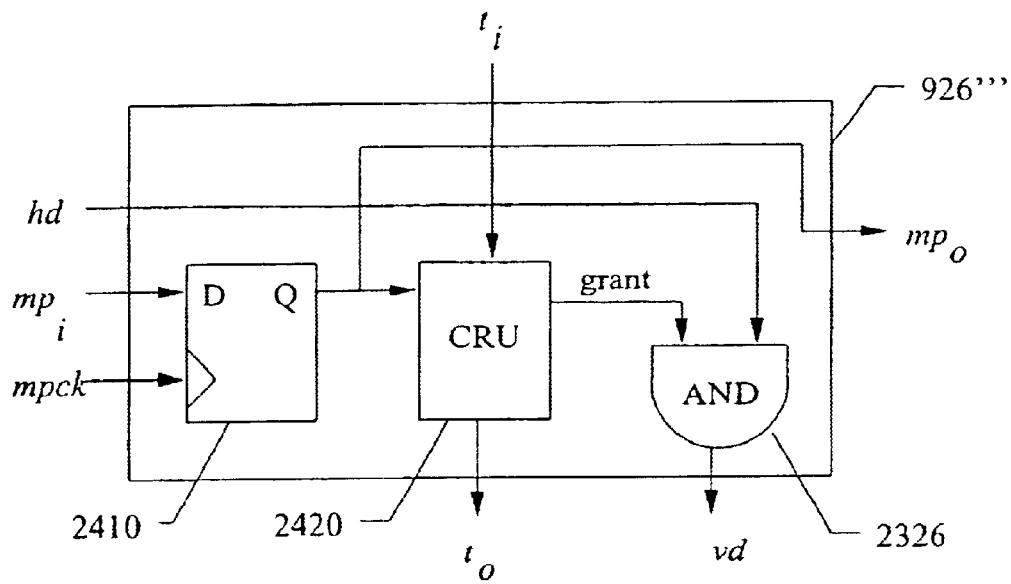

FIG. 24 is a high level block diagram of an exemplary crosspoint unit.

Figure 25:
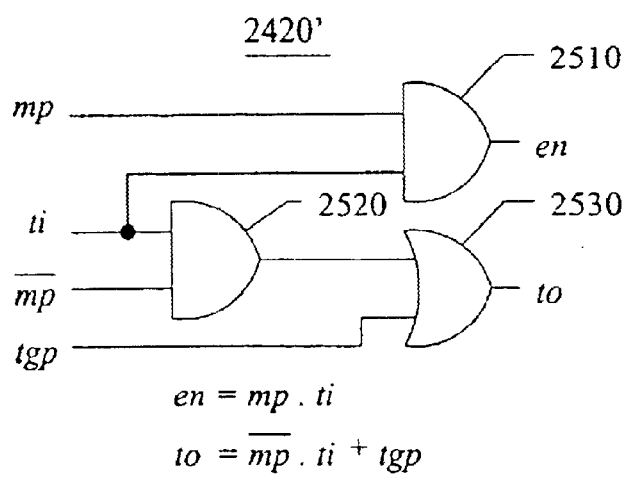

FIG. 25 illustrates logical operations that may be performed by a crosspoint unit.

Figure 26:
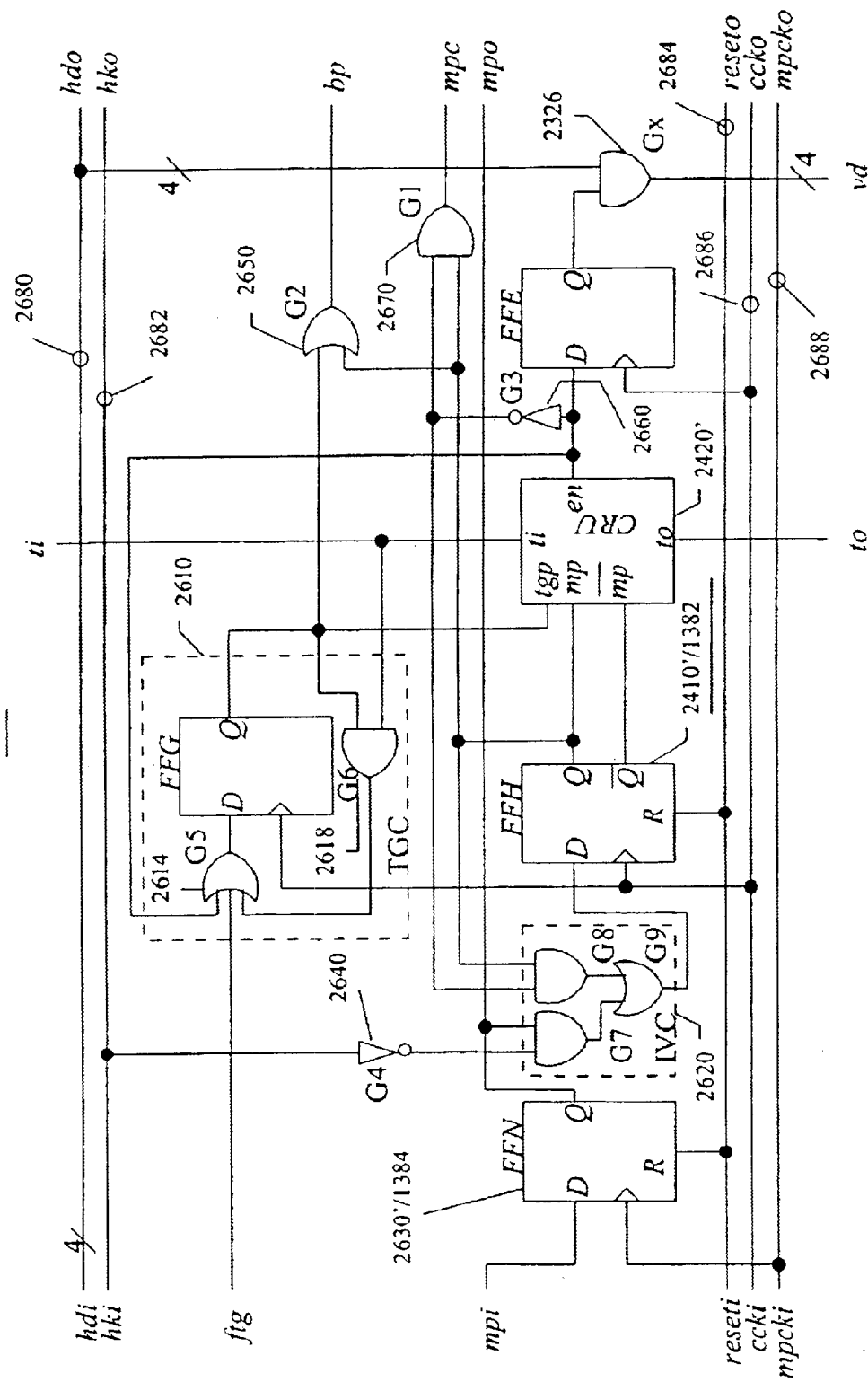

FIG. 26 is a diagram of an exemplary crosspoint unit.

Figure 27:
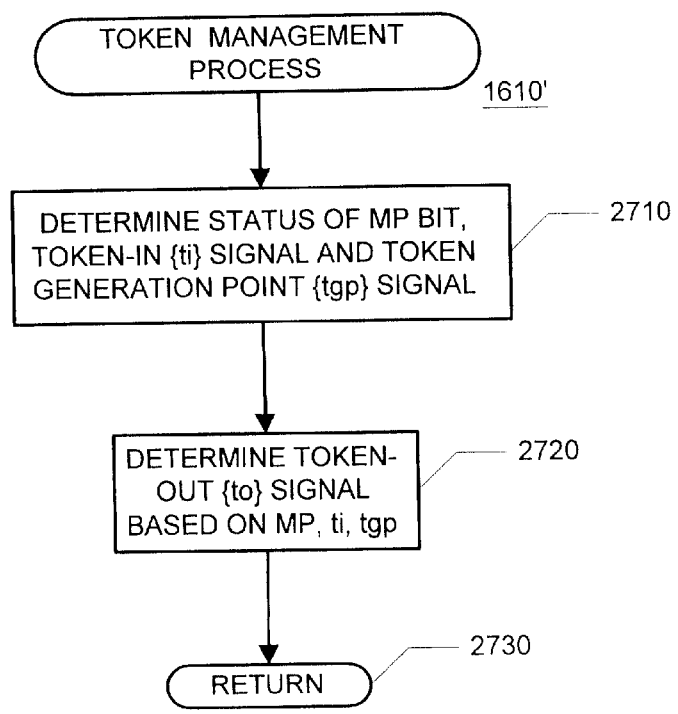

FIG. 27 is a flow diagram of an exemplary method for effecting a token management process.

Figure 28:
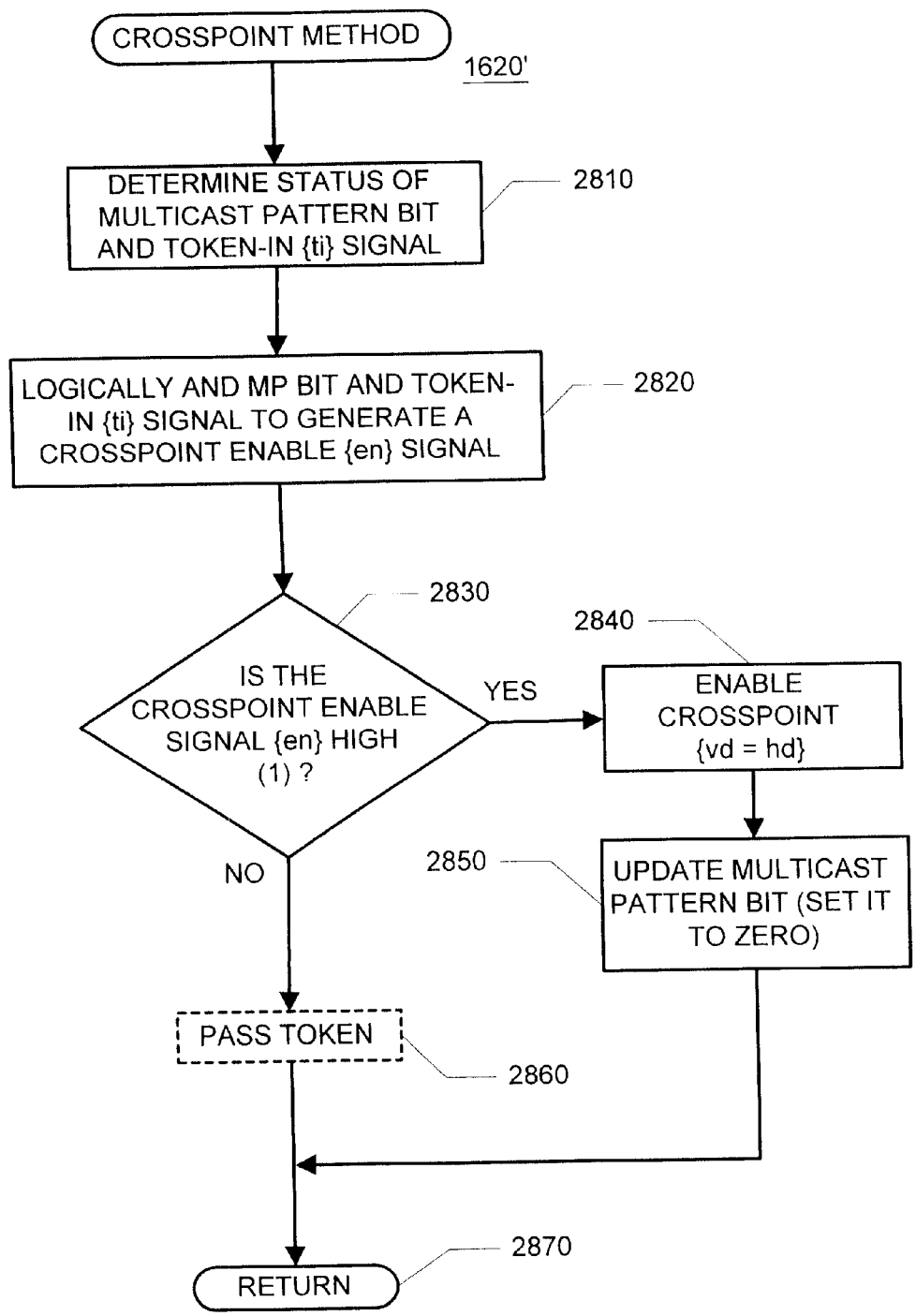

FIG. 28 is a flow diagram of an exemplary method for effecting a crosspoint function process.

Figure 29:
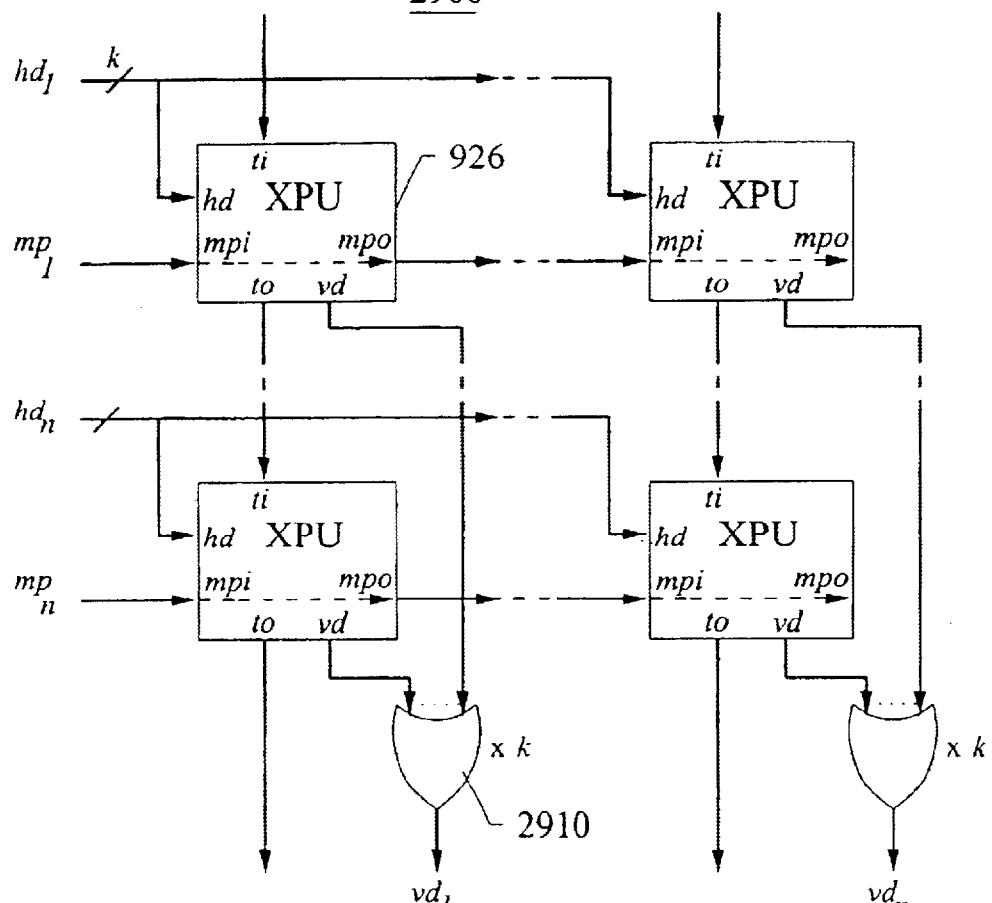

FIG. 29 is a block diagram of the arrangement of crosspoint units on a crosspoint chip.

Figure 30:
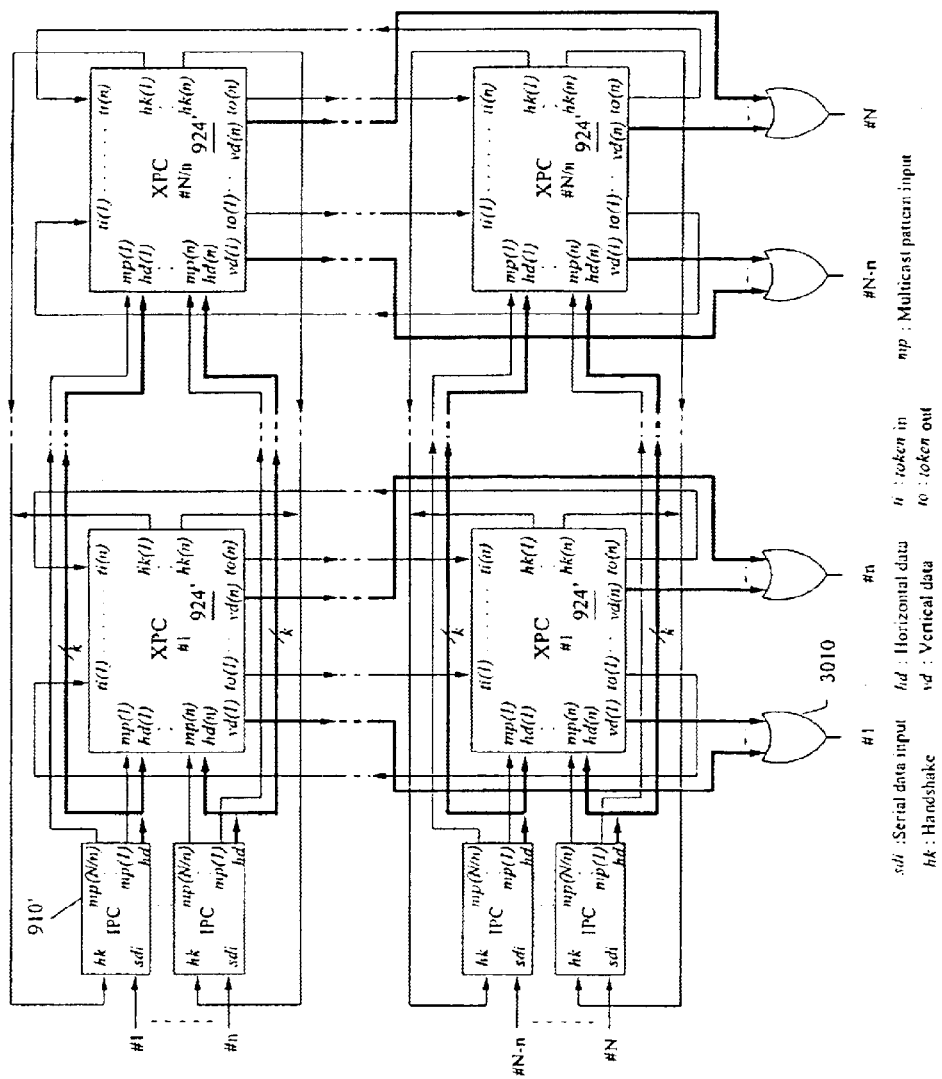

FIG. 30 is a block diagram of the arrangement of crosspoint chips on a switch plane.

Figure 31:
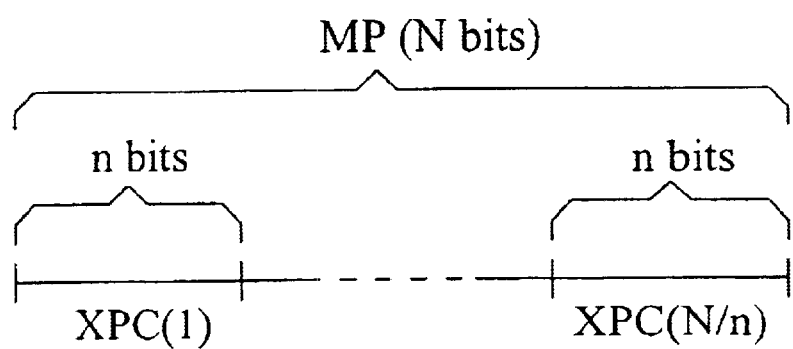

FIG. 31 illustrates the loading of multicast pattern bits of a head of line cell to a row of crosspoint chips.

Figure 32:
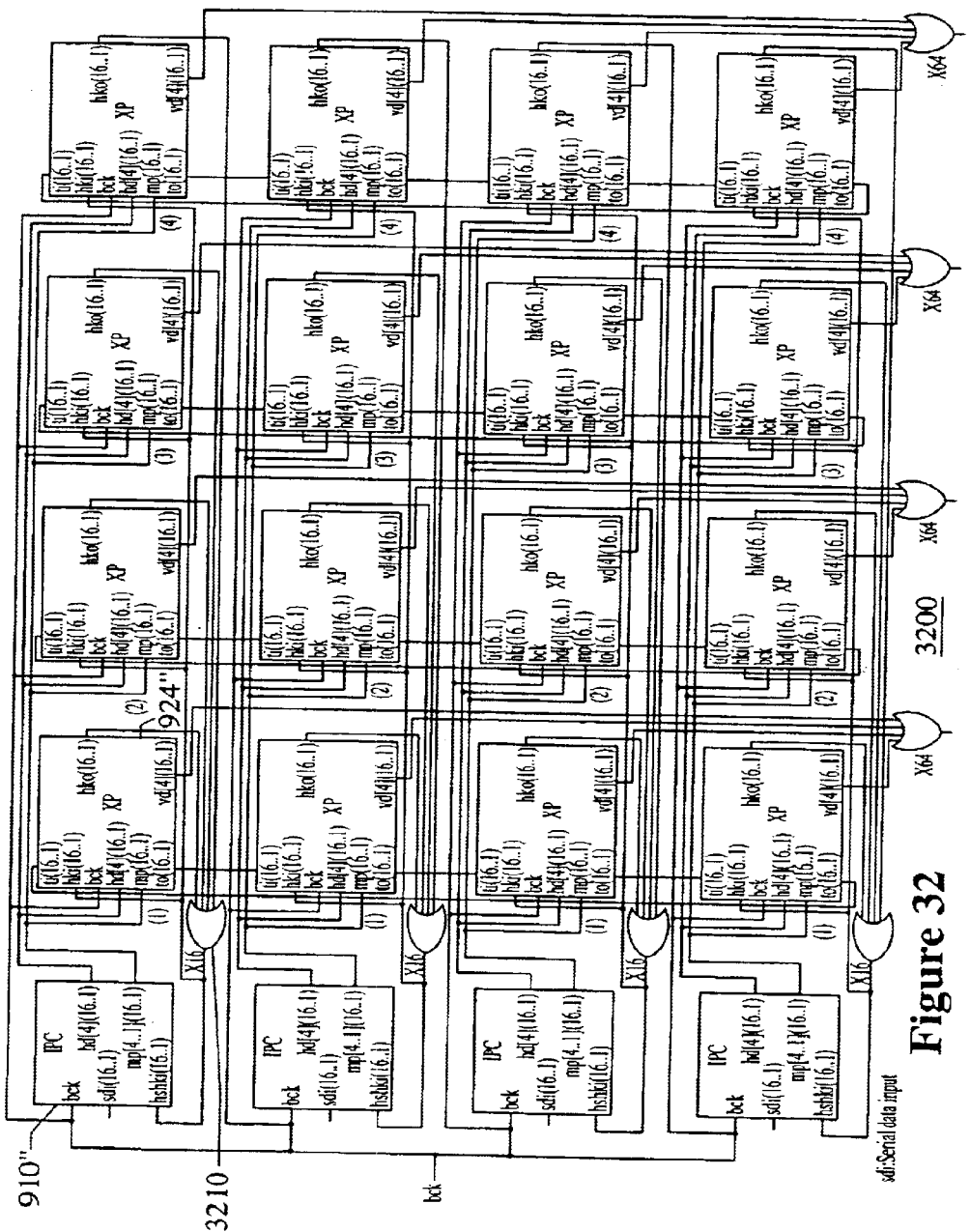

FIG. 32 is a block diagram of an arrangement of sixteen (16) crosspoint chips on a switch plane.

Figure 33:
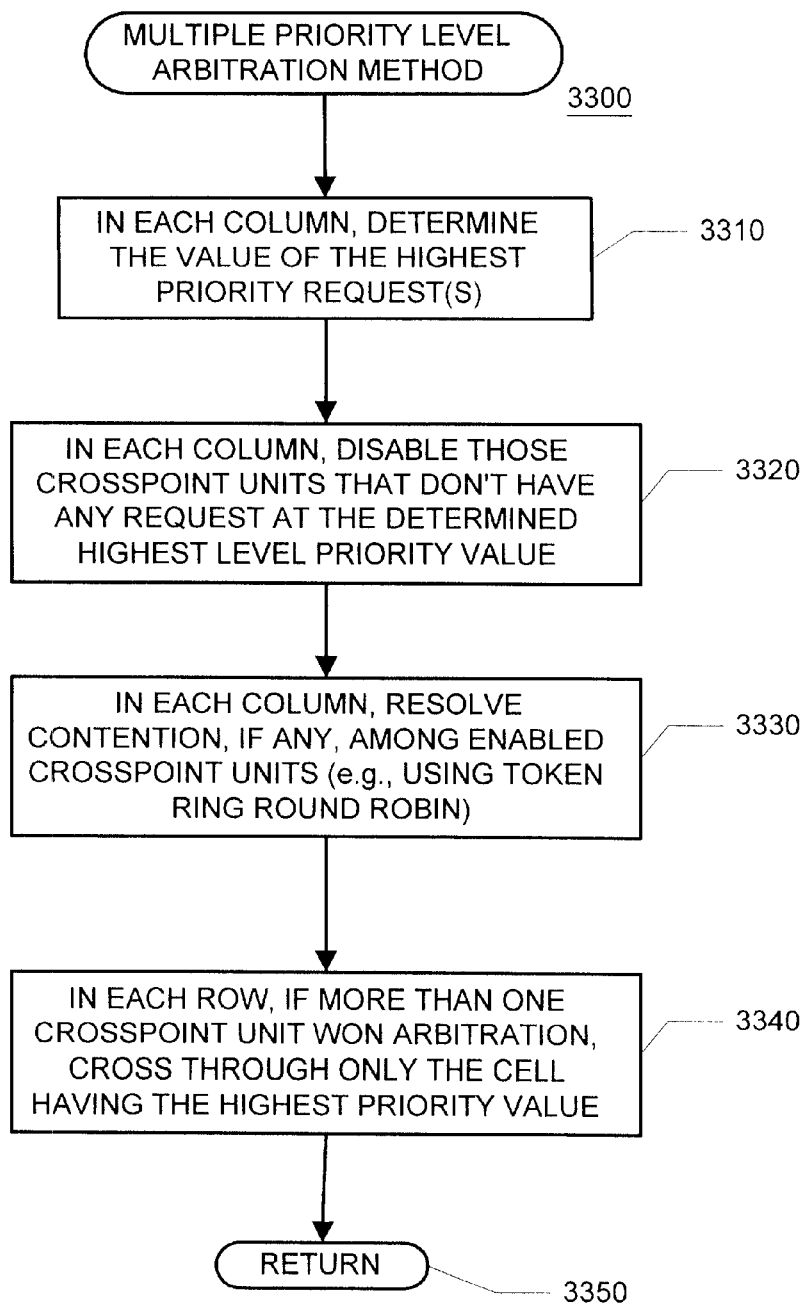

FIG. 33 is a flow diagram of an arbitration method which considers cells having various priority levels.

Figure 34:
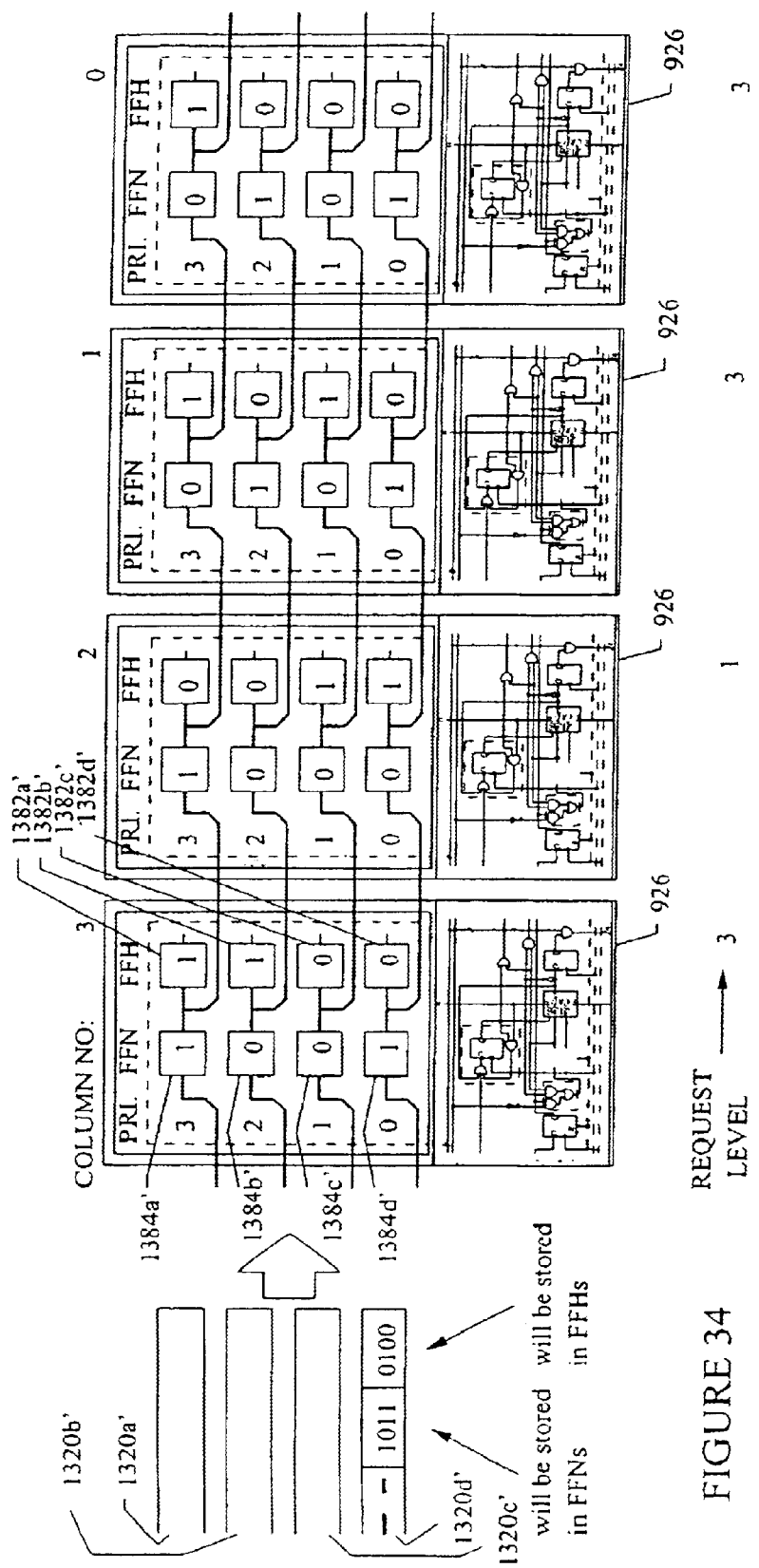
Figures 35D, 35E:
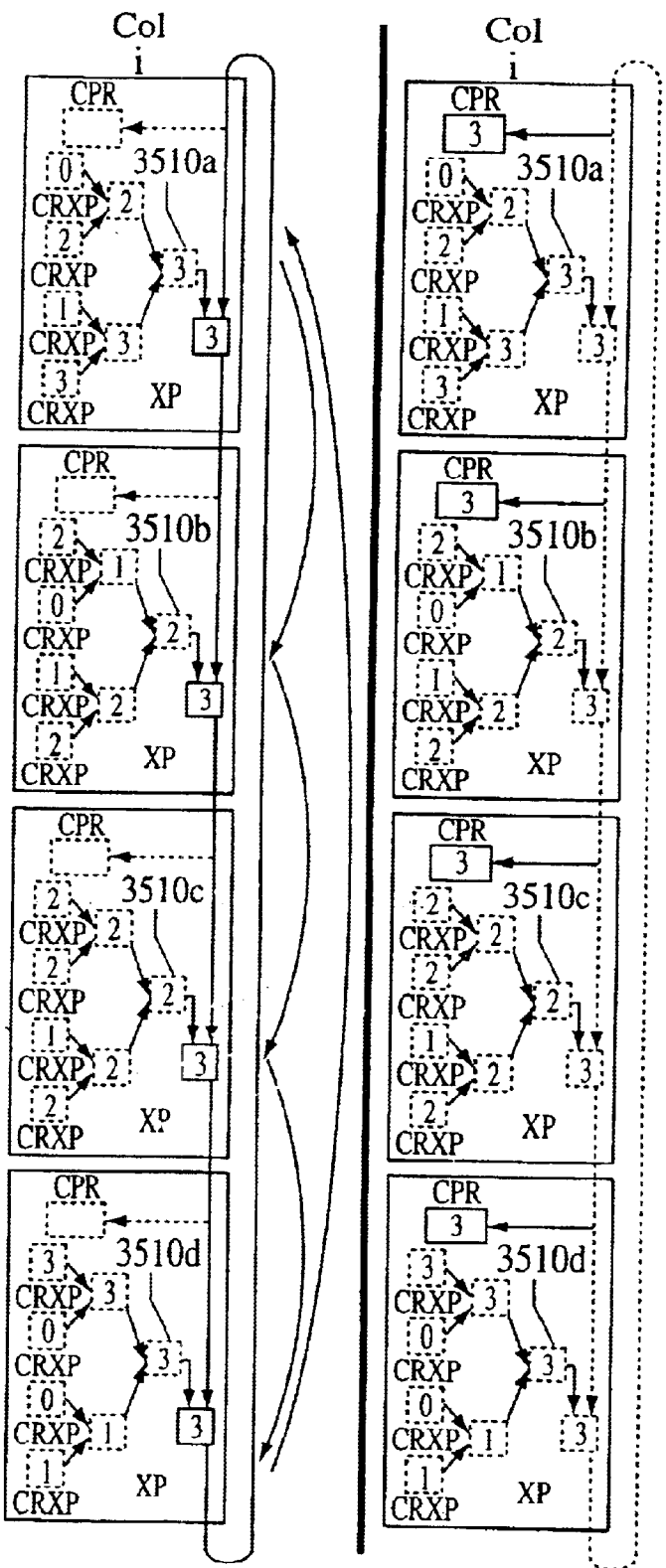

FIG. 34 is a block diagram which illustrates the loading of multicast pattern bits of various head of line cells of various priority levels.

FIGS. 35(a) through 35(e) illustrate the propagation of a maximum priority level value within a column of crosspoint units.

Figure 36A:
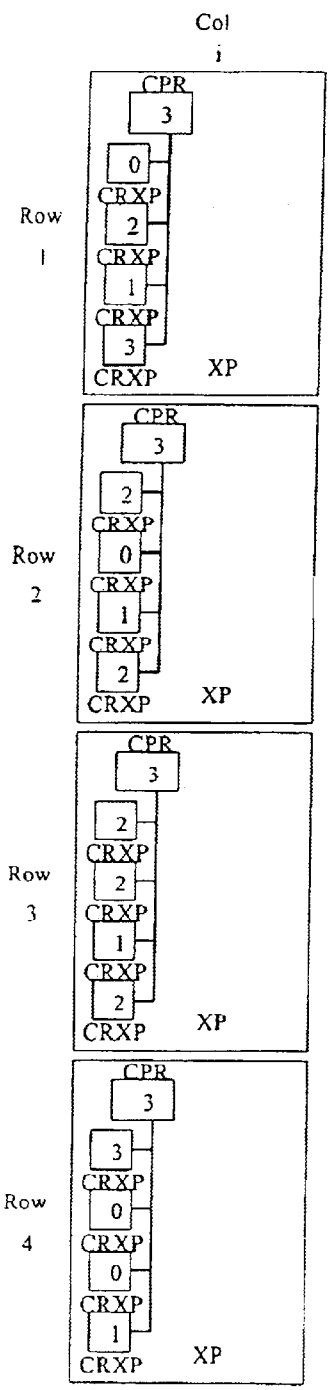
Figure 36B:
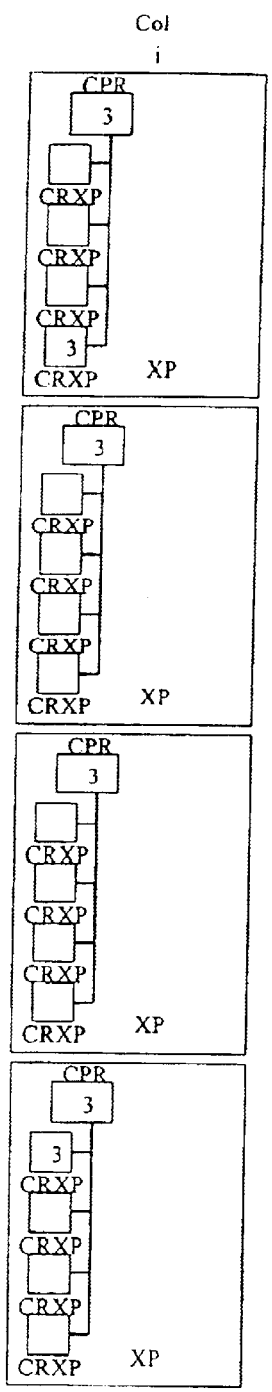
Figure 36C:
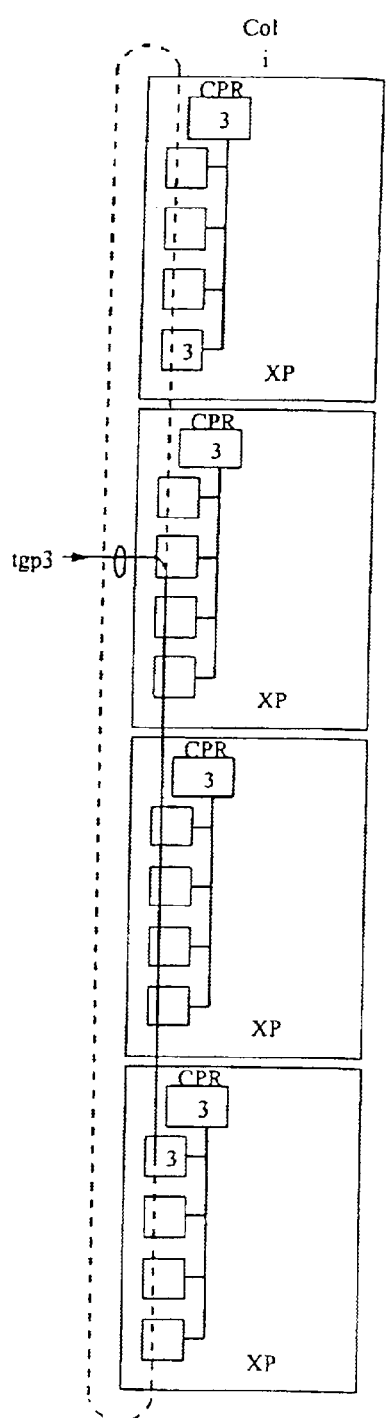

FIGS. 36(a) through 36(c) illustrate a priority comparison and token passing in a column of crosspoint units.

Figure 37A:
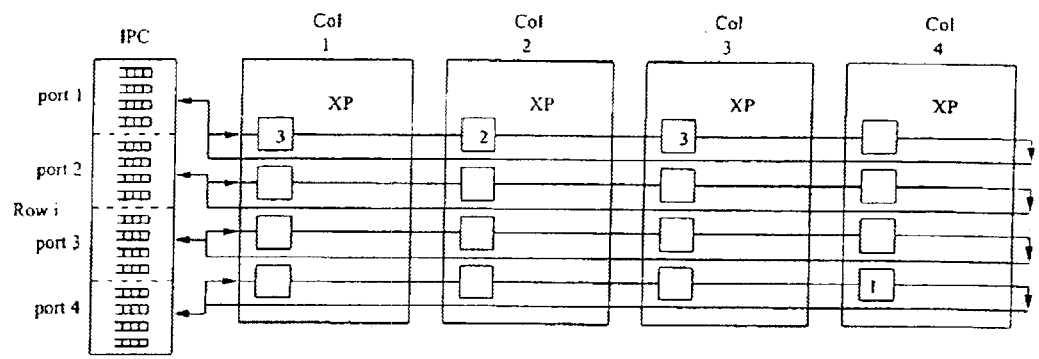
Figure 37B:
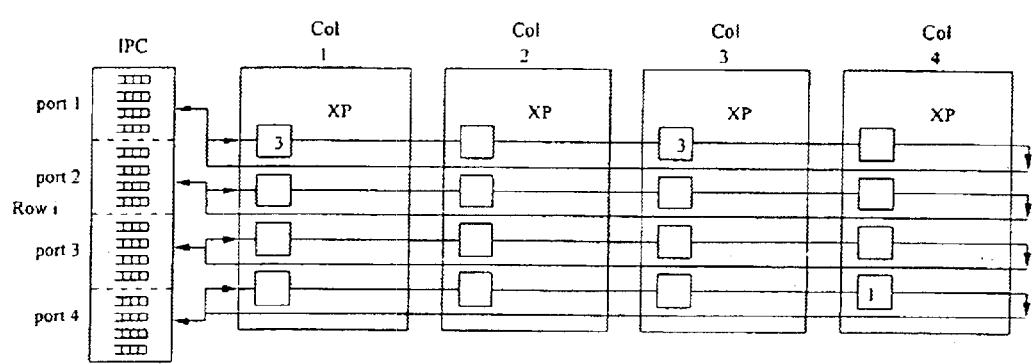
Figure 37C:
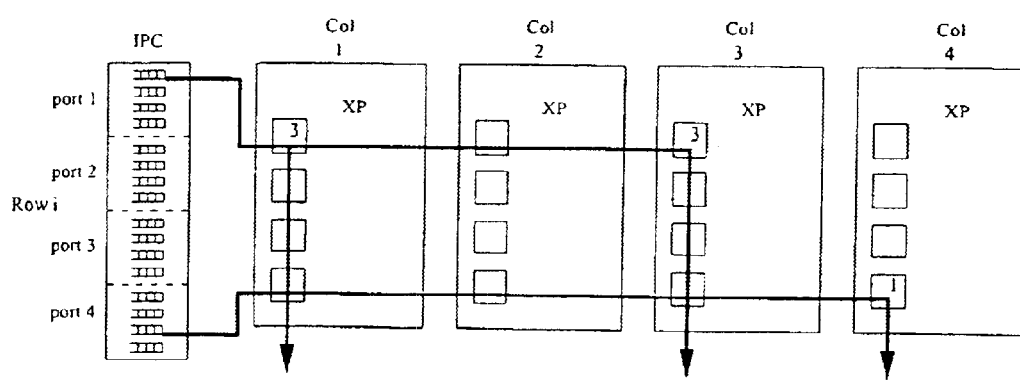

FIGS. 37(a) through 37(c) illustrate determining a maximum priority in a row of crosspoint units having more than one unit winning output contention in a given arbitration cycle.

Figure 38:
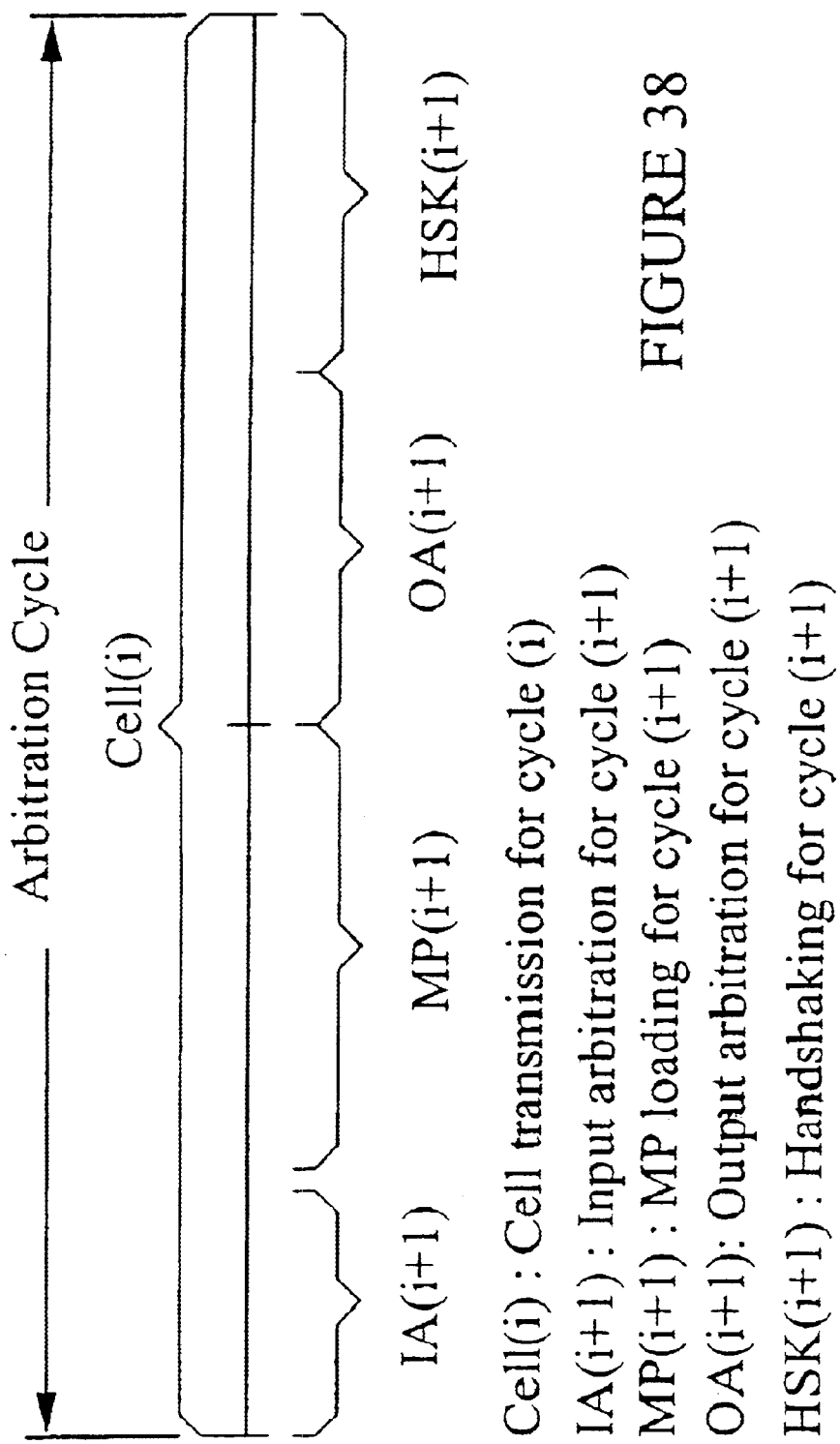

FIG. 38 illustrates the timing of operations in the dual round robin packet switch and packet switching method of the present invention.

§4. DETAILED DESCRIPTION

The present invention concerns novel methods and apparatus for arbitrating output port contention in a switch or router. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

In the following, basic functions which may be performed by the present invention are described in §4.1. Then, a high level description of an environment in which the present invention may operate is described in §4.2. Then, methods and apparatus which may be used to effect various aspects of the present invention are described in §4.3. Then, an example of the operation of a switch which implements various aspects of the present invention is described in §4.4. Thereafter, techniques for considering cells or packets with different priority levels are described in §4.5. Finally, conclusions about the present invention are provided in §4.6.

§4.1 BASIC FUNCTIONS

As stated in §2 above, it is a goal of the present invention to provide an arbitration method which effects a statistical delay bound on traffic. The present invention may provide such a method which is referred to as "dual round robin" (or simply "DRR"). The dual round robin arbitration scheme may be employed in a switch in which the input ports have virtual output queues (VOQs), and in which the output ports are buffered. Basically, the dual round robin arbitration scheme chooses, for each input port, one cell from among the head of line cells of the virtual output queues. The cell chosen is based on a round robin scheme. This is the first round robin choice of the dual round robin arbitration scheme. Next, for each output port, a winner from among the requesting input port(s), if any, is chosen using a round robin scheme. This is the second round robin choice of the dual round robin arbitration scheme.

In each case, the round robin arbitration may be effected by passing a token—among the head of line cells in the virtual output queues at each input port and among the contenting cells at each output port. Thus, the arbitration time in each case is on the order of N, where N is the number of output ports. The present invention may serve to optimize each round robin arbitration (or any round robin arbitration in general) by permitting the token to "tunnel" past groups of virtual output queues which are empty or winning input ports which are not requesting the output port. More specifically, the virtual output queues and winning input ports may be grouped together and their requests may be logically ORed to generate a group request. If the group request is LOW (or '0'), the token being passed may skip the virtual output queues or winning input ports of the groups. Such grouping may be used to reduce the arbitration time, in each case, to an order of the square root of N.

Having described the basic functions which may be performed by the present invention, an exemplary environment in which the present invention may operate is described in §4.2 below.

§4.2 HIGH LEVEL VIEW OF OPERATING ENVIRONMENT

Figure 9:
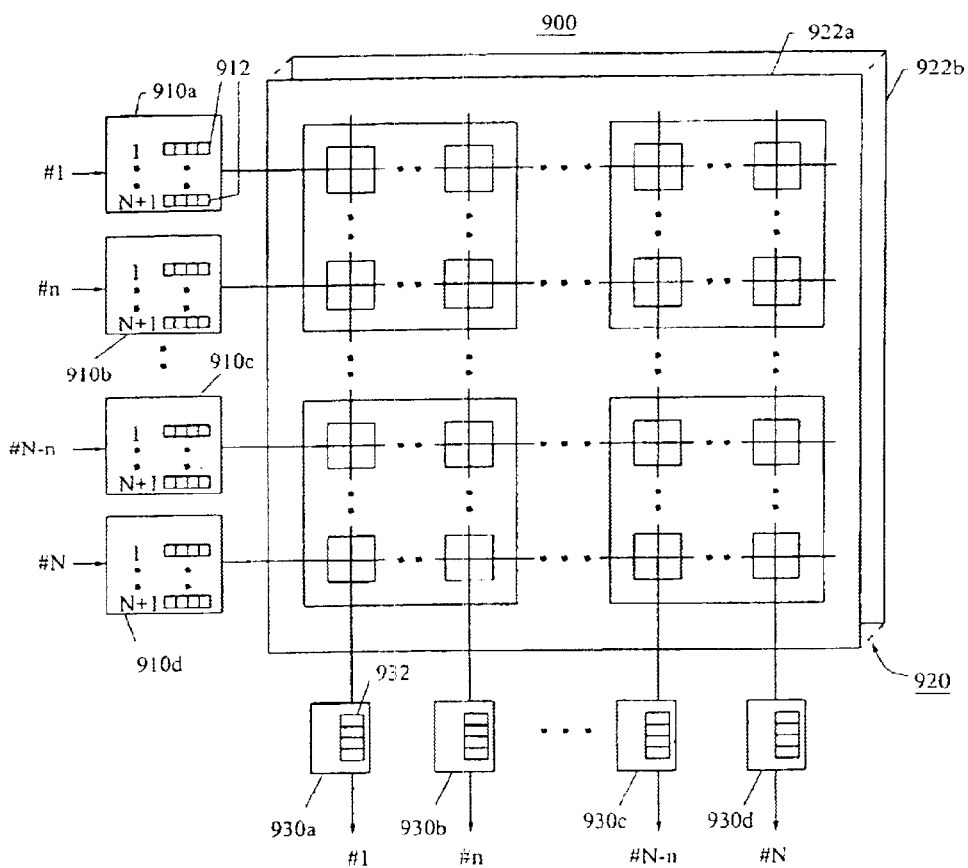
FIG. 9 is a high level block diagram of a packet switch in which each input port is provided with virtual output queues and output ports are provided with buffers.

Referring to FIG. 9, the present invention may operate in a switch 900 having a number (N) of input ports 910, a number (N) of output ports 930, and switching fabric 920.

Each of the N input ports 910 may have a number of virtual output queues (or VOQs) 912. The number of virtual output queues 912 at each of the input ports 910 may be based on the number of output ports 930. Each of the N output ports 930 may include a first-in-first-out (or FIFO) buffer or queue 932.

The switching fabric 920 may include a number of switching planes 922. Each of the switching planes 922 may include a number of crosspoint chips 924, each of which may include a number of crosspoint units 926.

Having described an-environment in which various aspects of the present invention may operate, processes, methods and apparatus which may be used are now described in §4.3 below.

§4.3 PROCESSES, METHODS, APPARATUS AND DATA STRUCTURES WHICH MAY BE USED

An exemplary method for effecting a dual round robin (DRR) arbitration process is described in §4.3.1 below.

Then, an exemplary switch which may be used to effect the dual round robin arbitration process is described in §4.3.2 below.

§4.3.1 IMPROVED DUAL ROUND ROBIN ARBITRATION METHOD

The dual round-robin matching (DRRM) arbitration process may be effected in the switch 900 of FIG. 9. That is, each input port 910 may have virtual output queues (VOQs) 912 and each output port 930 may have a buffer 932.

Figure 10:
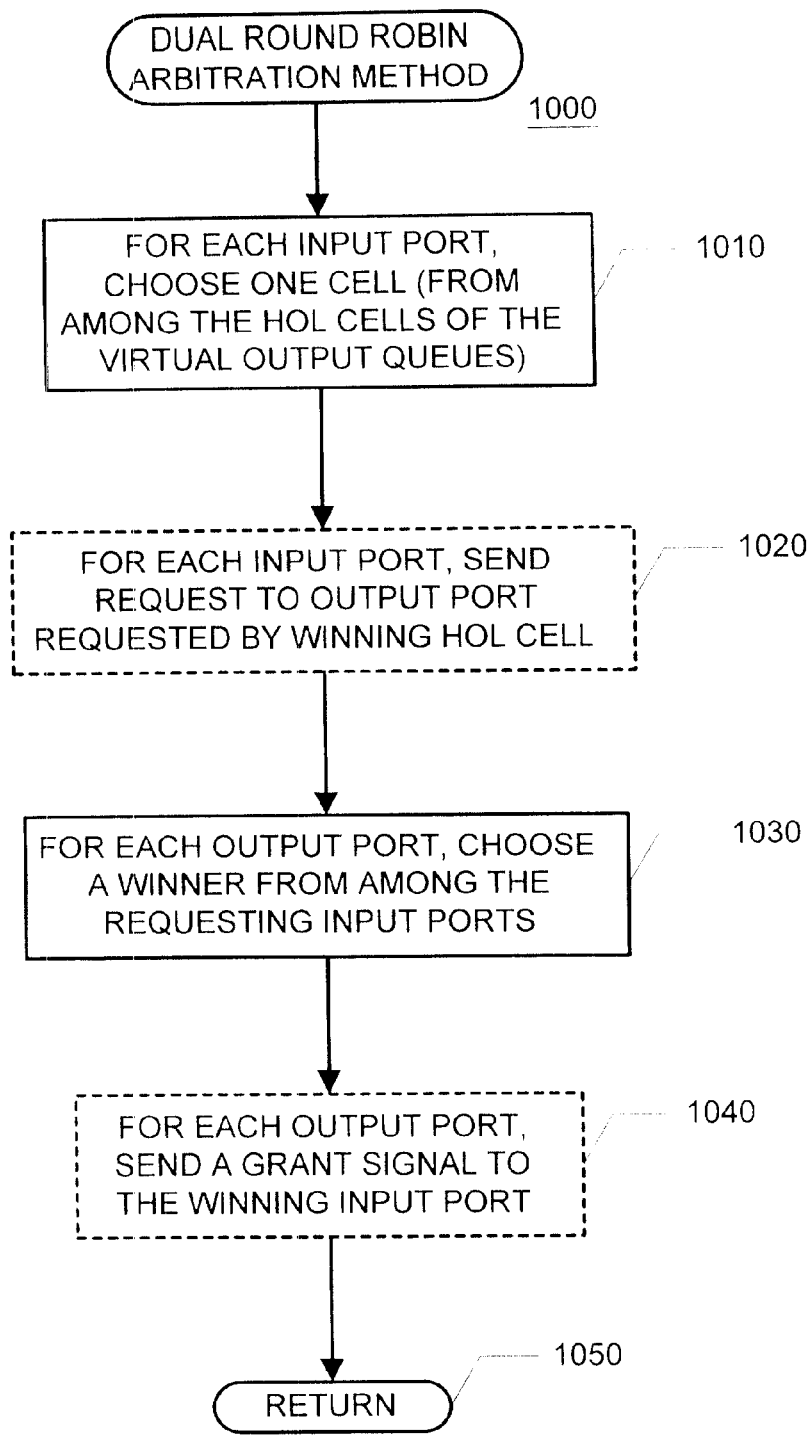
FIG. 10 illustrates a dual round robin arbitration method which may be used in a packet switch such as that of FIG. 9.

FIG. 10 is a high level flow diagram of an exemplary method 1000 for effecting the dual round robin arbitration process. First, as shown in step 1010, for each input port, a non-empty virtual output queue (VOQ) is selected. This selection may be performed by an input arbiter at each input and may be made according to the round-robin service discipline. Then, as shown in step 1020, after the selection, each input port sends one request, if any, to the selected output port. Thus, each output port may receive up to N requests. Next, as shown in step 1030, one of the received requests is selected. This selection may be performed by an output arbiter and may be made according to the round-robin service discipline. Finally, as shown in step 1040, each output port may send a grant signal to the winning input port. The method 1000 is then left via RETURN node 1050.

Since the method 1000 may use two (2) independent round-robin arbiters, the arbitration scheme is referred to as dual round-robin (DRR) arbitration. Thus, to summarize, the dual round-robin (DRR) arbitration has four steps in a cycle. The steps are: (1) each input arbiter performs request selection; (2) the input arbiters send requests to the output arbiters; (3) each output arbiter performs grant arbitration; and (4) the output arbiters send grant signals to the input ports.

Figure 11:
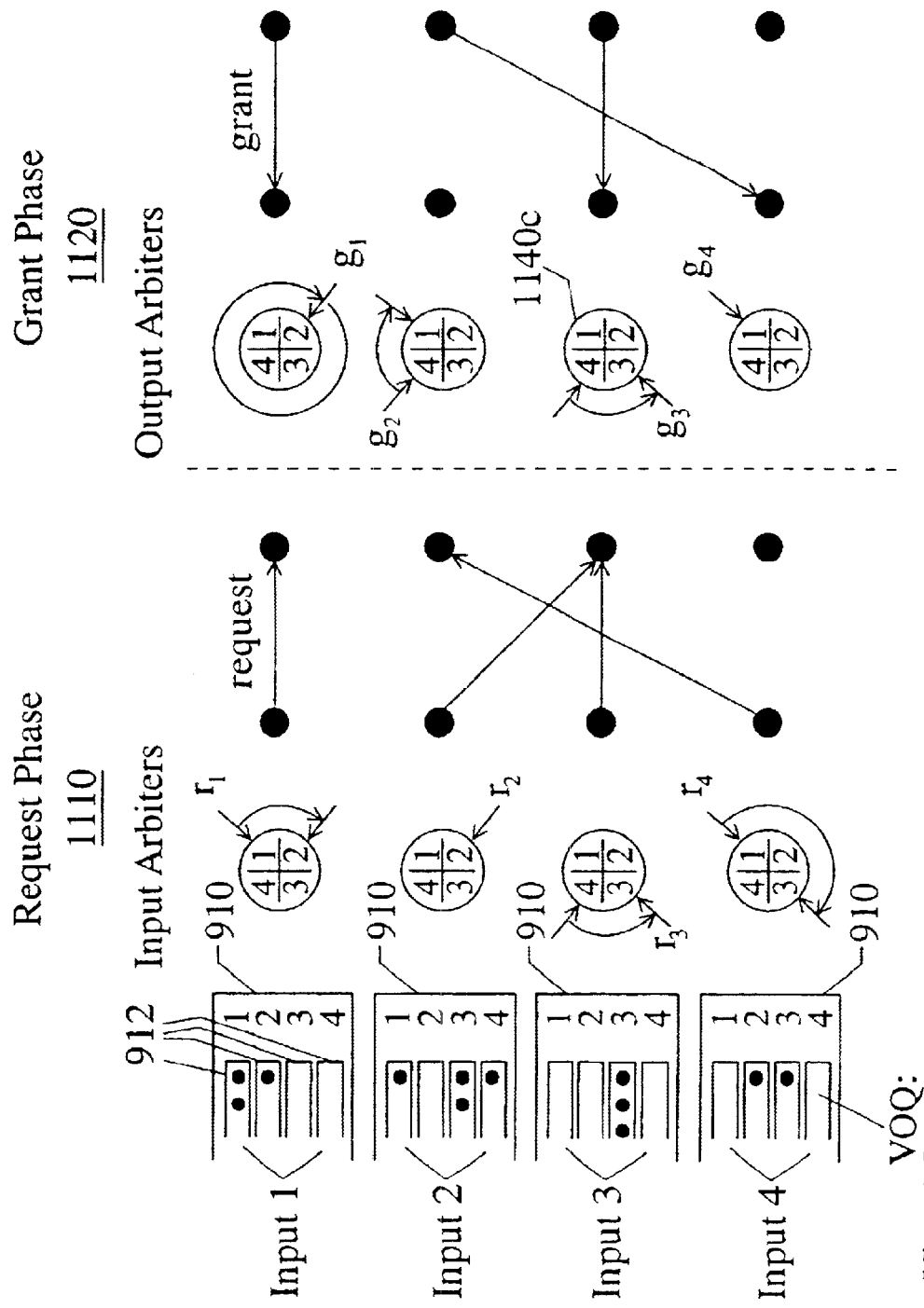
FIG. 11 illustrates request and grant phases of the dual round robin method of FIG. 10.

FIG. 11 shows an example of the DRR arbitration algorithm. In a request phase 1110, each input arbiter chooses a virtual output queue (VOQ) with a head of line cell and sends a request to an output arbiter. Assume input port 910a has cells destined for both output ports 1 and 2. Since its round-robin pointer 1130a is pointing to 1, it sends a request to output port 1 and updates its pointer to 2.

In the grant phase 1120, each output arbiter chooses a requesting input port and sends a grant signal back. For example, since the round-robin arbiter 1140c of output port 3 is pointing to 3, output arbiter 1140c sends a grant signal to input 3 and updates its pointer to 4.

Recall that with the iSLIP method discussed in §1.2.3.1.4 above, each virtual output queue (or VOQ) in each input port can send a request to an output arbiter. In other words, each input can send up to N requests to N arbiters, one for each output port. After the grant arbitration, an input may receive multiple (upto N) grants. Another round of arbitration is needed to guarantee that at most one cell is selected in each input port. Thus, a cycle of the iSLIP arbitration method includes five steps: (1) each of the input ports send request(s) to the output arbiter(s); (2) each of the output arbiters perform a grant arbitration; (3) each of the output arbiters sends a grant to the winning input arbiter; (4) each of the input arbiters perform another arbitration since each may have received multiple grants; and (5) each of the input arbiters send accept signals to the winning output arbiter.

Similar to the iSLIP method, the dual round robin scheme of the present invention desynchronizes the input grants, and thus achieves 100% throughput. However, the dual round robin scheme of the present invention requires less time to arbitrate and is easier to implement because less information exchange is needed between input arbiters and output arbiters.

Having described the dual round robin arbitration process and an exemplary method for effecting this process, an exemplary switch which may be used to effect the dual round robin process is now described in §4.3.2 below.

§4.3.2 EXEMPLARY SWITCH WHICH MAY EMPLOY DUAL ROUND ROBIN ARBITRATION PROCESS

Recall that FIG. 9 is a high level block diagram of a multi-plane input-output buffered switch 900 with a crossbar structure. The number N is the switch size and the number n is the number of ports in each crosspoint chip 924. Implementing a crossbar switch fabric 920 with a large number of ports within a single chip would be an ideal design for a high-capacity crossbar switch. However, pin count and power consumption limitations of each chip may necessitate a modular design. By using bit-slice techniques with multiple switch planes 922, the switch operation speed may be reduced. Thus, the switch can be implemented with low-cost CMOS technology.

Recall that a switch plane 922 may include a matrix of interconnection of crosspoint chips 924. Recall further that each of the crosspoint chips 924 may include a matrix interconnection of crosspoint units 926. The switch 900 can accommodate multicasting by sending multicast patterns (MPs) and cells in parallel to the switch fabric 920. A multicast pattern is a bit map in which each bit corresponds to each output port. If a bit at the $i^{th}$ position is HIGH (set to '1'), the cell is destined to the $i^{th}$ output port. When more than one bit of the multicast pattern are HIGH (set to '1'), the cell is multicast to multiple output ports.

Cells are first stored in the virtual output queues (VOQs) 912 at each input port controller (IPC) 910. The head of line cells in the virtual output queues 912 are transmitted to the switch fabric 920 when they are granted through the arbitration cycle. Each input port controller 910 may include N+1 virtual output queues—one virtual output queue for each of the N output ports and one virtual output queue for multicasting cells.

The switch fabric 920 may operate at a higher rate than the line rate to improve delay/throughput performance.

At the beginning of an arbitration cycle, the multicast pattern is first loaded into a corresponding row of crosspoint units 924 by the input port controller 910 such that each crosspoint unit 924 of the row has an associated bit of the multicast pattern (which is also referred to as "the request bit"). When a column of crosspoint units 924 has more than one multicast bit HIGH (set to '1'), there are more than one cell contending for the same output port. Recall that only one of these contending cells can be served in every arbitration cycle. The arbitration for each output port 930 is performed by all crosspoint units 926 in the associated column. The columns of crosspoint units 926 operate in a distributed and highly parallel fashion. Accordingly, the arbitration is fast and scalable. Once a winner cell is determined in each of the columns of crosspoint units 926, the crosspoint units 926 may acknowledge the winning input port controllers 910 through handshaking signals.

Having provided an overview of the operation of the exemplary crosspoint switch 900, the functions, structure and operations of each of the switch components are now described. In particular, the functions, structures and operations of the input port controllers 910 are described in §4.3.2.1 below. The functions, structures and operations of the output port controllers 930 are described in §4.3.2.2 below. Finally, the functions, structures and operations of the switching fabric 920 are described in §4.3.2.3 below.

§4.3.2.1 INPUT PORT CONTROLLERS

Functions which may be performed by the input is port controllers 910 are described in §4.3.2.1.1 below. Then, an exemplary structure for implementing the input port controllers 910 is described in §4.3.2.1.2 below. Finally, an operation of the exemplary structure is described in §4.3.2.1.3 below.

§4.3.2.1.1 IPC FUNCTIONS

Figure 12:
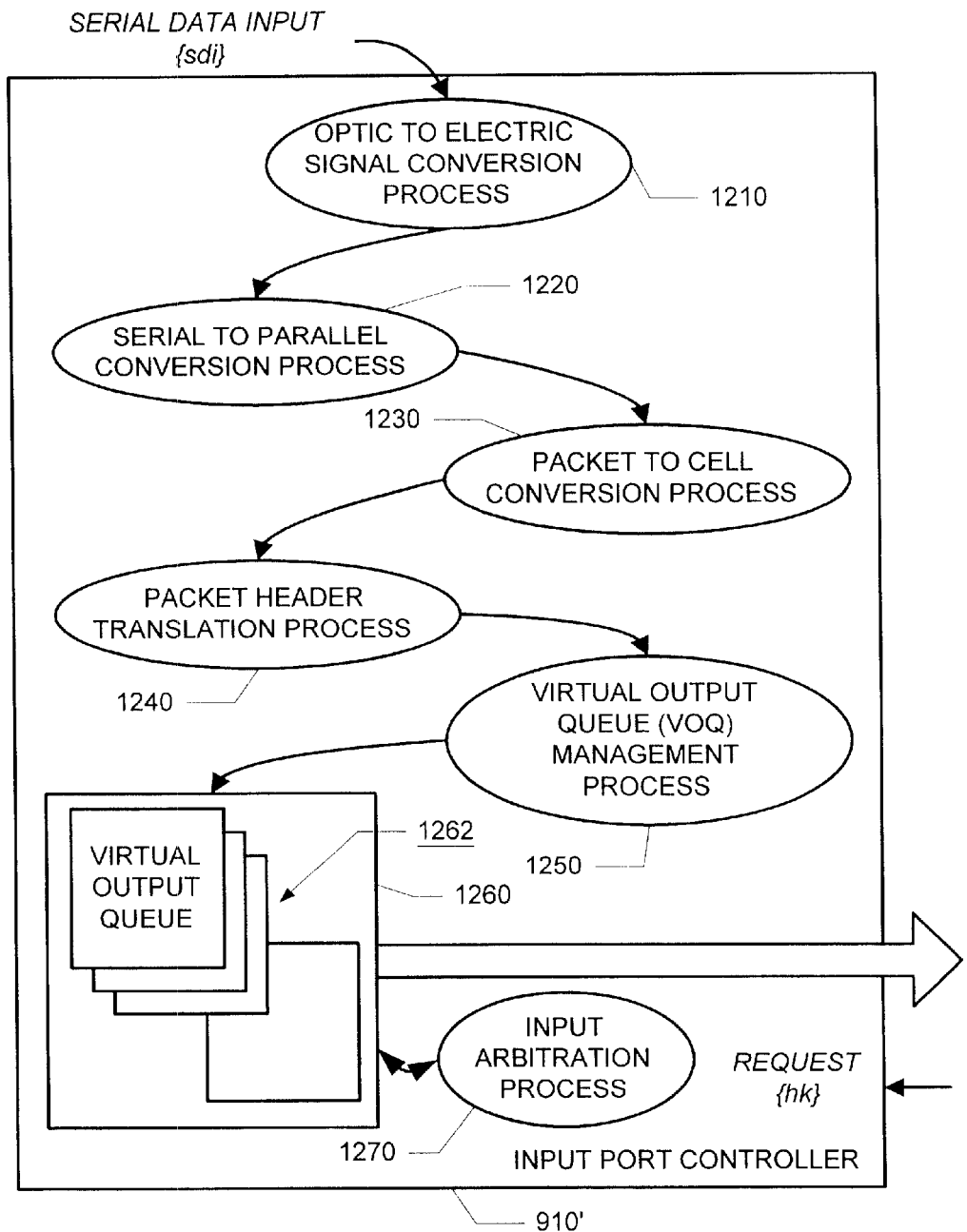
FIG. 12 illustrates processes which may be performed by an input port controller.

FIG. 12 is a diagram of processes which may be performed by an exemplary input port controller 910'. As shown in FIG. 12, serial data input (sdi) may be accepted. If the serial data input is an optical signal, it may be converted to an electrical signal by process 1210. The resulting electrical signal may then be converted from a serial signal to parallel signals by process 1220. If packets of various sizes are received, they may be converted to cells having a fixed size by process 1230. Information in the header of the packet may be interpreted by process 1240. For example, an output port (or ports) may be determined from destination address or virtual path and channel information. The cells may be buffered into virtual output queues 1262, based on their requested output port(s), by process 1250. Then, an input arbitration process 1270 selects a virtual output queue 1262 with a head of line cell to be serviced. As will be described in more detail below, a head of line cell winning arbitration may be provided to the switching fabric in response to a request signal (hk). Of the foregoing processes which may be performed by the input port controller 910', the optic to electric signal conversion process 1210, the serial to parallel conversion process 1220, the packet to cell conversion process 1230, and the packet header translation process 1240 may be performed using any known or proprietary technique.

Having described functions which may be performed by the input port controllers 910', an exemplary structure of an input port controller is now described in §4.3.2.1.2 below.

§4.3.2.1.2 INPUT PORT CONTROLLER IMPLEMENTATION

Figure 13:
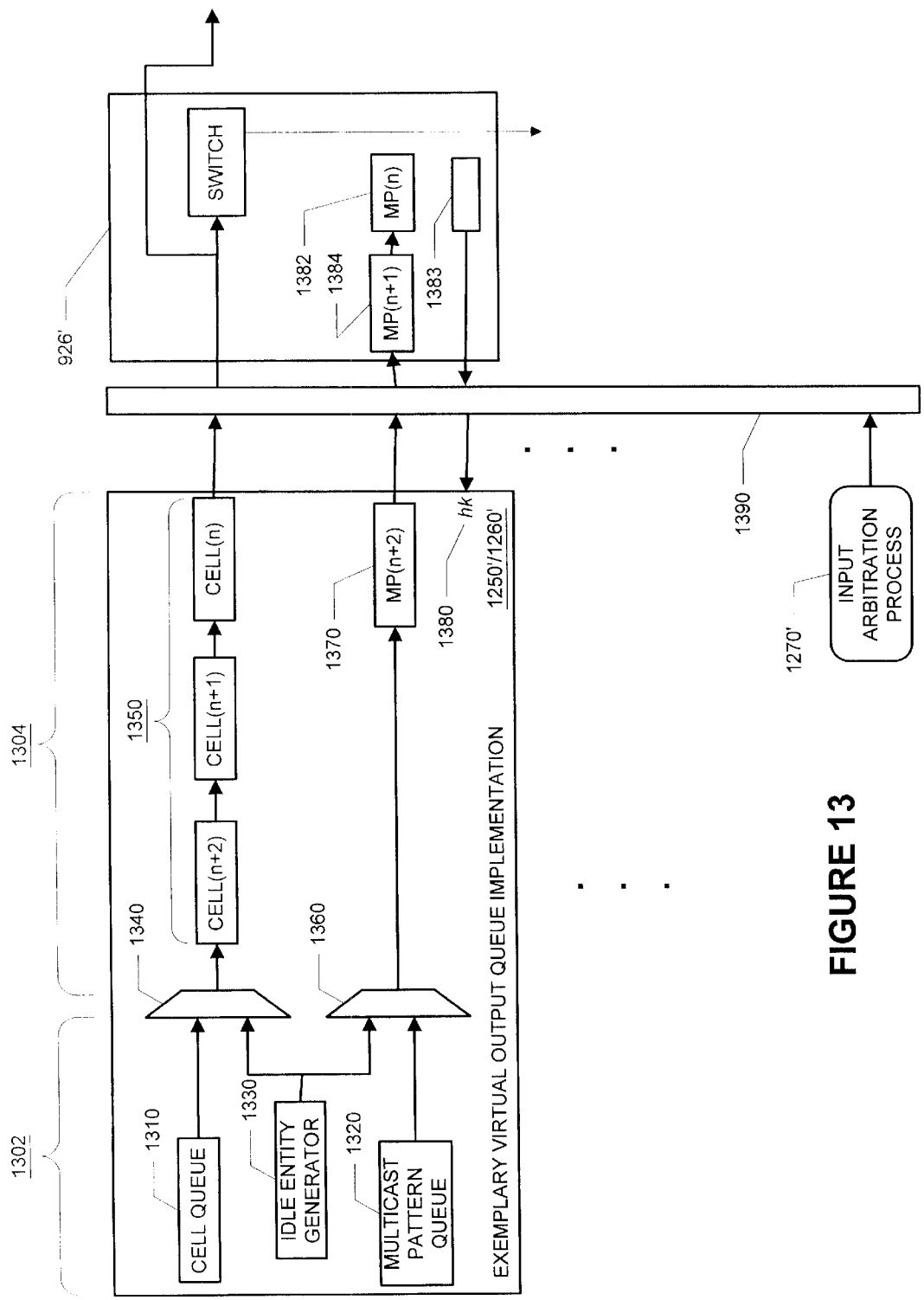
FIG. 13 is a block diagram of an exemplary virtual output port of an input port controller.

FIG. 13 is a block diagram of an exemplary structure 1250'/1262' for implementing a virtual output queue 1262 and virtual output queue management process 1250 of an input port controller 910. The relationship between this structure 1250'/1262' and a row of exemplary crosspoint units 926' is shown. Basically, the structure 1250'/1262' has two (2) sections—a cell and multicast pattern queue section 1302 and a front buffer section 1304. As shown, the front buffer section 1304 has three (3) cell buffers 1350 and one (1) multicast pattern buffer 1370. This difference in the number of cell and multicast pattern buffers is due to the fact that the bits of the multicast patterns of the head of line cell and the next to head of line cell are stored at storage devices 1382 and 1384, respectively, in each of the exemplary crosspoint units 926'. If the input ports are to be provided with virtual output queues in a switch implementing an input arbitration, the bits of the multicast patterns of the head of line cell of the virtual output queue winning arbitration and a next virtual output queue having a head of line cell may be stored in devices 1382 and 1384, respectively. The storage devices 1382 and 1384 may be flip-flops. Thus, the bits of the multicast pattern of the head of line cell and the next to head of line cell (or a head of line cell of a next virtual output queue) are distributed across the crosspoint units 926' in a row. An idle entity generator 1330 loads an idle cell and an idle multicast pattern to the cell buffer 1350 and the multicast buffer 1370, respectively, when the input (cell) queue is empty and the head of line cell and its multicast pattern were cleared at the end of the previous cell cycle. Thus, the switch (or multiplexer) 1340 selects an idle cell or an actual queued cell to be buffered. Similarly, the switch (or multiplexer) 1360 selects an idle multicast pattern or an actual queued multicast pattern to be buffered.

Note that since N of the virtual output queues 912 (VOQs) may correspond to unicast cells, a multicast pattern is generated for these virtual output queues 912. The generated multicast pattern has one HIGH ('1') bit corresponding to the requested output port with the remaining N−1 bits set to LOW ('0'). In these virtual output queues 1262, the multicast pattern queue 1320 is not needed since the multicast pattern will always be the same. Since the $(N+1)^{th}$ virtual output queue 912 is reserved for multicast cells, it stores actual multicast patterns.

The input arbitration process 1270' selects one of the virtual output queues 1262' to be connected with a row of crosspoint units 926. The arbitration process 1270' may provide a selection control signal to a switch (or multiplexer) 1390 for this purpose. The selection may be made based on a round robin discipline. A token tunneling technique for optimizing output arbitration is described in §4.3.2.3.1.2 below. Token tunneling may be similarly used to optimize the arbitration process 1270'.

Having described an-exemplary structure for implementing at least some aspects of the input port controller 910', its operation and its interaction with a row of crosspoint units 926' is now described in §4.3.2.1.3 below.

§4.3.2.1.3 INPUT PORT CONTROLLER OPERATION

FIGS. 14a through 14e illustrate the propagation of multicast patterns and cells in a typical initialization sequence in an input port with a single queue rather than a number of virtual output queues. In these Figures, C denotes an active cell (i.e., an actual queued cell) while D denotes an idle cell generated by the idle entity generator 1330. Similarly, MP(C) denotes the multicast pattern of an active cell while MP(D) denotes the multicast pattern of an idle cell.

Notice in FIG. 14a that all buffers 1350 or 1370 are filled with idle cells (D1, D2, D3) or multicast patterns (MP(D3)) and that the buffers 1382 and 1384 are loaded with zeros ('0's) during the initialization period. A group OR gate 1383 logically ORs all of the bits of the multicast pattern stored in the flip-flop 1382. Since the OR result is zero ('0'), the contents of the buffers are shifted. In an alternative embodiment, the bits of the multicast pattern are distributed among crosspoint units 926' in a row such that each crosspoint unit 926' includes only one bit of each of the multicast patterns. Logical OR gates can then be used to logically OR all bits of a multicast pattern.

More specifically, in FIG. 14b, notice that as another idle cell (D4) is generated, the (appropriate bit of) multicast pattern (MP(D3)) corresponding to the idle cell D3 is loaded into the flip-flop 1384. Notice also that an actual cell C1 is now available in the cell queue 1310 and its associated multicast pattern is similarly available in the multicast pattern queue 1320. Once again, since the OR result of all of the bits of the multicast pattern in the flip-flop 1382 (or distributed in the flip-flops 1382 of a row of crosspoint units 926') is zero ('0'), the contents of the buffers are shifted.

More specifically, in FIG. 14c, notice that the cell C1 advances into the buffer 1350, that (the appropriate bit of) the multicast pattern MP(D3) advances to the flip-flop 1382 and that (the appropriate bit of) the multicast pattern MP(D4) advances to the flip-flop 1384. Notice also that cell C2 and its associated multicast pattern MP(C2) are available from queues 1310 and 1320, respectively. Once again, since the OR result of all of the bits of the multicast pattern in the flip-flop 1382 (or distributed in the flip-flops 1382 of a row of crosspoint units 926') is zero ('0'), the contents of the buffers are shifted.

More specifically, in FIG. 14d, notice that the cell C2 advances into the buffer 1350, the cell C1 advances within the buffer 1350, (the appropriate bit of) the multicast pattern MP(D4) advances to the flip-flop 1382, (the appropriate bit of) the multicast pattern MP(C1) advances to the flip-flop 1384, and the multicast pattern MP(C2) advances into the buffer 1370. Once again, since the OR result of all of the bits of the multicast pattern in the flip-flop 1382 (or distributed in the flip-flops 1382 of a row of crosspoint units 926') is zero ('0'), the contents of the buffers are shifted.

More specifically, in FIG. 14e, notice that the cell C3 advances into the buffer 1350, the cells C1 and C2 advance within the buffer 1350, (the appropriate bit of) the multicast pattern MP(C1) advances to the flip-flop 1382, (the appropriate bit of) the multicast pattern MP(C2) advances to the flip-flop 1384, and the multicast pattern MP(C3) advances into the buffer 1370. This time, since the OR result of all of the bits of the multicast pattern in the flip-flop 1382 (or distributed in the flip-flops 1382 of a row of crosspoint units 926') will not be zero ('0') until the cell C1 has been forwarded to each of the requested output ports, the contents of the buffers will remain the same until the cell C1 has been forwarded to each of the requested output ports. FIG. 14e shows the contents of the exemplary input port controller 1250'/1260' and the row of crosspoint units 926' after initialization.

Having described the functions, an exemplary structure, and an operation of the exemplary structure of an input port controller 910, the output port controllers 930 are now described in §4.3.2.2 below.

§4.3.2.2 OUTPUT PORT CONTROLLERS

Functions which may be performed by the output port controllers 930 are now described. As show in FIG. 15, an exemplary output port controller 930' may accept ORed data from a column of crosspoint units 926. The data may be logically ORed since, in any given column of crosspoint units 926, only one of the crosspoint units 926 may win contention and output cell data at any given arbitration cycle. The ORed data, that is, the cell winning contention during a given arbitration cycle, is queued in a FIFO 1510. The FIFO queue 1510 may be controlled by a queue management process 1520. The cells may then be converted to serial information by process 1530, assembled into various sized packets by process 1540, the packet header information may be updated by process 1550, and link level support may be provided by process 1560. The processes of the output port controller 930 may be performed using any known or proprietary technique.

§4.3.2.3 SWITCH PLANES

Recall from FIG. 9 that a switching fabric 920 may include a number of switch planes 922. Recall further that each switch plane 922 may include a matrix of crosspoint chips 924 which may themselves include a matrix of crosspoint units 926.

Recall that in the dual round robin arbitration scheme of the present invention, cells stored in the N+1 virtual output queues 912 in each input port controller 910 are served in a round-robin fashion. The chosen cell may have a multicast pattern associated with it. For a large switch size, the number of bits in the multicast pattern may be so large that the multicast pattern cannot be serially loaded into all of the crosspoint units 926 on the same row. Thus, the multicast pattern may be divided into N/n groups. Each group of n bits of the multicast pattern may then be loaded into each crosspoint chip 924. For example, in a switch having 256 ports, each crosspoint chip 924 may be provided with 16 ports. In such a case, each of the crosspoint chips 924 in the first column is loaded with the first 16 bits of the multicast pattern from the associated input port controller 910, whereas each of the crosspoint chips 924 in the last column is loaded with the last 16 bits of the multicast pattern from the associated input port controller 910. This is illustrated in FIG. 31.

Based on the arbitration results, the crosspoint units 926 route the cells from their horizontal data inputs (hd) coupled with the input port controller 910 (Recall, e.g., FIG. 13.), to their vertical data outputs (vd) coupled, via an OR gate for example, with the output port controller 930. The data bus of each crosspoint chip 924 may be k bits wide. The vertical data outputs from the crosspoint chips 924 in the same column may be logically ORed directly since, as explained above, the arbitration algorithm will guarantee that only one of the inputs to the OR gate will be active and the others will be inactive in every arbitration cycle. By logically ORing the data outputs from the crosspoint circuits 924 instead of passing the data outputs from one crosspoint circuit 924 to the inputs of a next crosspoint circuit 924, there are in total k×n pins saved for each crosspoint circuit 924. Horizontal data inputs are broadcast to all crosspoint circuits 924 on the same row to provide the multicasting capability. Recall that handshaking signals (hk) may be used to communicate between the input port controllers 910' and crosspoint units 926'. Notice that the crosspoint chips 924 do not signal input port controllers 910 to send them cells. Cells from input ports may always be broadcast to the crosspoint chips 924 in a given row. Each of the crosspoint chips 924 then decide if the cells are to be routed to their output ports. When all multicast bits on the same row are zero ('0'), a new cell from the input port controller 910 is made available.

Token interconnections (ti and to) among chips are used to implement the ring reservation algorithm that is described in the next section. There may be $N^2/n^2$ crosspoint chips 924 in an N-by-N switching plane. Each of the crosspoint chips 924 may contain n×n crosspoint units 926.

§4.3.2.3.1 SWITCH PLANE FUNCTIONS

FIG. 16 is a diagram of processes that may be performed by each of the crosspoint units 926" of the switching fabric 920, as well as processes that may be associated with row and columns of crosspoint units 926". As shown in FIG. 16, each of the crosspoint units 926" may perform a token management process 1610, as well as a crosspoint process 1620. One or more token tunneling process(es) 1630 may be associated with crosspoint units 926" in a column of the switching fabric 920. An input load process 1640 may be associated with each row of crosspoint units 926". The functions of the load input process 1640 is described in §4.3.2.3.1.1 below. Exemplary methods and structures for effecting the load input process 1640 are described in §4.3.2.3.2.1 below. The functions of the token tunneling process 1630 are described in §4.3.2.3.1.2 below. Exemplary methods and structure for effecting the token tunneling process 1630 are described in §4.3.2.3.2.2 below. The token management process 1610 and the crosspoint process 1620 are described with reference to a description of the crosspoint unit 926" in §4.3.2.3.3.1 below.

§4.3.2.3.1.1 LOAD INPUTS

Recall that each bit of a multicast pattern associated with a cell corresponds to whether or not that cell is to be provided to an associated output port. Thus, if there are N output ports 930, the multicast pattern will have N bits and the switching fabric 920 will have rows of N crosspoint units 926". Thus, a input load process 1640 associated with a row of crosspoint units 926" may function to (i) accept a multicast pattern from a selected virtual output queue 912 of an associated input port 910, (ii) forward, to each of the crosspoint units 926" of the row, an associated bit of the multicast pattern, (iii) to receive updates to the bits of the multicast pattern from the crosspoint units 926" of the row, and (iv) to request a multicast pattern of a head of line cell from a next selected virtual output queue 912 of the input port controller 910 when all bits of the multicast pattern of the present cell are zero ('0'). An exemplary method for effecting the load input process 1640 is described in §4.3.2.3.2.1 below. First, however, functions which may be performed by the token tunneling process 1630 are introduced in §4.3.2.3.1.2 below

§4.3.2.3.1.2 OPTIMIZE ARBITRATION VIA TOKEN TUNNELING

Recall from step 1030 of FIG. 10, that in the dual round robin arbitration scheme of the present invention, that for each output port 930, a winner from among requesting input ports is chosen. Since each output port 930 is associated with a column of crosspoint units 926", as will be described in more detail in §4.3.2.3.2.2 below, this second round robin arbitration may be effected by passing a token around the crosspoint units 926" defining a column in the switching fabric 920. Basically, a crosspoint unit with a HIGH ('1') multicast pattern bit and a token will switch a cell at a vertical data (vd) input through to a horizontal data (hd) output. In the next arbitration round, the token will start at the next crosspoint unit. If the crosspoint unit 926' has a LOW ('0') multicast pattern bit when it receives the token, it simply passes the token to the next crosspoint unit 926" in the column.

As can be appreciated by the brief introduction of using token ring reservation for effecting a round robin arbitration, in the worst case scenario, if the first of N crosspoint units has the token but only the last of the N crosspoint units has a HIGH ('1') multicast pattern bit, then it will take N passes before the output port 930 associated with the column of crosspoint units 926" serves any input port 910. Thus, the simple token ring reservation round robin arbitration is said to have complexity on the order of N. When N is large, this arbitration scheme may be too slow.

The token tunneling process 1630 functions to speed up the arbitration process by grouping together a number of crosspoint units 926" in a column. If none of the crosspoint units 926" in a group have a HIGH ('1') multicast pattern bit, the token skips (or "tunnels through") that group. As will be shown, the token tunneling process 1630 can reduce the complexity of the arbitration from the order of N, to the order of the square root of N. Similarly, as mentioned in §4.3.2.1.2 above, the token tunneling process 1630 may be used by the input arbitration process 1270 to select a virtual output queue having a head of line cell.

Having described the processes associated with the switching planes 922, methods and structures for effecting these processes are described in §4.3.2.3.2 below.

§4.3.2.3.2 SWITCH PLANE METHODS AND APPARATUS

Exemplary methods and apparatus for effecting the load input process 1640 are described in §4.3.2.3.2.1 below. Then, exemplary methods and apparatus for effecting the token tunneling process 1630 are described in §4.3.2.3.2.2 below.

§4.3.2.3.2.1 LOAD INPUTS METHODS AND APPARATUS

FIG. 17 is a high level flow diagram of an exemplary method 1640' for effecting the load input process 1640. As shown in step 1710, all modified multicast pattern bits, if any, from the associated row of crosspoint units 926" are accepted, one bit of the multicast pattern from each of the crosspoint units 926" of the row. Then, in step 1720, the accepted modified multicast pattern bits are logically ORed to generate a request (hk) result. More specifically, if the OR result is zero ('0'), this means that the current cell at the selected virtual output queue 912 of the input port 910 associated with the row of crosspoint units 926" has been served by all output ports that it requested, in which case, a new cell is needed. Thus, as shown in decision step 1730 and step 1740, if the request result is zero (0), the method 1640' requests the multicast pattern associated with the head of line cell of the next selected virtual output queue 912. As shown in decision step 1750 and 1760, once the requested multicast pattern is received, each bit of the received multicast pattern is provided to an associated crosspoint unit 926" of the row. The method is then left via RETURN node 1770. Returning to decision step 1730, if the request result (hk) is HIGH ('1'), this means that the current cell has not yet been served by all of the output ports 930 that it requested and the method 1640' is left via RETURN node 1770. Although the maintenance of the bits of the multicast pattern has been described as being performed distributively, by each of the crosspoint units 926" of a row, these bits could be maintained and updated centrally or hierarchically.

FIG. 18 illustrates a simple circuit for determining a request signal based on updated multicast pattern bits from a row 1810 of crosspoint units 926. In th s case, the crosspoint units 926 are grouped to define a first group 1812a of crosspoint units 926 and a second group 1812b of crosspoint units 926. This grouping of crosspoint 926 units may correspond to a row of crosspoint units 926 across a number of crosspoint chips 924. In any event, the modified bits of the multicast pattern from each group are applied to an OR gate 1822a or 1822b. The results of the OR gate are then applied to a higher level OR gate 1820 which generates the request signal (hk). The updating of the bits of the multicast pattern, as well as the loading of the bits of the multicast pattern, will be described in more detail in the description of the crosspoint units in §4.3.2.3.3.1 below.

§4.3.2.3.2.2 TOKEN TUNNELING METHODS AND APPARATUS

FIG. 19 is a high level flow diagram of an exemplary method 1630' which may be used to effect the token tunneling process 1630. As shown in step 1910, for each column of crosspoint units 926" (corresponding to a particular output port 930), groups of crosspoint units 926" are defined. Then, as shown in step 1920, for each group of crosspoint units 926", the bits of the multicast patterns associated with those crosspoint units 926" are logically ORed to generate group OR results. Next, as shown in decision step 1930, for each group, it is determined whether the group OR result is LOW ('0') or HIGH ('1'). If, the group OR result is LOW ('0'), the token can skip (or tunnel through or bypass) the crosspoint units 926" of the group and the method 1630' is left via RETURN node 1960. If, on the other hand, the group OR result is HIGH ('1'), the token will be passed to each crosspoint unit 926" within the group and the method 1630' is left via RETURN node 1960.

In the following exemplary structure, it is assumed that the crosspoint chips 924 define the columnar groups of crosspoint units 926 for purposes of token tunneling. As shown in FIG. 20a, when all of the multicast pattern bits associated with a column of crosspoint units in a crosspoint chip 924 are LOW ('0'), then the column of crosspoint units 924 can be skipped by "tunneling" the token directly from the input of the crosspoint chip to the output. The tunneling logic 2010 may simply be an OR gate. The output of the tunneling logic 2010 provides a control input to the switch (or multiplexer) 2020. If the output of the tunneling logic 2010 is LOW ('0'), which indicates that all of the multicast bits are LOW ('0'), the switch 2020 passes the accepted token ti directly to the OR gate 2030. If, on the other hand, the output of the tunneling logic 2010 is HIGH ('1'), which indicates that at least one of the crosspoint units has an associated input cell requesting the output port associated with the column, the switch passes the accepted token ti to the first crosspoint unit 926 in the group. The OR gate 2030 includes a tunneled token input coupled with an output of the switch 2020 and a passed token input coupled with the output to of the last crosspoint unit 926 in the group. Assuming that the tunneled token input is LOW ('0') when the token is passed through each crosspoint unit 926 of the group and that the passed token input is LOW ('0') when the token tunnels directly to the output, the OR gate 2030 appropriately passes either the tunneled token or non-tunneled token.

As can be appreciated from the foregoing, arbitration time becomes proportional to the number of ports of an crosspoint chip 924 (or of another grouping), rather than the number of ports of the entire switch fabric. More specifically, the worst case time complexity of the basic token tunneling method is $4n+2(N/n-2)$ gate delays. This worst case occurs when there is only one multicast pattern bit with a value of '1' in a column of crosspoint units 926 and it is at the farthest position from the round robin pointer. For example, the worst case delay occurs if the one HIGH ('1') multicast pattern bit is at the bottommost crosspoint unit 926, while the round robin pointer points to (i.e., the token is at) the topmost crosspoint unit 926. As will be described in §4.3.2.3.3.1 below, each crosspoint unit 926 contributes two (2) gate delays for output arbitration. In the worst case scenario, the token ripples through all the crosspoint units 926 in the crosspoint chip 924 (or other grouping) where the token is generated and all the crosspoint units 926 in the crosspoint chip 924 (or other grouping) in which the crosspoint unit with the HIGH ('1') multicast pattern bit is the last crosspoint unit 926. This contributes the 4n gates delay. Since there are a total N/n crosspoint circuits 924 (or other groupings) in each column, and at most (N/n-2) crosspoint circuits 924 (or other groupings) will be tunneled through, another $2(N/n-2)$ gate delays occurs in the worst case.

FIG. 20b is an alternative structure in which switches 2022, 2024, OR gates 2032, 2034, and the tunneling logic are arranged in a hierarchy to further reduce round robin arbitration delays. By tunneling through smaller groups of crosspoint units 926 (groups of size g) and arranging these groups in hierarchy as shown in FIG. 20b, it is possible to further reduce the worst case arbitration delay to $4g+5d+2$ (N/n-2) gate delays, where $\lceil d=\log_2(n/g) \rceil$. The hierarchical arrangement basically decreases the time spent in the crosspoint chip 924 (or other grouping) where the token is generated and in the crosspoint chip 924 (or other grouping) in which the crosspoint unit with the HIGH ('1') multicast pattern bit is the last crosspoint unit 926. For example, if N=256, n=16, and g=2, the basic token tunneling structure of FIG. 20a has a worst case arbitration of 92 gate delays, whereas the hierarchical token tunneling structure of FIG. 20b has a worst case arbitration of only 51 gate delays.

FIG. 21a illustrates tunneling logic circuitry 2010' which may be used to effect the tunneling logic 2010 of FIG. 20a. A bypass (bp) signal, which is described in more detail in §4.3.2.3.3.1 below, is provided by each of the crosspoint units 926 in a column. A four-input OR gate 2110 has inputs associated with groups of four crosspoint units 926. The outputs of these four-input OR gates 2110 are provided to another four-input OR gate 2120. In this case, the tunneling logic 2010' is associated with sixteen (16) crosspoint units 926.

Similarly, FIG. 21b illustrates a hierarchy of OR gates which may be used to effect a hierarchical token tunneling circuit such as that 2012 illustrated in FIG. 20b. In this Figure, each block 2130 represents the bypass signal (bp) outputs from two (2) crosspoint units 926.

§4.3.2.3.2.3 EXEMPLARY SWITCHING PLANE ARCHITECTURE

FIG. 30 illustrates a switching plane 3000 defined by a matrix of crosspoint chips 924'. Notice that the head of line cell is provided from the selected virtual output queue 912 of the input port controller 910 as a horizontal data (hd) input to each of the crosspoint chips 924 in a row. Notice also that the N bit multicast pattern associated with the head of line cell of the selected virtual output queue is divided into N/n groups of n bits. This is illustrated in FIG. 31. Notice that the first group of n bits is provided to the first crosspoint chip 924' of the row while the last $(N/n)^{th}$ group of n bits is provided to the last $(N/n)^{th}$ crosspoint chip 924' of the row. Finally, notice that each column of crosspoint chips 924' has n associated OR gates which logically OR the vertical data (vd) outputs from the n columns of crosspoint units 926.

FIG. 32 illustrates a 64-by-64 switching plane 3200 defined by a four-by-four matrix of sixteen-by-sixteen crosspoint chips 924". Notice that in each row, the crosspoint chip 924" handshake signals (hk) (which, as will be described below with reference to FIG. 18 are generated by logically ORing the multicast pattern bits of the row of crosspoint units 926) are logically ORed to provide a handshake (hk) input signal to the input port controller 910". In this way, when all of the multicast bits of the multicast pattern, as distributed across the row of crosspoint units 926, are LOW ('0'), which means that the cell has been serviced by all of the requested output ports, the input port controller 910 will know to make a head of line cell in a next selected virtual output queue 912 available and to load the bits of its associated multicast pattern.

§4.3.2.3.3 CROSSPOINT CHIPS

Recall from FIG. 9 that a crosspoint chip 924 may be defined by interconnecting a matrix of crosspoint units 926. As will be described below, a crosspoint unit 926 contains contention resolution circuitry, storage for multicast pattern bit(s), and a crosspoint switch. Similar to the switch plane 922, horizontal data (hd) is broadcast to all crosspoint units 926 on the same row and vertical data (vd) is obtained by ORing the vertical data outputs of all crosspoint units 926 in the same column. Multicast pattern bits (n bits) may be serially loaded into each crosspoint chip 924 of a row. Accordingly, n bit times is used to load the multicast pattern. Since each crosspoint circuit 924 loads each group of n-bit multicast pattern simultaneously, an N-bit multicast pattern can be loaded into N/n crosspoint chips 924 in n bit times. As will be described in §4.3.2.3.3.1 below, a crosspoint unit routes the data at its horizontal data (hd) input to its vertical data (vd) output if its multicast pattern bit is HIGH ('1') and if it wins the output contention (i.e., if its token input (ti) is HIGH ('1')).

FIG. 29 illustrates a crosspoint chip 2900 defined by a matrix of crosspoint units 926. In each row, the head of line cell of the selected virtual output queue 912 is provided as a horizontal data (hd) data input to each of the crosspoint units 926. As discussed above, the bits of the multicast pattern associated with the head of line cell may be shifted through the crosspoint units 926 of the row. As shown, within each column of crosspoint units 926, the token-out (to) signal is provided as a token-in (ti) signal to the next crosspoint unit 926. Also, within each column, the vertical data (vd) output by each of the crosspoint units 926 of the column may be applied to a logical OR gate 2910.

As just discussed above with reference to FIGS. 20a and 20b, within a column of crosspoint units 926, those belonging to a given crosspoint chip 924 may define a grouping of crosspoint units 926 for purposes of token tunneling.

Having described the crosspoint chip 924, crosspoint units 926 are now described in §4.3.2.3.3.1 below.

§4.3.2.3.3.1 CROSSPOINT UNITS

In the following, functions which may be performed by the crosspoint units 926 are described in §4.3.2.3.3.1.1 and exemplary methods and structures for effecting those functions are described in §4.3.2.3.3.1.2.

§4.3.2.3.3.1.1 CROSSPOINT UNIT FUNCTIONS

Collectively, the token management functions of crosspoint units 926 in a column serve to manage the starting point of a token for each arbitration cycle. In this regard, referring back to FIG. 16, note that each crosspoint unit 926 in a matrix of crosspoint units 926 performs a token management process 1610. Exemplary methods and structures for effecting this process 1610 are described in §4.3.2.3.3.1.1.1 below.

Collectively, the crosspoint functions of crosspoint units 926 in a column serve to ensure that a cell (or horizontal data (hd)) associated with the crosspoint unit winning contention in a given arbitration cycle is passed to the output port. In this regard, still referring to FIG. 16, note that each crosspoint unit 926 in a matrix or crosspoint units 926 performs a crosspoint process 1620. Exemplary methods and structures for effecting this process 1620 are described in §4.3.2.3.3.1.2 below.

§4.3.2.3.3.1.1.1 TOKEN GENERATION AND PASSING

Figure 22B:
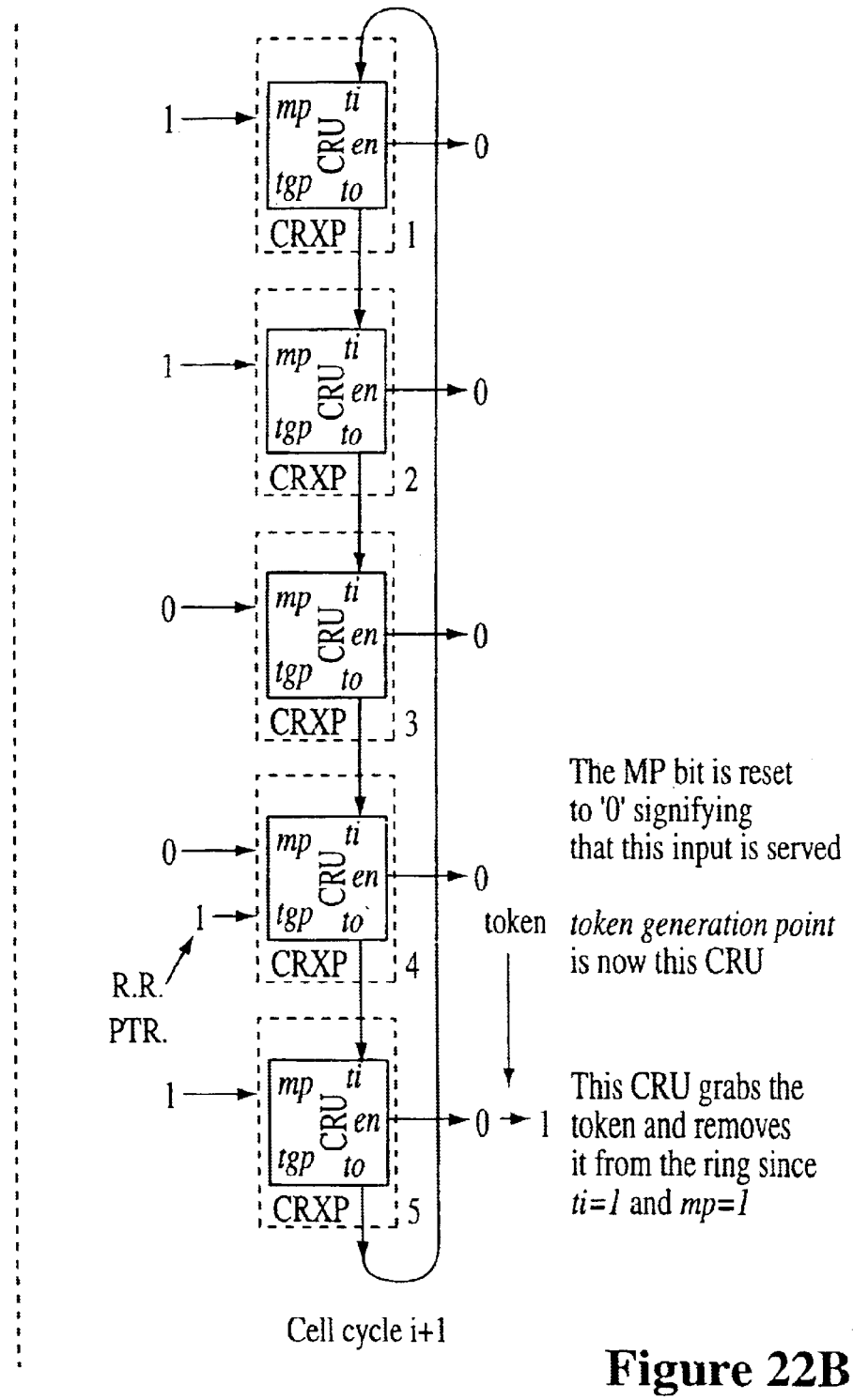

Crosspoint units 926 solve the output contention among requesting inputs in a distributed manner. FIGS. 22a and 22b illustrate the manner in which a column of crosspoint units 926 arbitrate contention in two arbitration cycles. These examples are illustrate a round robin arbitration which uses simple token passing—token tunneling is not illustrated in these Figures. Basically, inputs are served in a round-robin fashion and each column of crosspoint units 926 has a token generation point (tgp) pointer (denoted as RR) which determines the starting point of a token during a next arbitration cycle. Notice that the token-out (to) output of one crosspoint unit 926 is coupled with a token-in (ti) input of a next crosspoint unit 926, with the token-out (to) output of the last crosspoint unit 926 being coupled with the token-in (ti) input of the first crosspoint unit 926 thereby forming a ring, as shown in FIGS. 20a and 20b.

Referring now to FIG. 22a, the crosspoint unit 926 in the second row is pointed by that column's RR pointer. Thus, the crosspoint unit 926 of the second row generates a token at the beginning of the $i^{th}$ arbitration cycle and sends it down the ring. Since the multicast pattern bit of the crosspoint unit 926 in the third row is LOW ('0'), the token is forwarded to the crosspoint unit 926 in the fourth row. Thus, the crosspoint unit 926 of the third row can be said to be "transparent". Since the multicast pattern bit of the crosspoint unit 926 of the fourth row is HIGH ('1'), when it receives the token, it "grabs" the token, removes it from the ring, resets its multicast pattern bit to LOW ('0'), and wins contention for the output port associated with the column in that arbitration cycle. The crosspoint unit 926 of the fourth row therefore routes its cell (i.e., switches its horizontal data (hd) input to its vertical data (vd) output) to the output port as will be described in more detail in the next section below.

As shown in FIGS. 20a and 20b, the crosspoint unit winning arbitration in an arbitration cycle is pointed to by the RR pointer in the next arbitration cycle. Thus, referring to FIG. 22b, the crosspoint unit 926 of the fourth row generates the token in the next arbitration cycle (i+1) since it won the contention in previous arbitration cycle i. Since its multicast pattern bit is HIGH ('1'), the crosspoint unit 926 in the fifth row grabs the token and becomes the new contention winner.

As can be appreciated from FIGS. 22a and 22b, the crosspoint unit 926 that generates the token can win the contention only if all the multicast pattern bits of all other crosspoint units 926 in its column are LOW ('0') and its multicast pattern bit is HIGH ('1'). The position of the RR pointer remains the same if there are no requests (i.e., if all multicast pattern bits in the column are LOW ('0')) in the arbitration cycle.

§4.3.2.3.3.1.1.2 CROSSPOINTS

FIG. 23 illustrates the crosspoint function. A column of the switching fabric 920 is shown. Each row includes a row input flip-flop 2310, and a number of crosspoint units 926. The AND gate 2326 may be used to perform the crosspoint function. When an enable signal (bck) is latched by the row input flip-flops 2310, each of their contents (i.e., a cell) is provided on the horizontal data bus 2350 of the associated row. This cell data is logically ANDed with a grant signal (en) by the AND gate 2326 to generate a vertical data (vd) output in each case. The grant signal (en) will be based on the multicast pattern bit and the token input (ti) and will be HIGH ('1') only when both the multicast pattern bit and the token input (ti) are HIGH ('1').

The vertical data (vd) output from each of the crosspoint units 926 in the row are logically ORed and stored in a column output flip-flop 2340. This logical ORing may take place by grouping OR gates. For example, as shown in FIG. 23, if four-input OR gates are to be used, four (4) four-input OR gates 2320 are used to logically OR the vertical data (vd) outputs of the crosspoint units 926 of rows 1–4, 5–8, 9–12, and 13–16. The outputs of the four (4) four-input OR gates 2320 are then applied as inputs to a four-input OR gate 2330, the output of which is applied to the column output flip-flop 2340.

§4.3.2.3.3.1.2 CROSSPOINT UNIT METHODS AND APPARATUS

Having described the functions which may be performed, in some cases collectively, by the crosspoint units 926, an exemplary structure and methods for effecting these functions is now described.

FIG. 24 is a high level block diagram of a crosspoint unit 926'''. This crosspoint unit 926''' includes a contention resolution unit (CRU) 2430, a D type flip-flop 2410 and an AND gate 2326. Basically, the crosspoint unit 926''' accepts a horizontal data (hd) input, a multicast pattern input ($mp_i$), a multicast pattern clock (mpck) input and a token-in (ti) input and provides multicast pattern ($mp_o$) output, a token-out (to) output, and a vertical data (vd) output.

The flip-flop 2410 clocks through the bits of the multicast pattern and stores an multicast pattern bit associated with its column. The contention resolution unit 2420 determines whether or not the crosspoint unit 926''' won arbitration based on the token-in (ti) input and the multicast pattern bit stored in the flip-flop 2410. More specifically, the grant signal (en) is set HIGH (to '1') if both the multicast pattern bits is HIGH ('1') and the token-in (ti) signal is HIGH ('1'). As shown in more detail in FIG. 25, AND gate 2510 may be used to logically AND the multicast pattern bit and the token-in signal to generate the grant (en) signal. The contention resolution unit 2420 also determines the token-out (to) output based on the token-in (ti) input, the multicast pattern bit, and a token generation point (tgp) signal. More specifically, as shown in FIG. 25, the token-in (ti) input as well as the multicast pattern bit, inverted, may be applied to an AND gate 2520. The output of the AND gate 2520 and the token generation point (tgp) are provided as inputs to an OR gate 2530 which generates the token-out (to) signal. Returning to FIG. 24, the AND gate 2326 passes cells from its horizontal data input to its vertical data output if the contention resolution unit 2420 generates a HIGH ('1') grant (en) signal. Otherwise, the crosspoint unit acts transparent to the token. As shown in FIG. 25, the contention resolution unit 2420' includes three (3) gates and takes two (2) gate delays to determine the token-out (to) output.

FIG. 26 is a more detailed diagram of an exemplary crosspoint unit 926''''. As was the case with the crosspoint unit 926''' of FIG. 24, the crosspoint unit 926'''' of FIG. 26 includes a flip-flop 2410', a contention resolution unit 2420' and a crosspoint AND gate 2326. As shown in FIG. 26, the crosspoint unit 926'''' further includes a token generation control unit 2610, an input value controller 2620, a flip-flop 2630/1384, inverters 2640, 2660, OR gate 2650, and AND gate 2670. This crosspoint unit 926'''' accepts handshake-in (hki), multicast pattern-in (mpi), multicast pattern clock-in (mpcki), cell clock-in (ccki), horizontal data-in (hdi), token-in (ti) and reset-in (reseti) inputs and provides token-out (to), horizontal data-out (hdo), handshake-out (hko), bypass disable (bp), multicast pattern-out (mpo), multicast pattern control (mpc), reset-out (reseto), cell clock-out (ccko), multicast pattern clock-out (mpcko) and vertical data (vd) outputs. As can be appreciated from FIG. 26, the horizontal data (hd) signals are derived from a horizontal data bus 2680, the handshake (hk) signals are derived from a handshake line 2682, the reset signals are derived from a reset line 2684, the cell clock signals are derived from a cell clock line 2686, and the multicast clock signals are derived from a multicast clock line 2688.

The token generation control 2610 functions such that, whenever a crosspoint unit 926'''' switches a cell through during an arbitration cycle, that crosspoint unit 926'''' will be the token generation point in the next arbitration cycle. This is achieved since the contention resolution unit's grant (en) output is one of the inputs to the OR gate 2614. The crosspoint unit 926'''' can also be forced to be the token generation point if the force token generation (ftg) input to the OR gate 2614 is HIGH ('1'), which usually only occurs at initialization. Only one crosspoint unit 926'''' in each column may be provided with a HIGH ('1') force token generation (ftg) signal. The final input to the OR gate 2614 is provided from an AND gate 2618 which accepts the token-in (ti) signal and a feedback of the token generation point (tgp) signal. This last input to the OR gate 2614 ensures that the token generation point will remain fixed if all of the multicast pattern bits in a column are LOW ('0') during a given arbitration cycle. Thus, the OR gate 2614 provides the input to a flip-flop 2612 storing the token generation point (tgp). That is, if the output of the OR gate 2614 is HIGH ('1'), then the token generation controller 2610 will generate a HIGH ('1') token generation point (tgp) signal.

Figure 14:
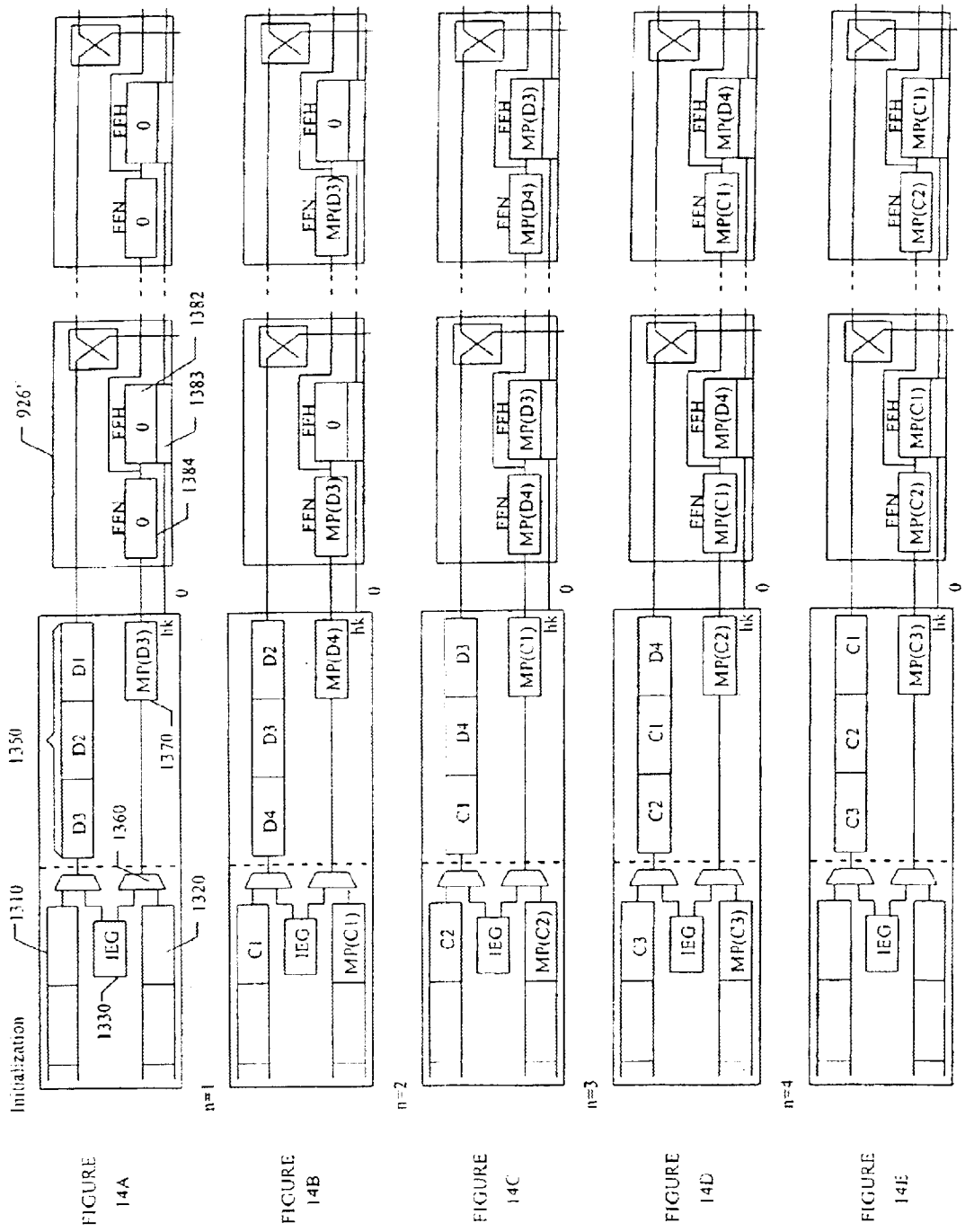

Recall from FIG. 14 that the crosspoint unit 926' could store bits of two (2) multicast patterns (i.e., a bit from a multicast pattern associated with the head of line cell of a selected virtual output queue 912 and a bit from a multicast pattern associated with the head of line cell of a next selected virtual output queue 912). The flip-flop 2410'/1382 stores the bit of the multicast pattern, which is associated with the column, of the head of line cell of a selected virtual output queue 912. The flip-flop 2630/1384 stores the bit of the multicast pattern, which is associated with the column, of the head of line cell of a next selected virtual output queue 912. Recall that in a switch in which input ports have virtual output queues, the crosspoint units can buffer a multicast pattern bit of a head of line cell of winning virtual output queue and a multicast pattern bit head of line cell of next virtual output queue having a head of line cell having a head of line cell.

Referring to both FIGS. 25 and 26, the token-out (to) signal can be determined as follows. First, the multicast pattern bit, inverted, is logically ANDed with the token-in (ti) signal. This AND result is then logically ORed with the token generation point (tgp) to generate the token-out (to) signal.

The input value controller 2620 determines the value to be loaded into the flip-flop 2410'/1382 in the next arbitration cycle. If the output Q(N) of the flip-flop 2630/1384 is LOW ('0'), the value stored in the flip-flop 2630/1384 will be loaded into the flip-flop 2410'/1382 under control of the handshake (hk) signal. More specifically, the value will be loaded into the flip-flop 2410'/1382 only after all of the multicast pattern bits in the row are LOW ('0'). If, on the other 10 hand, the output Q(N) of the flip-flop 2630/1382 is HIGH ('1'), the operation of the input value controller 2620 will depend on the grant (en) signal. If the grant (en) signal is LOW ('0'), the value stored in the flip-flop 2410'/1382 is preserved since the crosspoint unit 926"" will not be switching through a cell in the current arbitration cycle. If, on the other hand, the grant (en) signal is HIGH ('1'), the value stored in the flip-flop 2630/1384 will be loaded into the flip-flop 2410'/1382 under control of the handshake (hk) signal. Table 1 presented below is a truth table for the input value controller 2620.

TABLE 1

| en | hk | QN | QH | DH | Comment |
|----|----|----|----|----|---------|
| 0 | 0 | 0 | 0 | 0 | All MP bits are zero; load a new MP bit |
| 0 | 0 | 0 | 1 | X | hk=0 and QH=1 which is impossible |
| 0 | 0 | 1 | 0 | 1 | All MP bits are zero; Load a new MP bit |
| 0 | 0 | 1 | 1 | X | hk=0 and QH=1 which is impossible |
| 0 | 1 | 0 | 0 | 0 | Preserve MP |
| 0 | 1 | 0 | 1 | 1 | Preserve MP |
| 0 | 1 | 1 | 0 | 0 | Preserve MP |
| 0 | 1 | 1 | 1 | 1 | Preserve MP |
| 1 | 0 | 0 | 0 | X | en=1 and QH=0 which is impossible |
| 1 | 0 | 0 | 1 | 0 | load a new MP |
| 1 | 0 | 1 | 0 | X | en=1 and QH=0 which is impossible |
| 1 | 0 | 1 | 1 | 1 | load a new MP |
| 1 | 1 | 0 | 0 | X | impossible combination |
| 1 | 1 | 0 | 1 | 0 | reset the MP bit |
| 1 | 1 | 1 | 0 | X | impossible combination |
| 1 | 1 | 1 | 1 | 0 | reset the MP bit |

The bypass disable (bp) output of the crosspoint unit 926"" may be used by a token tunneling device to determine whether the crosspoint unit 926"" can be bypassed. (Recall FIGS. 21a and 21b.) The bypass disable (bp) signal is the logical OR (Note OR gate 2650.) of the multicast pattern bit from the flip-flop 2410'/1382 and the token generation point (tgp) signal output by the token generation controller 2610. If the mulitcast pattern bit is HIGH ('1') or if the crosspoint unit 926"" is the token generation point, then the crosspoint unit 926"" should not be bypassed by the token. It is clear that the crosspoint unit 926"" should not be bypassed if its multicast pattern bit is HIGH ('1'). Even if its multicast pattern bit is LOW ('0'), the crosspoint unit 926""should not be bypassed because if all of the other multicast pattern bits in the column are LOW ('0'), then it should be able to receive the token that it generated.

FIG. 27 is a high level flow diagram of a method 1610' for effecting the token management process 1610. As shown in step 2710, the statuses of the multicast pattern bit, the token-in (ti) signal and the token generation point (tgp) signal are determined (or these values are simply accepted). In step 2720, the token-out (to) signal is determined based on the multicast pattern bit, the token-in (ti) signal and the token generation point (tgp) signal. This may be done using Boolean logic as illustrated in FIG. 25. The method 1610' is then left via RETURN node 2730.

FIG. 28 is a high level flow diagram of a method 1620' for effecting the crosspoint process 1620. As shown in step 2810, the statuses of the multicast pattern bit and the token-in (ti) signal are determined (or these values are simply accepted). Then, as shown in step 2820, the mulitcast pattern bit and the token-in (ti) signal are logically ANDed to generate a crosspoint grant (en) signal. (Recall the AND gate 2510 of FIG. 25.) If the crosspoint grant (en) signal is HIGH ('1'), then the crosspoint is enabled which effectively passes the cell at the horizontal data (hd) input to the vertical data (vd) output, as shown in decision step 2830 and step 2840. Then, at step 2850, the multicast pattern bits is updated (i.e., set to LOW ('0')) and the method 1620' is left via RETURN node 2870. Returning to decision step 2830, if the crosspoint grant (en) signal is LOW ('0'), then the token-in (ti) input signal is passed to the token-out (to) output signal and the method 1620 is left via RETURN node 2870.

§4.3.3 Terabit Switch Design

For a 256×256 switch with the incoming aggregated bandwidth of 5 Gb/s and internal speedup (c) of two (2), the line bandwidth of the switch fabric is 10 Gb/s. The total switch capacity is 5 Gb/s×256, or 1.28 Tb/s. The cell length can be chosen to be 64 bytes to accommodate the smallest internet protocol packet size (40 bytes). The switch fabric has four (4) switch planes 922. Assuming that each crosspoint chip 924 can accommodate 16 ports, the switch plane 922 has $(256\backslash16)^2$, or 256 crosspoint chips 924. In other words, the entire switch fabric with four (4) switch planes needs 1,024 crosspoint units 926. If more ports (e.g., 32) can be accommodated by a crosspoint chip 924, then the total number of crosspoint chips 924 in each plane 922 can be reduced (e.g., to 64). However, the pin count of each of the crosspoint chips 924 will be proportionally increased, which may be prohibited due to high packaging cost and power consumption.

By choosing the data bus of each crosspoint chip 924 to be four (4) bits wide (i.e., k=4), the data bus of the switch fabric is 4×4, or sixteen (16) bits wide. Thus, the operation speed of the data bus is 10 Gb/s/16, or 625 Mb/s, and the duration of each cell is 512 bits/16 or 32 bits with the bit time of 1.6 ns (1/625 Mb/s). Assuming that the time spent for input and output arbitration is identical for input and output arbitration (since both are performing the same arbitration scheme with almost the same number of input requests (N+1 vs. N)), it will take 16-bit times to load a 256-bit multicast pattern, while it only takes 1-bit time to send the handshaking signals to the input port controller 910. Accordingly, there are about 15-bit times, or 15×1.6=24 ns, to perform the two arbitrations, or 12 ns for each arbitration. As discussed previously, it takes 92 gate delays for the basic token tunneling scheme with N=256 and n=16. This should be able to be achieved by using the state-of-the-art 0.25 μm CMOS technology with gate delay less than 100 ps and clocked at 625 Mb/s. The total signal pin count excluding power pins of the crosspoint chips 924 is 160.

§4.4 OPERATION OF EXEMPLARY SWITCH

FIG. 38 is a diagram which illustrates various operations which may occur during an arbitration cycle. As shown, in each column of crosspoint units 926, while a cell which won arbitration in a previous cycle (i) is being transmitted, one or more of the following operations may be performed:

(a) at each of the input ports 910, an input arbitration (IA) among the virtual output queues 912 may take place for the cycle (i+1);

(b) at each of the input ports 910, if a handshake signal was asserted in the previous cycle (i), then for each row of crosspoint units 926, the multicast pattern bits (MP) associated with the cell winning the input arbitration may be loaded into the row of crosspoint units 926;

(c) for each of the columns of crosspoint units 926, an output arbitration may take place for the cycle (i+1); and (d) if, after modification, all bits of the multicast pattern in a row are LOW ('0'), then a handshake signal (HSK) may be applied to the input port 910 associated with the row during the cycle (i+1) (A handshake signal is determined to be LOW ('0') or HIGH ('1') in any event.).

Although these steps were shown as operating in a serial sequence, it is possible to have some operations take place concurrently. Further, in some cycles, not all of these operations will be performed. For example, the bits of a multicast pattern are loaded into a row of crosspoint units 926 only if the handshake signal was asserted in the previous cycle.

§4.5 MULTIPLE PRIORITY LEVELS

As discussed in §1.2.2 above, it may be advantageous to prioritize network traffic. In the following, techniques for handling multiple priority levels is described in §4.5.1. Then, exemplary methods and apparatus for handling multiple priority levels are described in §4.5.2.

§4.5.1 TECHNIQUES FOR HANDLING MULTIPLE PRIORITY LEVELS

Basically, priority levels may be considered during an input arbitration or during an output arbitration. If the priority levels are considered during the input arbitration, if there are P priority levels and N output ports, then N*P virtual output queues may be provided. During the input arbitration, the basic round robin arbitration described above may occur on the highest priority level cell awaiting transmission. The search for the highest priority level cell always progresses from high priority virtual output queues to low priority virtual output queues. The search for the highest priority level cell may use grouping and ORing techniques similar to the token tunneling method described above to limit the worst case search for the highest priority level cell from P to log(P).

If the priority levels are considered during the output arbitration, then each of the crosspoint units 926 in a row will have P flip flops for storing the multicast patterns of P head or line cells which won arbitration for their respective priority level. Then, in each column, the highest priority level request is determined. Then, only cells in the column at the determined highest priority level contend for the output port 930 associated with the column.

§4.5.2 EXEMPLARY METHODS AND APPARATUS FOR HANDLING MULTIPLE PRIORITY LEVELS

FIG. 33 is an exemplary method 3300 for arbitrating among cells having multiple priority levels. First, as shown in step 3310, for each column, the highest level priority request is determined Then, as shown in step 3320, within each column, those crosspoint units 926 that don't have a request at the determined highest priority level request are disabled. Next, as shown in step 3330, in each column, contention among the enabled crosspoint units 926, if any, is resolved. The contention resolution may use a token rotation (or token tunneling) round robin scheme. Finally, as shown is step 3340, within each row, if more than one crosspoint unit 926 won arbitration, only the highest priority cell is crossed through. The method 3300 is then left via RETURN node 3350.

An exemplary architecture, which employs the foregoing method 3330 and which can handle P=four (4) priority levels, is now described. Cells, as well as multicast patterns of the cells at each input are stored in priority queues in the corresponding input ports 910. The head of line and next to head of line multicast pattern bits of all of the four (4) priority queues are stored in the corresponding crosspoint units 926 of a row. More than one priority level's head of line multicast pattern bits stored in a crosspoint unit 926 can be HIGH ('1') simultaneously. This means that more than one head of line cell in the input virtual priority queues request to the switched through that crosspoint unit 926. A crosspoint unit 926 will always try to serve the highest priority request. In this exemplary structure, a crosspoint unit 926 will always try to serve the highest priority request. Thus, in such cases, the crosspoint unit 926 will enter the contention in its column using the highest priority request made to it. FIG. 34 illustrates the storage of bits of multicast patterns for four (4) priority levels stored in a row of four (4) crosspoint units. As shown, within each of the input port controllers, the multicast patterns for head of line and next to head of line cells for each of the four (4) priority levels are stored in multicast pattern queues 1320a' through 1320d'. Within each of the crosspoint units, a flip-flop 1382a' stores a bit of the head of line multicast pattern of a first priority level cell associated with the output port of the column, a flip-flop 1382b' stores a bit of the head of line multicast pattern of a second priority level cell associated with the output port of the column, a flip-flop 1382c' stores a bit of the head of line multicast pattern of a third priority level cell associated with the output port of the column, and a flip-flop 1382d' stores a bit of the head of line multicast pattern of a fourth priority level cell associated with the output port of the column. Flip-flops 1384a' through 1384d ' may also be provided to similarly store bits of the next to head of line multicast pattern of first through fourth priority level cells.

Recall that in step 3310 of FIG. 33, in each column, the highest priority level request is determined. FIGS. 35(*a*) through 35(*e*) illustrate an exemplary structure for effecting this step. The numbers in each of the boxes labeled CRXP are the request priority levels of the crosspoint unit 926 they belong to. The highest priority request level in a crosspoint chip may determined by performing hierarchical comparisons are shown in FIG. 35(*a*). The result of these comparisons are shown in boxes 3510a through 3510d. These results are then compared among adjacent crosspoint units 926 in a column, serially, as shown in FIGS. 35(*b*) through 35(*d*). The greater priority level value is stored in box 3520. In this way, after N serial comparisons, where N is the number of rows, the value of the highest priority level of the column is propagated to all of the crosspoint units 926 in a column. After the propagation of the value of the maximum priority level request in the column, the value is latched in a column priority value register (CPR) 3530 at each crosspoint unit 926 as is shown in step 35(*e*).

Recall from step 3320 of FIG. 33, that, within each column, those crosspoint units that don't have any request at the latched maximum priority level request value are disabled. Referring to FIGS. 36(*a*) and 36(*b*), notice that only those cells having priority level values equal to the maximum priority level value of the column remain enabled. Recall from step 3330 that, in each column, contention, if any, among the enabled crosspoint units is resolved. As shown in FIG. 36(*c*), a token rotation method may be used to resolve any contention. Note that separate token generation points exist for each of the (e.g., four (4)) priority levels. Thus, it is possible (though not necessary and less probable than not) for the same crosspoint unit 926 to be the token generation point for all of the priority levels. In the example shown in FIG. 36(*c*), the token generation point for priority level three (3) is at the crosspoint unit 926 of the second row. The token generated by this crosspoint unit 926 is taken by the crosspoint unit 926 of the fourth row and removed from the ring.

Finally, recall from step 3340 of FIG. 33 that, within each row, if more than one crosspoint unit 926 won arbitration, only the highest priority cell is switched through. An example of this step is illustrated in FIGS. 37(*a*) through 37(*c*). In this example, three (3) crosspoint units 926 of the first row of crosspoint units 926 won contention in their respective column, while one (1) crosspoint unit 926 of the fourth row won contention in its column. As shown in FIG. 37(*b*), those contention winning crosspoint unit(s) 926 with a request priority level lower than a maximum value in its row, release their request(s). In this case, the crosspoint unit 926 of the first row and second column releases its request since it is less than the maximum priority level request of its row. Then, as shown in step 37(*c*), the remaining cells are switched through. Notice that in this example, the cell having a priority level value of three (3) was simultaneously switched through to the first and third output ports (not shown).

§4.6 Conclusions

With a sufficiently large speedup factor, the probability that a cell delay is unacceptably large can be arbitrarily small. The simple dual round-robin (DRR) arbitration scheme of the present invention can further improve the performance of bursty traffic by reducing the destination correlation of (i.e., desynchronize) head-of-line (HOL) cells. While a statistical delay bound is provided at inputs for all sessions of cells, flexible weighted fair queuing (WFQ) should be supported at outputs to achieve different delay bounds for different sessions.

To meet the stringent arbitration time constraint of a Tb/s switch, the token-tunneling method of the present invention reduces the arbitration time by a factor of the square root of the switch size. With state-of-the-art 0.25 $\mu$m CMOS technology, the arbitration time can be as small as 10 ns for a 256×256 Tb/s switch. This scheme can be easily extended to handling multiple-priority requests.

Finally, the distributed crossbar switch architecture adopting the token tunneling arbitration method and the bit-slice technique demonstrates that a Tb/s switch is achievable by existing electronic technology.

What is claimed is:

1. In a switch having input ports, output ports, and a switching fabric for selectively connecting an input port to an output port, each of the input ports having a virtual output queue corresponding to each of the output ports, a method for arbitrating contention for a output port, the method comprising steps of:
   a) for teach of the input ports, select one cell from among head of line cell of the virtual cell queues to generate a first arbitration winning cell,
   wherein the selection is carried out in accordance with a round robin discipline; and
   b) for each of the output, ports, select one cell from among first arbitration winning cells requesting the output port to generate an overall arbitration winning cell.

2. The method of claim 1 further comprising a step of:
   c) for each of the output ports, switch through the overall arbitration winning cell to the output port.

3. The method of claim 1 wherein the step of, for each of the input ports, selecting one cell from among head of line cells of the virtual output queues to generate a first arbitration winning cell is carried out by passing a token among the virtual output queues in a ring,
   wherein the first arbitration winning cell is selected based on the first virtual output queue that both has a head of line cell and has the token.

4. The method of claim 3 wherein, after each arbitration cycle, at each of the input ports, the token is generated at a virtual output queue adjacent to the virtual output queue which had the first arbitration winning cell in the previous arbitration cycle.

5. The method of claim 1 wherein the step of, for each of the output ports, selecting one cell from among first arbitration winning cells requesting the output port to generate an overall arbitration winning cell is carried out in accordance with a round robin discipline.

6. The method of claim 1 wherein the step of, for each of the output ports, selecting one cell from among first arbitration winning cells requesting the output port to generate an overall arbitration winning cell is carried out by passing a token among crosspoint units associated with the output port, in a ring.

7. The method of claim 6 wherein the overall arbitration winning cell is selected based on the crosspoint unit that both has a cell requesting the associated output port and has the token.

8. The method of claim 7 wherein, after each arbitration cycle, at each of the columns of crosspoint units associate with each of the output ports, the token is generated at a crosspoint unit adjacent to the crosspoint unit which had the overall arbitration winning cell in the previous arbitration cycle.

9. The method of claim 1 further comprising a step of:
   a2) for each input port, sending a request to the output port requested by the first arbitration winning cell.

10. The method of claim 1 further comprising a step of:
    b2) for each output port, sending a grant signal to the input port associated with the overall arbitration winning cell.

11. The method of claim 1 wherein the switching fabric includes rows and columns of crosspoint units, and wherein each head of line cell may request more than one output port, the method further comprising steps of:
    c) for each input port, after each arbitration cycle, determining whether or not the first arbitration winning cell has been an overall arbitration winning cell for each of the output ports requested by it; and
    d) if, for each input port, the first arbitration winning cell has been an overall arbitration winning cell for each of the output ports requested by it, then
       i) making a next first arbitration winning cell available to all crosspoint units in a row associated with the input port, and
       ii) loading a pattern of the output ports requested by the next first arbitration winning cell into the row of crosspoint units associated with the input port.

12. The method of claim 11 wherein the pattern of the output ports requested by the next first arbitration winning cell is a multicast pattern having a number of bits corresponding to the number of output ports, each bit having a first value if the next first arbitration winning cell is requesting an associated output port and a second value if the next first arbitration winning cell is not requesting the associated output port.

13. The method of claim 12 further comprising steps of:
e) for each of the crosspoint units, accepting a multicast pattern bit and a token signal;
f) for each of the crosspoint units, logically ANDing the multicast pattern bit and the token signal to generate a crosspoint enable signal;
g) for each of the crosspoint units, if the crosspoint enable signal is HIGH, then
   i) switching the first arbitration winning cell associated with the crosspoint unit through to the output port associated with the crosspoint unit, and
   ii) updating the multicast pattern bit by setting it to LOW; and
h) for each of the crosspoint units, if the crosspoint enable signal is LOW but the token signal is HIGH, then passing the token signal to the next crosspoint unit of a column of crosspoint units.

14. The method of claim 1 further comprising a step of:
c) transmitting an overall arbitration winning cell of a previous arbitration cycle while steps of (a) for each of the input ports, select one cell from among head of line cells of the virtual output queues to generate a first arbitration winning cell, and
(b) for each of the output ports, select one cell from among first arbitration winning cells requesting the output port to generate an overall arbitration winning cell, are taking place.

15. An apparatus comprising:
a) a plurality of output ports;
b) a plurality of input ports, each of the plurality of input ports having a virtual output queue corresponding to each of the plurality of output ports;
c) the plurality of input ports further including a queue for multicast patterns; and
d) switching fabric including a matrix of crosspoint units defined by rows of crosspoint units corresponding to each of the plurality of input ports and columns of crosspoint units corresponding to each of the plurality of output ports,
   wherein, during an arbitration cycle, each of the plurality of input ports perform a first arbitration among head of line cells of the virtual output queues to generate a first arbitration winning cell, and
   wherein, during the arbitration cycle, each column of crosspoint units performs a second arbitration among any first arbitration winning cells to generate an overall arbitration winning cell.

16. The apparatus of claim 15 wherein each of the input ports further includes a queue for multicast cells.

17. The apparatus of claim 15 wherein each of the crosspoint units includes i) a storage unit for storing a bit of a multicast pattern associated with the first arbitration winning cell of an associated input port,
ii) a contention resolution device for accepting a token signal and the contents of the storage unit and for generating a grant signal and a token out signal, and
iii) a controlled switch for generating a vertical data output based on the first arbitration winning cell and the grant signal.

18. The apparatus of claim 17 wherein the controlled switch is an AND gate.

19. The apparatus of claim 17 wherein the contention resolution device includes means for generating the grant signal by logically ANDing the contents of the storage unit and the token signal.

20. The apparatus of claim 17 wherein the contention resolution device includes means for generating the token out signal by (i) inverting the contents of the storage unit to generate inverted contents, (ii) logically ANDing the inverted contents and the token signal to generate an intermediate signal, and (iii) logically ORing a token generation point signal with the intermediate signal to generate the token out signal.

21. The apparatus of claim 17 wherein each of the crosspoint units further includes
   iv) a token generation device for generating a token generation point signal based on a force token generation signal, the grant signal, a token signal and a previously generated token generation point signal.

22. The apparatus of claim 21 wherein the token generation device includes
   A) means for logically ANDing the previously generated token generation point signal and the token signal to generate an AND result, and
   B) means for logically ORing the AND result, the force token generation signal, and the grant signal to generate the token generation point signal.

23. The apparatus of claim 22 further comprising a flip-flop for storing the token generation point signal output by the means for logically ORing.

24. The apparatus of claim 17 further comprising, for each column of crosspoint units, means for logically ORing vertical data from each of the crosspoint units of the column to generate the overall arbitration winning cell.

25. The apparatus of claim 17 wherein each of the crosspoint units includes means for updating the contents of the storage unit for storing a bit of a multicast pattern associated with the first arbitration winning cell of an associated input port, and further comprising:
d) for each row of crosspoint units, means for generating a request for a new multicast pattern based on the updated contents of the storage units of the row of crosspoint units.

26. The apparatus of claim 15 wherein the switching fabric includes a matrix of crosspoint chips, each of the crosspoint chips including a matrix of crosspoint units.

27. The apparatus of claim 26 wherein each of the crosspoint chips is associated with a group of input ports and a group of output ports.

* * * * *